(12) United States Patent  (10) Patent No.: US 7,900,783 B2
Fernandez et al.  (45) Date of Patent: Mar. 8, 2011

(54) STANDARD AND TRACK SHELVING SYSTEMS

(75) Inventors: Julio A. Fernandez, Dunnellon, FL (US); Robert P. Kundinger, Jr., Deland, FL (US)

(73) Assignee: Clairson, Inc., Newark, DE (US)

( * ) Notice: Subject to any disclaimer, the term of this patent is extended or adjusted under 35 U.S.C. 154(b) by 593 days.

(21) Appl. No.: 11/950,405

(22) Filed: Dec. 4, 2007

(65) Prior Publication Data

US 2009/0139943 A1  Jun. 4, 2009

(51) Int. Cl.
 A47F 5/08  (2006.01)
 A47B 57/34  (2006.01)
 A47B 96/06  (2006.01)
(52) U.S. Cl. .................. 211/90.02; 108/108; 248/225.11; 248/235; 211/90.03; 211/103
(58) Field of Classification Search ............... 211/87.01, 211/90.01, 90.02, 90.03, 90.04, 94.01, 103, 211/105.1, 124, 175, 183, 187, 189, 190, 211/207; 108/29, 30, 108, 147.17, 187; 411/85; 248/220.31, 220.41, 220.42, 220.43, 225.11, 248/235, 243, 244, 250; 160/135, 350, 351, 160/352
See application file for complete search history.

(56) References Cited

U.S. PATENT DOCUMENTS

| | | | |
|---|---|---|---|
| D5,634 S | 3/1872 | Wunder | |
| 1,006,328 A | 10/1911 | Widenhofer | |
| D48,426 S | 4/1929 | Whincap | |
| 1,793,036 A | 2/1931 | Whitney | |
| 1,997,432 A | 4/1935 | Replogle | |
| 2,020,991 A | 11/1935 | Brody | |
| 2,057,429 A | 10/1936 | Heim | |
| D108,811 S | 3/1938 | Snyder | |
| 2,266,274 A | 12/1941 | Schroeder | |
| 2,299,885 A | 10/1942 | Ellsworth et al. | |
| 2,345,650 A * | 4/1944 | Attwood | 403/21 |
| 2,441,721 A | 5/1948 | Schroeder | |
| 2,651,489 A | 9/1953 | Bell | |
| 2,683,890 A | 7/1954 | Rosenbaum | |
| 2,683,891 A | 7/1954 | Rosenbaum | |
| 2,767,951 A | 10/1956 | Cousino | |

(Continued)

FOREIGN PATENT DOCUMENTS

EP  0338872 A1  10/1989

(Continued)

OTHER PUBLICATIONS

U.S. Appl. No. 11/014,663, filed Dec. 16, 2004 (Remmers).

*Primary Examiner* — Michael Safavi
*Assistant Examiner* — Joshua Rodden
(74) *Attorney, Agent, or Firm* — Harness, Dickey & Pierce, P.L.C.

(57) ABSTRACT

A shelving system is disclosed that includes two tracks and a standard. The standard has an end portion slidably receivable within an opening one of the tracks, such that the position of the standard relative to the track is slidably adjustable along that track. The rearward portion of each track defines a recess. An elongate member is slidably receivable within the recesses of the tracks such that each track is slidable along the elongate member, whereby the slidable engagement of the elongate member within the recesses of the tracks aligns the tracks and allows slidable adjustment of the relative positioning of the tracks to each other.

32 Claims, 57 Drawing Sheets

U.S. PATENT DOCUMENTS

| | | | |
|---|---|---|---|
| 2,809,002 A | 10/1957 | Rudolph | |
| D189,163 S | 11/1960 | Growe | |
| 3,221,894 A | 12/1965 | Knuth | |
| 3,263,951 A | 8/1966 | Stokes | |
| 3,410,231 A | 11/1968 | Fletcher | |
| 3,476,008 A | 11/1969 | Pearson et al. | |
| 3,499,541 A | 3/1970 | Mackie | |
| 3,563,182 A | 2/1971 | MacFarlane et al. | |
| 3,565,381 A * | 2/1971 | Oliver | 248/243 |
| 3,621,751 A | 11/1971 | Fiorentino | |
| 3,640,389 A | 2/1972 | Snyder | |
| D227,742 S | 7/1973 | Logsdon | |
| 3,756,115 A | 9/1973 | Schuplin | |
| 3,760,744 A | 9/1973 | Cruckshank | |
| D228,852 S | 10/1973 | Vogelhuber et al. | |
| 3,784,023 A * | 1/1974 | Varon et al. | 211/105.1 |
| 3,978,799 A | 9/1976 | Escalette | |
| 3,993,002 A * | 11/1976 | Stroh | 108/108 |
| 3,998,170 A | 12/1976 | Gordon | |
| D244,668 S | 6/1977 | Tegner | |
| 4,098,480 A | 7/1978 | Neumann | |
| 4,125,050 A | 11/1978 | Schwartzman et al. | |
| 4,155,312 A | 5/1979 | Thorkildson | |
| 4,209,111 A | 6/1980 | Lotspeich et al. | |
| D258,489 S | 3/1981 | Gipson | |
| 4,523,722 A | 6/1985 | Cohen et al. | |
| D279,959 S | 8/1985 | Nimmo et al. | |
| 4,533,056 A | 8/1985 | Krikorian | |
| 4,548,327 A | 10/1985 | Kilkelly | |
| 4,603,781 A | 8/1986 | Ryan, Jr. | |
| D286,495 S * | 11/1986 | Blomdahl | D8/373 |
| D288,528 S | 3/1987 | Parad | |
| 4,646,998 A | 3/1987 | Pate | |
| 4,671,419 A | 6/1987 | Beverly | |
| D291,646 S | 9/1987 | Koziol | |
| 4,693,380 A | 9/1987 | Muth | |
| 4,708,552 A | 11/1987 | Bustos et al. | |
| D293,416 S | 12/1987 | Krueger | |
| 4,720,016 A | 1/1988 | Kay | |
| 4,728,238 A | 3/1988 | Chisholm et al. | |
| 4,732,284 A | 3/1988 | Remmers | |
| D295,182 S | 4/1988 | Remmers | |
| 4,735,325 A | 4/1988 | Remmers | |
| D295,472 S | 5/1988 | Remmers | |
| 4,781,349 A | 11/1988 | Remmers | |
| 4,783,035 A | 11/1988 | Remmers | |
| D298,801 S | 12/1988 | Satoh | |
| D299,212 S | 1/1989 | Murphy | |
| D299,436 S | 1/1989 | Muth | |
| 4,795,041 A | 1/1989 | Remmers | |
| 4,804,159 A | 2/1989 | Martel | |
| 4,830,531 A * | 5/1989 | Condit et al. | 403/348 |
| 4,838,451 A | 6/1989 | Arkell et al. | |
| D305,272 S | 12/1989 | Remmers | |
| 4,890,839 A | 1/1990 | Ayotte | |
| D311,860 S | 11/1990 | Remmers | |
| D312,389 S | 11/1990 | Remmers | |
| 5,074,223 A | 12/1991 | Remmers | |
| D323,452 S | 1/1992 | Stumpf et al. | |
| D323,715 S | 2/1992 | Bodurow et al. | |
| 5,086,936 A | 2/1992 | Remmers | |
| 5,110,080 A * | 5/1992 | Rieman | 248/225.11 |
| D326,605 S | 6/1992 | Nakanura | |
| 5,119,945 A | 6/1992 | Wiggins | |
| 5,133,463 A | 7/1992 | Merl | |
| 5,135,194 A * | 8/1992 | Laughon et al. | 248/243 |
| D334,497 S | 4/1993 | Putty | |
| D336,605 S | 6/1993 | Lemmerman et al. | |
| D340,639 S | 10/1993 | Remmers | |
| D342,015 S | 12/1993 | Andrejew | |
| 5,305,898 A * | 4/1994 | Merl | 211/87.01 |
| D348,826 S | 7/1994 | McCaffrey | |
| 5,326,062 A | 7/1994 | Remmers | |
| 5,330,063 A | 7/1994 | Remmers | |
| 5,351,842 A | 10/1994 | Remmers | |
| D353,500 S | 12/1994 | Remmers | |
| 5,386,959 A | 2/1995 | Laughlin et al. | |
| 5,407,084 A | 4/1995 | Remmers | |
| 5,472,103 A * | 12/1995 | Merl | 211/187 |
| 5,485,932 A * | 1/1996 | Romm et al. | 211/87.01 |
| 5,492,295 A | 2/1996 | Remmers | |
| D369,293 S | 4/1996 | Gusdorf et al. | |
| 5,509,541 A * | 4/1996 | Merl | 211/103 |
| 5,531,416 A | 7/1996 | Remmers | |
| 5,533,851 A | 7/1996 | Remmers | |
| D373,719 S | 9/1996 | Lin | |
| 5,580,018 A | 12/1996 | Remmers | |
| 5,584,405 A | 12/1996 | Tunzi | |
| 5,638,644 A * | 6/1997 | Bastian | 52/36.6 |
| 5,645,182 A | 7/1997 | Miller, Jr. et al. | |
| D392,553 S | 3/1998 | Dill | |
| 5,738,477 A | 4/1998 | McCorkle et al. | |
| D394,203 S | 5/1998 | Nadar | |
| 5,752,610 A | 5/1998 | Remmers | |
| 5,755,414 A | 5/1998 | Remmers | |
| D394,999 S | 6/1998 | Phillip | |
| 5,758,851 A | 6/1998 | Remmers | |
| 5,769,247 A * | 6/1998 | Merl | 211/103 |
| 5,788,093 A | 8/1998 | Krut | |
| 5,833,193 A | 11/1998 | Derda et al. | |
| D402,536 S | 12/1998 | Cousins | |
| D403,234 S | 12/1998 | Nagato | |
| D408,175 S | 4/1999 | Daniels et al. | |
| D409,866 S | 5/1999 | West | |
| D411,738 S | 6/1999 | Raasch et al. | |
| 5,909,936 A | 6/1999 | Daniels et al. | |
| 5,921,411 A * | 7/1999 | Merl | 211/90.01 |
| 5,921,412 A | 7/1999 | Merl | |
| 5,934,631 A | 8/1999 | Becker et al. | |
| 5,950,974 A * | 9/1999 | Hoffmann | 248/223.41 |
| 6,053,465 A | 4/2000 | Kluge | |
| D423,917 S | 5/2000 | Remmers et al. | |
| D427,466 S | 7/2000 | Remmers | |
| D437,515 S | 2/2001 | Remmers et al. | |
| 6,189,527 B1 | 2/2001 | Walsh et al. | |
| D443,456 S | 6/2001 | Horsten | |
| 6,279,467 B1 | 8/2001 | Tiemann | |
| 6,402,108 B1 | 6/2002 | Remmers | |
| 6,443,318 B1 | 9/2002 | Welsch | |
| 6,457,594 B1 | 10/2002 | Tiemann | |
| 6,467,860 B2 | 10/2002 | Remmers | |
| 6,494,653 B2 | 12/2002 | Remmers | |
| D470,398 S | 2/2003 | Remmers | |
| D477,144 S | 7/2003 | Remmers | |
| 6,626,509 B2 | 9/2003 | Remmers | |
| D482,601 S | 11/2003 | Chen | |
| 6,659,295 B1 * | 12/2003 | De Land et al. | 211/187 |
| 6,669,154 B1 | 12/2003 | Remmers | |
| D484,779 S | 1/2004 | Shibuya | |
| D485,109 S | 1/2004 | Oberhaus | |
| 6,688,568 B1 * | 2/2004 | Moufflet | 248/225.11 |
| D490,690 S | 6/2004 | Brass et al. | |
| D497,738 S | 11/2004 | Sparkowski | |
| 6,840,593 B2 | 1/2005 | Remmers | |
| D506,385 S * | 6/2005 | Brown | D8/396 |
| 6,915,913 B2 | 7/2005 | Cardinell | |
| 6,918,499 B2 * | 7/2005 | De Land et al. | 211/187 |
| 6,932,225 B2 * | 8/2005 | Rowe | 211/90.02 |
| 6,953,176 B2 | 10/2005 | Remmers | |
| D513,970 S | 1/2006 | Sterling et al. | |
| 7,004,335 B2 | 2/2006 | Remmers | |
| 7,021,730 B2 | 4/2006 | Remmers | |
| D522,848 S | 6/2006 | Nawrocki | |
| D522,852 S | 6/2006 | Nawrocki | |
| D523,327 S | 6/2006 | Clarke | |
| 7,063,491 B2 | 6/2006 | French | |
| D525,115 S | 7/2006 | Harwanko | |
| D525,811 S | 8/2006 | Nawrocki | |
| D526,519 S | 8/2006 | Nawrocki | |
| D526,887 S | 8/2006 | Remmers et al. | |
| 7,086,543 B2 | 8/2006 | Remmers | |
| 7,086,544 B1 * | 8/2006 | Doench | 211/105.1 |
| 7,090,317 B2 | 8/2006 | Remmers | |
| D527,559 S | 9/2006 | Remmers | |
| D527,935 S | 9/2006 | Remmers | |
| D531,019 S | 10/2006 | Plumer | |
| D531,891 S | 11/2006 | Nawrocki | |

| | | |
|---|---|---|
| 7,174,605 B1 | 2/2007 | Nawrocki |
| 7,185,772 B2 | 3/2007 | Remmers |
| 7,188,740 B2 | 3/2007 | Marchetta et al. |
| D543,094 S | 5/2007 | Remmers |
| D544,260 S | 6/2007 | Nawrocki |
| D544,261 S | 6/2007 | Nawrocki |
| 7,225,935 B2 * | 6/2007 | Breymaier et al. ........ 211/94.01 |
| D547,163 S | 7/2007 | Xayoiphonh |
| D547,164 S | 7/2007 | Xayoiphonh |
| D547,640 S | 7/2007 | Remmers |
| 7,240,803 B2 * | 7/2007 | Stitchick et al. ............. 211/106 |
| 7,255,237 B2 * | 8/2007 | Stitchick et al. ............. 211/106 |
| D550,072 S | 9/2007 | Ardern |
| D550,540 S | 9/2007 | Nawrocki |
| D551,062 S | 9/2007 | Nawrocki |
| D551,884 S | 10/2007 | Remmers |
| D553,485 S | 10/2007 | Hall |
| 7,296,697 B2 | 11/2007 | Costa et al. |
| D559,090 S | 1/2008 | Nawrocki |
| 7,314,144 B2 | 1/2008 | Stitchick et al. |
| D562,670 S | 2/2008 | Rogers et al. |
| D567,074 S | 4/2008 | Gallien |
| D569,715 S * | 5/2008 | Fernandez ..................... D8/377 |
| 7,387,212 B2 * | 6/2008 | Costa et al. ................ 211/90.01 |
| 7,392,911 B2 * | 7/2008 | Stitchick et al. ........... 211/90.02 |
| 7,401,705 B2 * | 7/2008 | Craft ........................... 211/90.01 |
| 7,407,060 B2 * | 8/2008 | Swartz et al. ............. 211/94.01 |
| D578,869 S * | 10/2008 | Fernandez ..................... D8/354 |
| D580,258 S * | 11/2008 | Fernandez ..................... D8/381 |
| D581,260 S * | 11/2008 | Fernandez ..................... D8/381 |
| D581,776 S | 12/2008 | Yin-Feng |
| 7,458,548 B2 | 12/2008 | Franzone et al. |
| D585,730 S * | 2/2009 | Fernandez ..................... D8/387 |
| D587,562 S * | 3/2009 | Fernandez ..................... D8/381 |
| 7,506,772 B2 * | 3/2009 | Chen ............................. 211/103 |
| D589,780 S * | 4/2009 | Fernandez ..................... D8/330 |
| 7,516,930 B2 * | 4/2009 | Chen ............................. 248/304 |
| D596,931 S * | 7/2009 | Fernandez ..................... D8/381 |
| D602,770 S * | 10/2009 | Fernandez ..................... D8/376 |
| D621,244 S * | 8/2010 | Kundinger et al. ........... D8/381 |
| 2002/0090278 A1 | 7/2002 | Lai |
| 2002/0153335 A1 | 10/2002 | Robideau |
| 2002/0166934 A1 | 11/2002 | Marsh |
| 2003/0231941 A1 | 12/2003 | Kenny |
| 2003/0233965 A1 * | 12/2003 | Brazier ........................ 108/108 |
| 2003/0234231 A1 * | 12/2003 | Rowe ........................ 211/90.02 |
| 2004/0007550 A1 * | 1/2004 | Leeman et al. ............... 211/189 |
| 2004/0045919 A1 * | 3/2004 | Remmers .................... 211/90.02 |
| 2004/0108288 A1 * | 6/2004 | Breymaier et al. ........ 211/94.01 |
| 2005/0011420 A1 * | 1/2005 | Costa et al. .................... 108/108 |
| 2005/0109720 A1 | 5/2005 | Marchetta |
| 2005/0109901 A1 * | 5/2005 | Stitchick et al. .............. 248/235 |
| 2005/0145147 A1 | 7/2005 | Costa et al. |
| 2005/0145588 A1 * | 7/2005 | Stitchick et al. .............. 211/183 |
| 2005/0148942 A1 | 7/2005 | Newby et al. |
| 2005/0150436 A1 * | 7/2005 | Marchetta et al. ............ 108/108 |
| 2005/0150850 A1 * | 7/2005 | Stitchick et al. ........... 211/90.03 |
| 2005/0247651 A1 | 11/2005 | Craft |
| 2005/0284828 A1 * | 12/2005 | Remmers .................... 211/94.01 |
| 2006/0011568 A1 | 1/2006 | Remmers et al. |
| 2006/0011570 A1 * | 1/2006 | Chen ............................. 211/183 |
| 2006/0102817 A1 * | 5/2006 | Swartz et al. ................. 248/243 |
| 2006/0113443 A1 | 6/2006 | Remmers |
| 2006/0130983 A1 | 6/2006 | Nien |
| 2006/0175495 A1 | 8/2006 | Gregory |
| 2007/0023374 A1 | 2/2007 | Nawrocki |
| 2007/0068887 A1 | 3/2007 | Nawrocki |
| 2007/0101545 A1 | 5/2007 | Nawrocki |
| 2007/0102604 A1 | 5/2007 | Nawrocki |
| 2007/0108146 A1 | 5/2007 | Nawrocki |
| 2007/0108148 A1 | 5/2007 | Stitchick et al. |
| 2007/0114197 A1 | 5/2007 | Remmers |
| 2007/0114348 A1 | 5/2007 | Nawrocki |
| 2007/0119805 A1 | 5/2007 | Nawrocki |
| 2007/0134072 A1 | 6/2007 | Su |
| 2007/0137417 A1 | 6/2007 | Nawrocki et al. |
| 2007/0159040 A1 | 7/2007 | Fernandez et al. |
| 2007/0187561 A1 | 8/2007 | Xayoiphonh |
| 2007/0205172 A1 | 9/2007 | Stitchick et al. |
| 2007/0241072 A1 * | 10/2007 | Bryant et al. ............. 211/90.02 |
| 2007/0257169 A1 * | 11/2007 | Taggett .................... 248/220.41 |
| 2008/0047098 A1 | 2/2008 | Nawrocki |
| 2009/0139943 A1 * | 6/2009 | Fernandez ................. 211/94.01 |

FOREIGN PATENT DOCUMENTS

| | | |
|---|---|---|
| FR | 2717994 A1 | 10/1995 |
| GB | 2153205 A | 8/1985 |
| GB | 2180141 A | 3/1987 |
| GB | 2229625 A | 10/1990 |
| JP | 10002663 | 1/1998 |
| WO | WO 2004/056236 | 7/2004 |

* cited by examiner

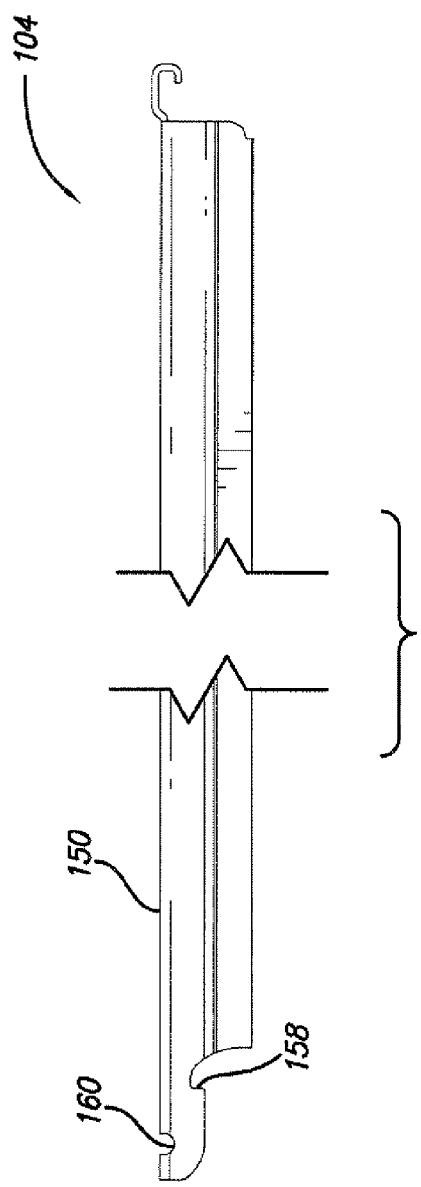

STANDARD AND TRACK SHELVING SYSTEMS

FIELD

The present disclosure relates generally to the use of tracks and standards for supporting shelving/shelf brackets and other components.

BACKGROUND

The statements in this section merely provide background information related to the present disclosure and may not constitute prior art.

Standards may be used for supporting shelving or shelf brackets. A typical standard may include a relatively narrow strip of material with two columns of slots on the front surface thereof. The standard may be mounted vertically against a wall. Shelving brackets may be supported from the standard by inserting tabs of the shelving brackets into corresponding slots of the standard. The standard may be fixedly mounted to a wall using screws such that the standard is not generally adjustable, movable, or removable from its installed position.

SUMMARY

According to one aspect of the present disclosure, various embodiments of adjustable shelving systems are provided. In one exemplary embodiment, a shelving system generally includes at least one track and at least one standard. The track includes a rearward portion and a forward portion. The forward portion includes a downwardly-extending retaining lip with an inwardly protruding portion, a generally upwardly-facing horizontal support surface, and an opening cooperatively defined by the retaining lip and support surface along at least a portion of the length of the track. The standard includes an end portion slidably receivable within the opening of the track, such that the position of the standard relative to the track is slidably adjustable along the track. The end portion of the standard includes an upper portion configured to contact the track's retaining lip, at least one opening for receiving the inwardly protruding portion of the track's retaining lip, and a generally downwardly-facing horizontal support surface that contacts the generally upwardly-facing horizontal support surface of the track when the standard is supported by the track with the standard's end portion slidably received within the track's opening.

Another exemplary embodiment provides an assembly for supporting a hang rod from a shelving bracket having a lower portion with openings. In this exemplary embodiment, the assembly generally includes a hang rod mounting bracket and a saddle. The hang rod mounting bracket includes a first end portion with tabs receivable within the openings of the shelving bracket to mount the hang rod mounting bracket to the shelving bracket. The hang rod mounting bracket also includes a second end portion generally opposite the first end portion. The hang rod mounting bracket further includes a curved portion extending generally between the first and second end portions such that the hang rod mounting bracket has a generally J-shaped profile configured to allow a clothes hanger to slide along the hang rod freely past the hang rod mounting bracket without interference therefrom. The saddle includes an upper saddle portion and a lower portion with an opening for receiving the second end portion of the hang rod mounting bracket to thereby mount the saddle to the hang rod mounting bracket. The upper saddle portion is configured for receiving at least a portion of the hang rod therein.

In a further exemplary embodiment, a shelving system generally includes at least one locking member and at least one shelving bracket having openings. The locking member is coupled to the shelving bracket for pivotal movement between at least an unlocked position and a locked position. When in the locked position, the locking member releasably locks in place a portion of a shelf at least partially supported by the shelving bracket. The locking member may include protruding portions on generally opposite sides of the locking member. The protruding portions are receivable within the corresponding openings of the shelving bracket to thereby pivotably couple the locking member to the shelving bracket. The locking member may also include a locking finger that defines an opening for receiving the portion of the shelf therein when the locking member is in the locked position. The locking member may also include a lever for causing pivotal movement of the locking member between the unlocked and locked positions.

An additional embodiment of a shelving system includes generally at least one track and at least one mounting screw. The track includes a forward portion and a rearward portion having a recessed slot extending at least partially along the length of the track and a downwardly extending lip. The mounting screw has a slotted head with an axial groove extending circumferentially along the slotted head. The slotted head is slidably receivable within the track's recessed slot. The track's downwardly extending lip is receivable within the axial groove. Accordingly, the position of the mounting screw relative to the track may be slidably adjustable along the track.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 22 is a bottom view of the standard shown in FIG. 20;

FIG. 23 is a top view of the standard shown in FIG. 20;

FIG. 24 is a side view of the standard shown in FIG. 20;

DETAILED DESCRIPTION

The following description is merely exemplary in nature and is not intended to limit the present disclosure, application, or uses.

Figure 1:
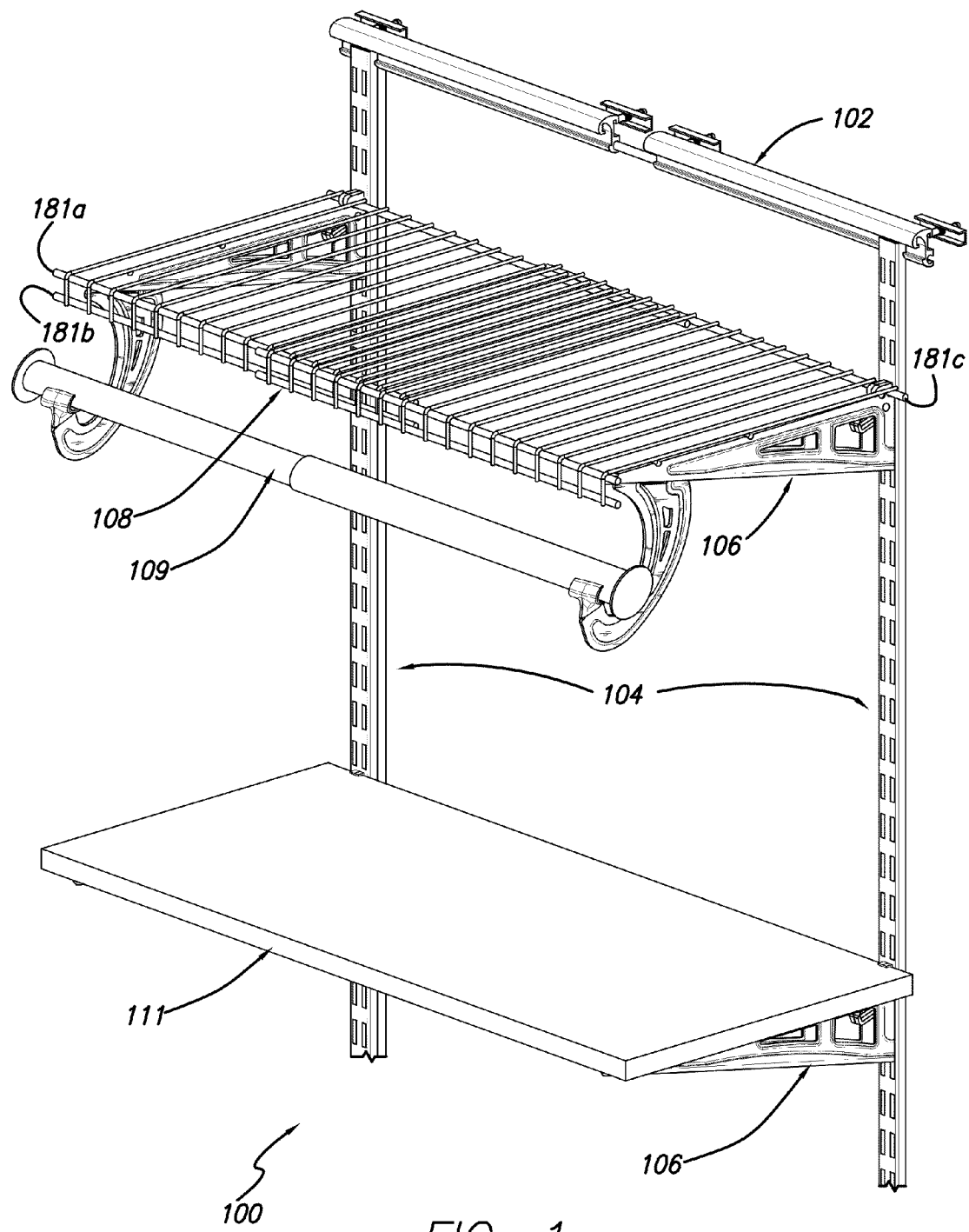
FIG. 1 is a perspective view of an exemplary embodiment of an adjustable shelving system.

According to aspects of the present disclosure, various exemplary embodiments of adjustable shelving systems are provided. One exemplary embodiment of an adjustable shelving system is indicated generally as 100 in FIG. 1. As shown in FIG. 1, the adjustable shelving system 100 generally includes an adjustable track or rail assembly 102, standards 104 that may be supported (e.g., positioned on and received, etc.) by the adjustable track assembly 102, shelf/shelving brackets 106 that may be supported from the standards 104, a ventilated or wire shelf 108 that may be supported atop by the brackets 106, a hang/hanger rod assembly 109, and a shelf 111 (e.g., laminate shelf, wooden shelf, etc.) that may also be supported by brackets 106. The various components and assemblies 102, 104, 106, 108, 109, 111 of the shelving system 100 are described in more detail herein. In other embodiments, a shelving system may include any one or more (but not necessarily all) of the components and/or assemblies 102, 104, 106, 108, 109, 111, as the components and/or assemblies 102, 104, 106, 108, 109, 111 may be implemented individually or in any combination with any one or more of the other components and/or assemblies 102, 104, 106, 108, 109, 111. Accordingly, aspects of the present disclosure also include the individual components themselves of the adjustable shelving systems and assemblies disclosed herein. In addition, exemplary embodiments disclosed herein include systems, and components thereof that may provide greater support and consumer flexibility to closet shelving arrangements.

Figure 2:
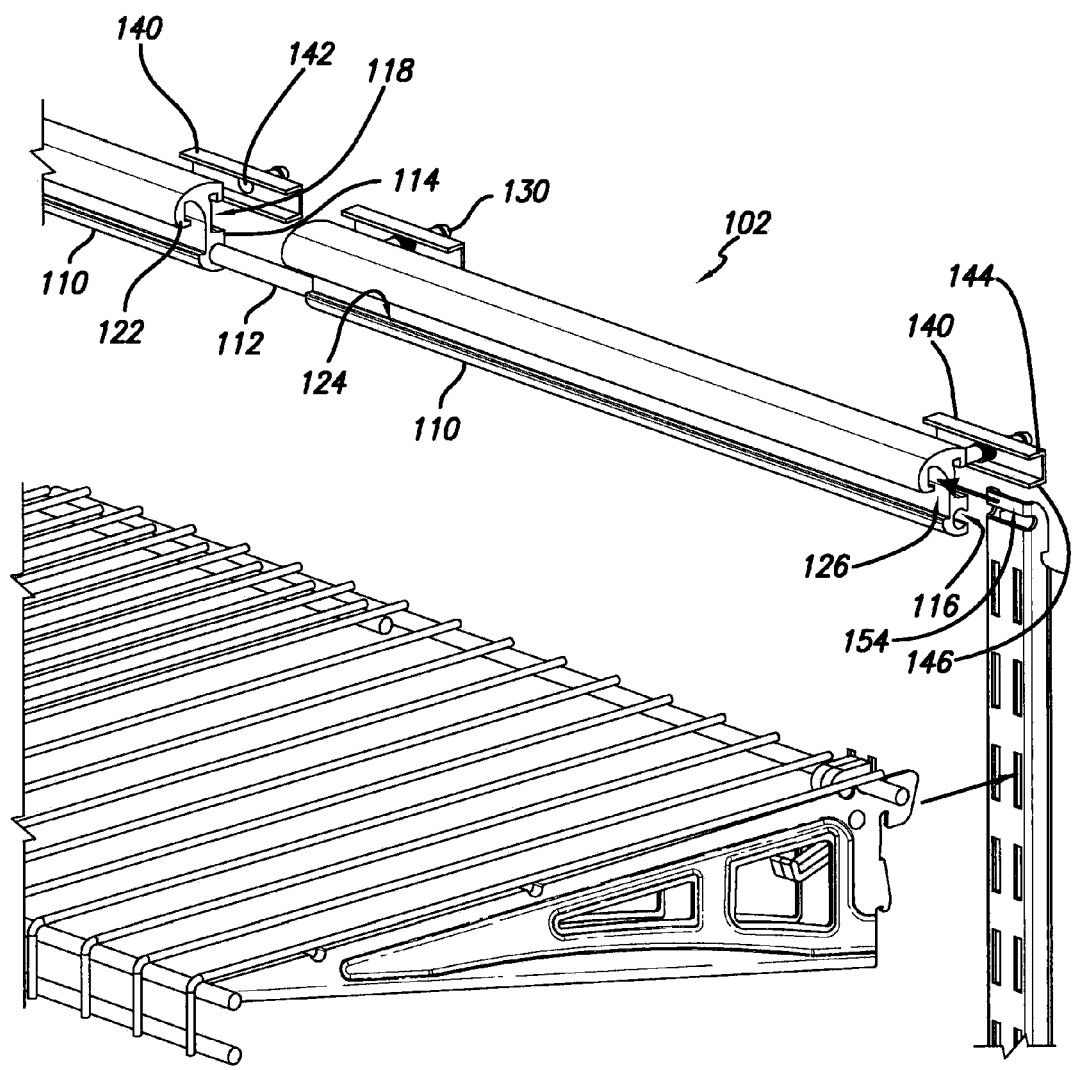
FIG. 2 is an un-assembled partial perspective view of an upper portion of the adjustable shelving system shown in FIG. 1, and illustrating the standard's end portion aligned for slidable engagement with the track (as represented by an arrow) and also illustrating the shelf/shelving bracket's tabs aligned for insertion within slots of the standard (as represented by the arrow)

Referring to FIGS. 1 and 2, the illustrated adjustable track assembly 102 includes at least two tracks or rails 110. Each track 110 may be identical to the other track 110, or they may be different. By way of example only FIGS. 12 through 19 illustrate an exemplary embodiment of a track 110 that may be used in the adjustable shelving system 100 shown in FIGS. 1 and 2. Other embodiments, however, may include differently configured tracks and/or more or less than two tracks or rails 110. Additional embodiments may include one or more tracks or rails longer or shorter relative to the other components than what is shown in FIGS. 1 and 2.

Also shown in FIG. 2, the adjustable track assembly 102 includes a member 112 (e.g., cylindrical connector rod, etc.) that may be configured to operate or function as a spacer and/or stabilizer between two tracks 110. The member 112 may be various configured, sized, shaped and/or constructed of any suitable materials, such as metals, metal alloys, plastics, etc. In one exemplary embodiment, the member 112 is made of a wire and is dimensionally sized with a length of about four inches and outer radius of one-fourth inch. In addition, the member 112 may have chamfered or tapered end portions to facilitate the insertion of the member's end portions into an opening. Alternative embodiments may include one or more members 112 having a different configuration (e.g., size, shape, material, etc.) than that just described.

As shown in FIG. 2, a recess or channel 116 may extend along the back side 114 (FIG. 12) of the track 110. In this particular embodiment, the recess or channel 116 is generally cylindrically-shaped with a generally C-shaped profile. The recess 116 extends the length of the track 110. The member, or more specifically in this embodiment shown in FIG. 2, the cylindrical rod 112 may be slidably received within the recess 116 such that the tracks 110 may be slidably positioned relative to the rod 112 to adjust the spacing between the tracks 110, and thus adjust the overall or combined track length for the system 100. In other embodiments, the recess 116 may have a different configuration (e.g., different shape, different profile, etc.) depending, for example, on the corresponding shape of the member 112.

The front side 120 (FIG. 12) of the track 110 has a downwardly extending retaining lip 122 and a support surface 124. Collectively, the lip 122 and support surface 124 together define an opening or channel 126 in which an end portion 154 of a standard 104 may be engagingly received (as represented by the arrow in FIG. 2). By way of example only, FIGS. 20 through 26 illustrate an exemplary embodiment of a standard 104 that may be suspended from or supported by the track 110 shown in FIGS. 1-3 and 12-19.

Figure 3:
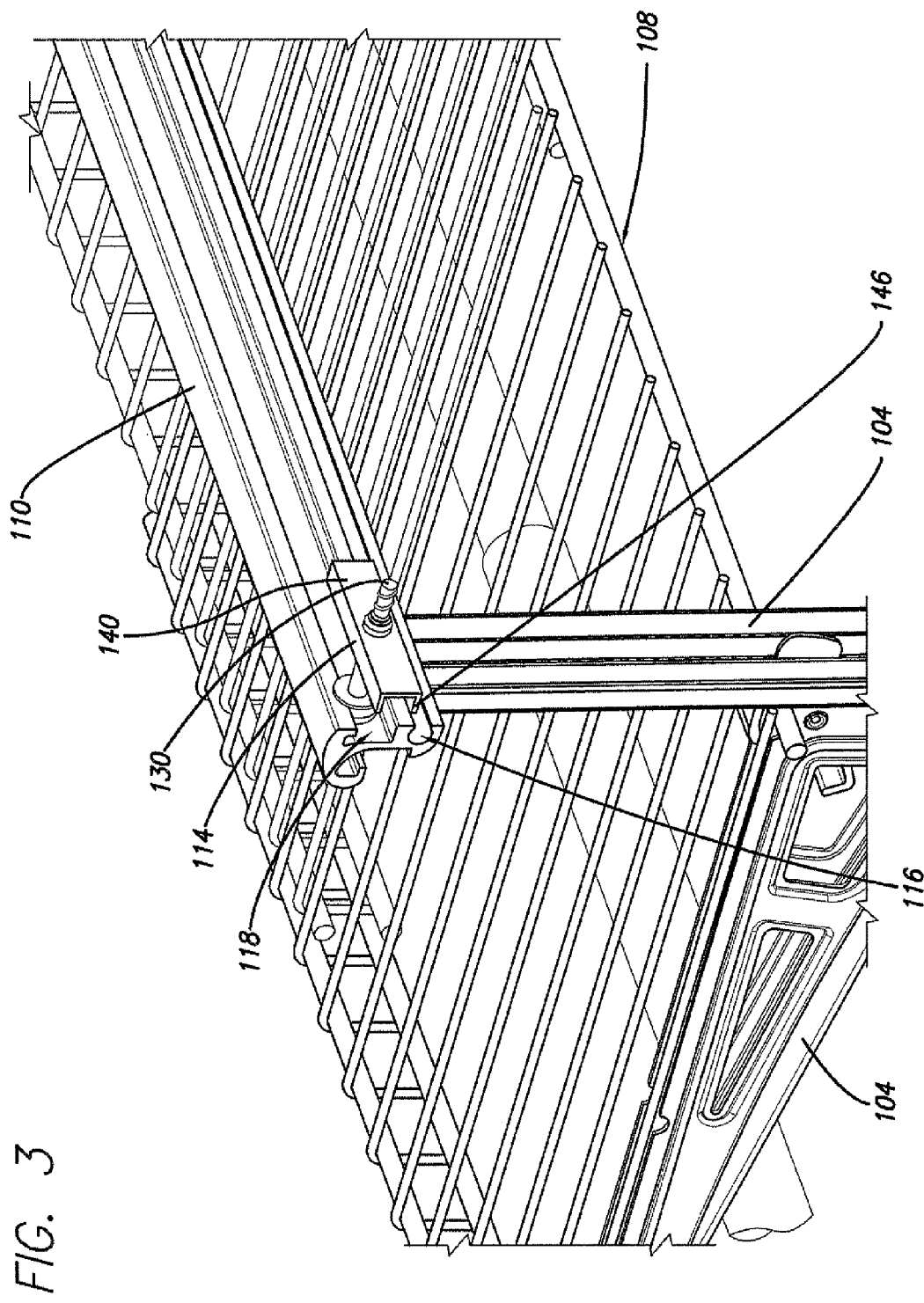
FIG. 3 is a partial back perspective view of the upper portion of the adjustable shelving system shown in FIG. 1, and illustrating exemplary hardware for mounting a track to a wall according to exemplary embodiments.

Along the back side 114 of the track 110, a recessed slot or channel 118 may extend along the length of the track 110. The recessed slot or channel 118 may be configured (e.g., shaped, sized, located, etc.) for receiving the head 134 of a mounting screw 130. The track 110 may also include a downwardly extending portion or lip 119. This lip 119 may be configured to be engaged within an axial groove 132 of a mounting screw's slotted head 134, when the mounting screw's head 134 is slidably received within the track's recessed slot 118. This arrangement may thus allow the position of the mounting screw 130 relative to the track 110 to be slidably adjustable along the track 110. Plus, the engagement of the track's lip 119 within the axial groove 132 of the mounting screw 130 may help inhibit disengagement or dislodgement of the track 110 from the mounting screw 130. Exemplary hardware that may be used for mounting the track 110 to a wall or another surface is shown in FIG. 3.

Figure 4:
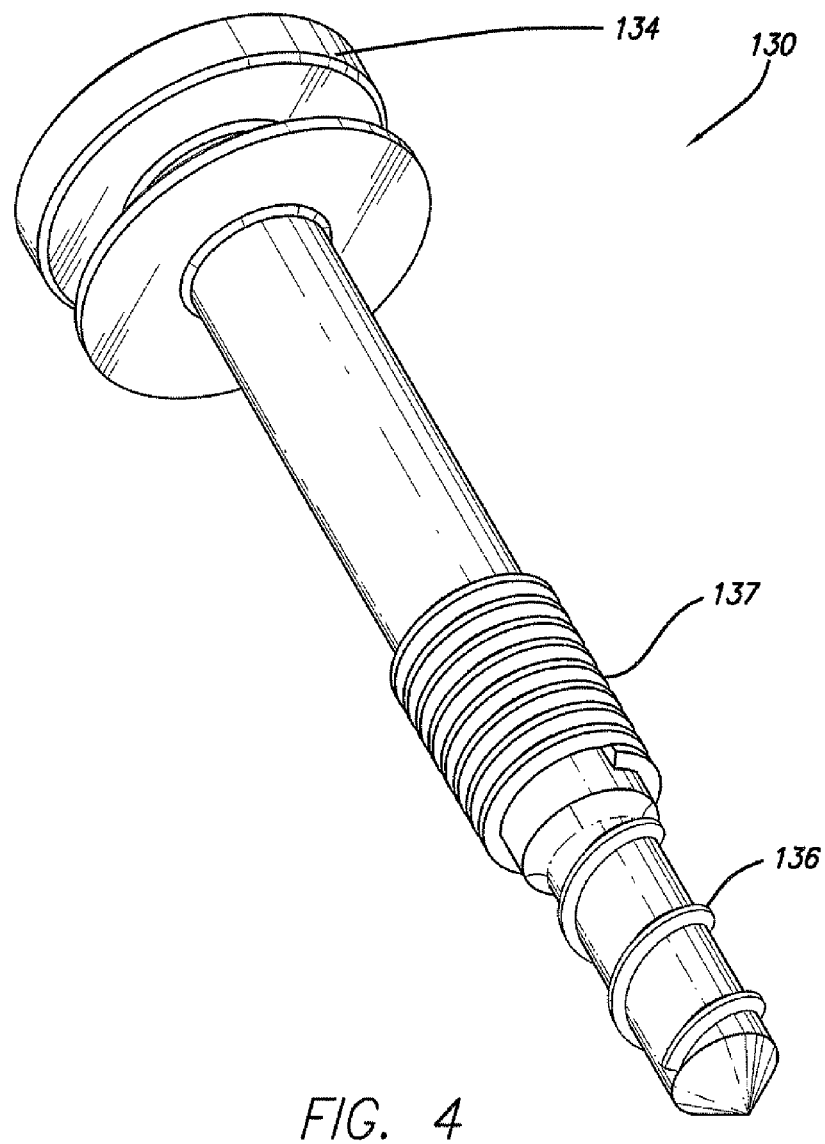
FIG. 4 is a front perspective view of an exemplary mounting screw that may be used with the adjustable shelving system shown in FIG. 1 for attaching a track to a wall, and illustrating the mounting screw's self-drilling feature according to exemplary embodiments.
Figure 5:
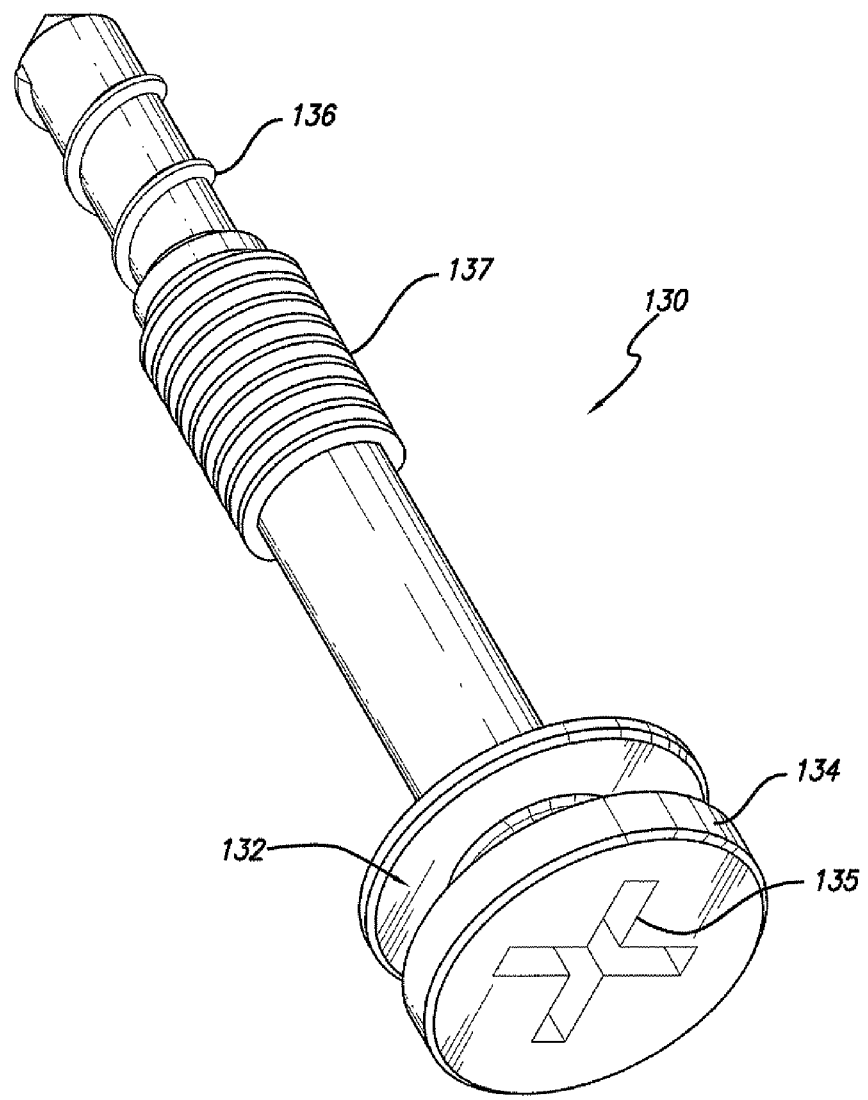
FIG. 5 is a back perspective view of the mounting screw shown in FIG. 4.
Figure 6:
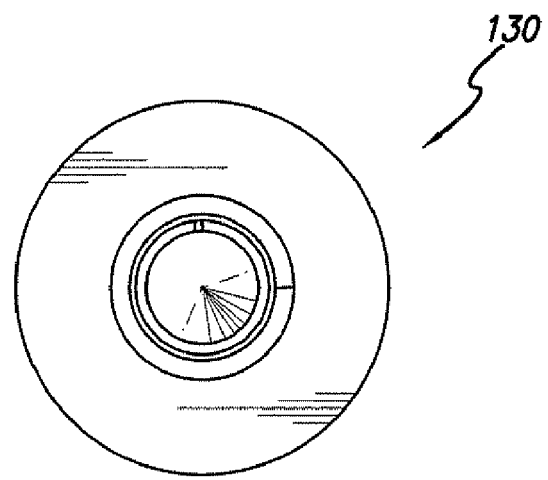
FIG. 6 is a front view of the mounting screw shown in FIG. 4.
Figure 7:
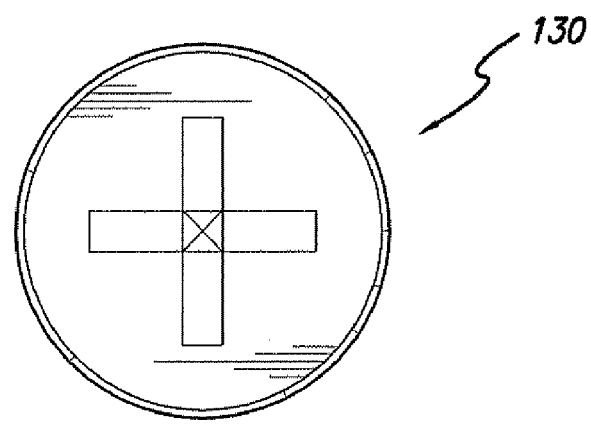
FIG. 7 is a back view of the mounting screw shown in FIG. 4.
Figure 8:
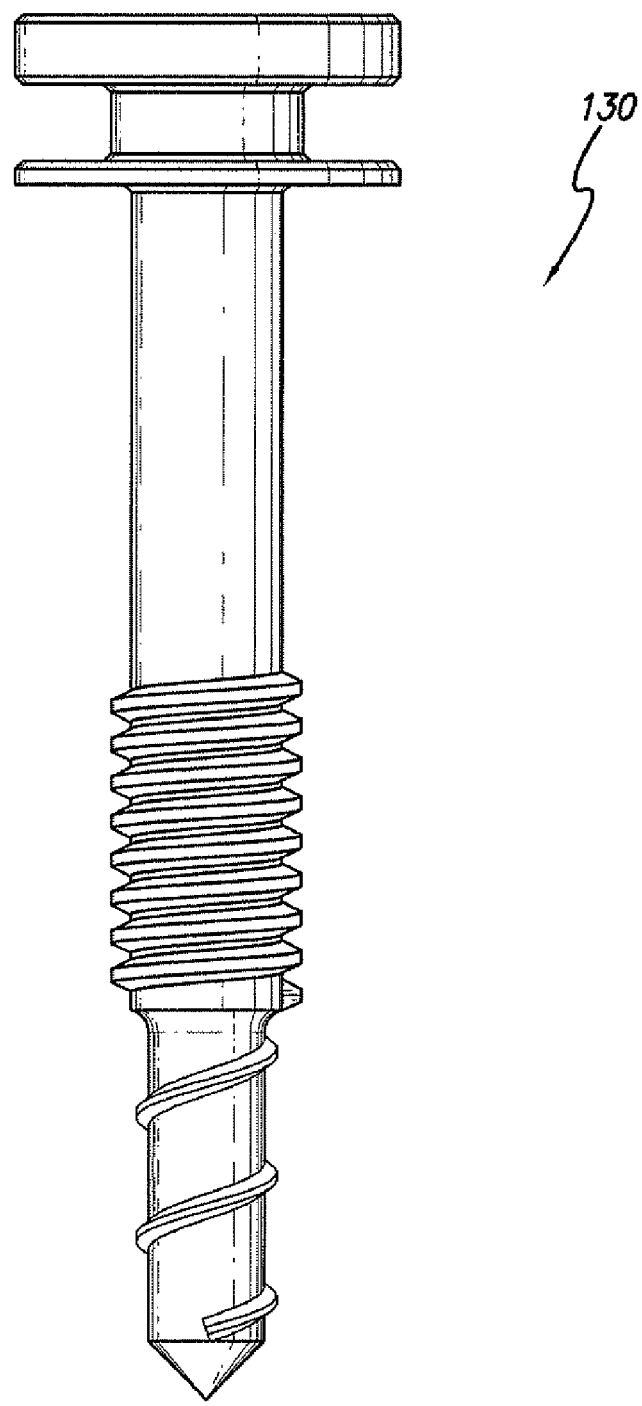
FIGS. 8 through 11 are side views of the mounting screw shown in FIG. 4.
Figure 9:
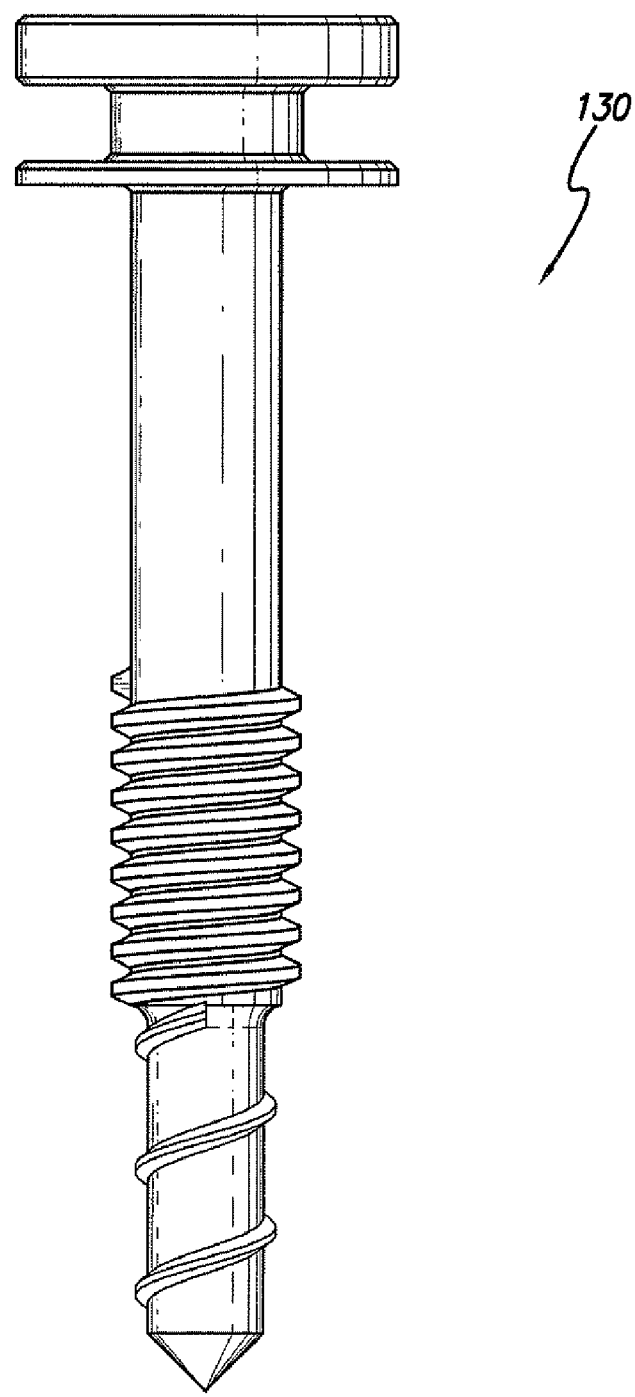
Figure 10:
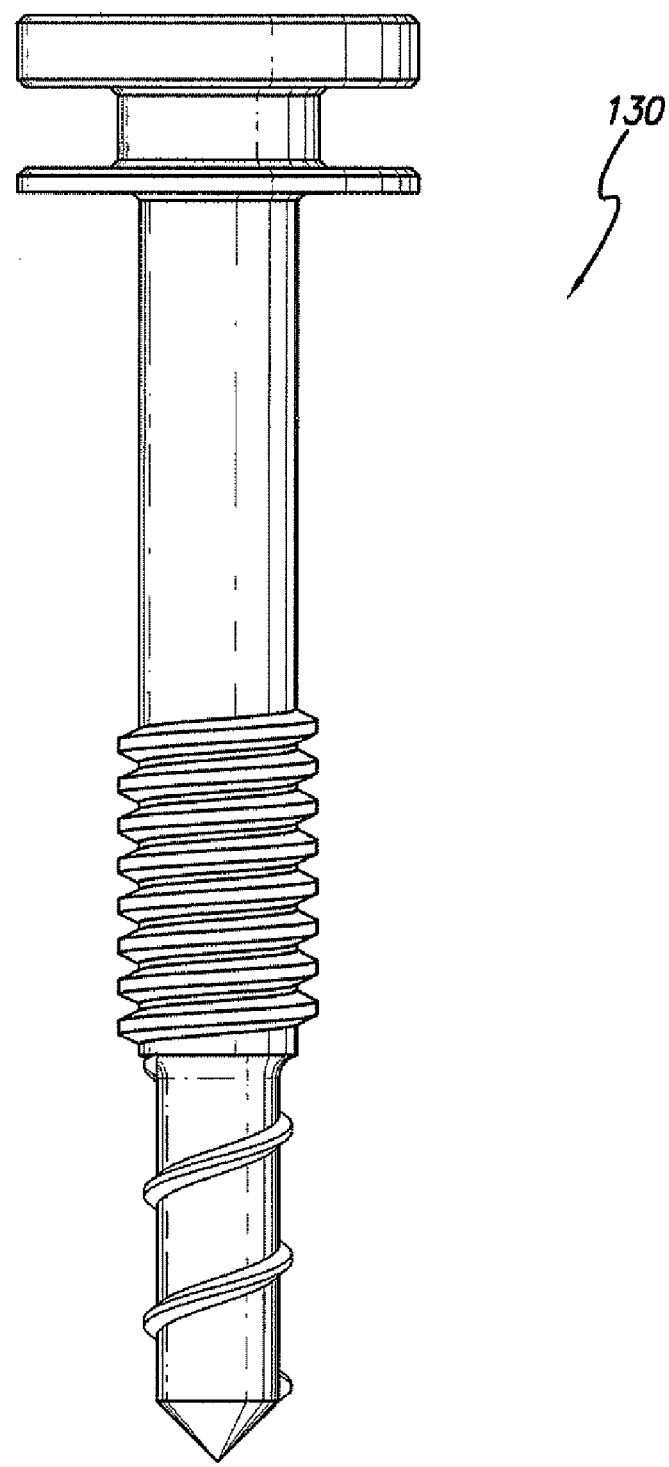
Figure 11:
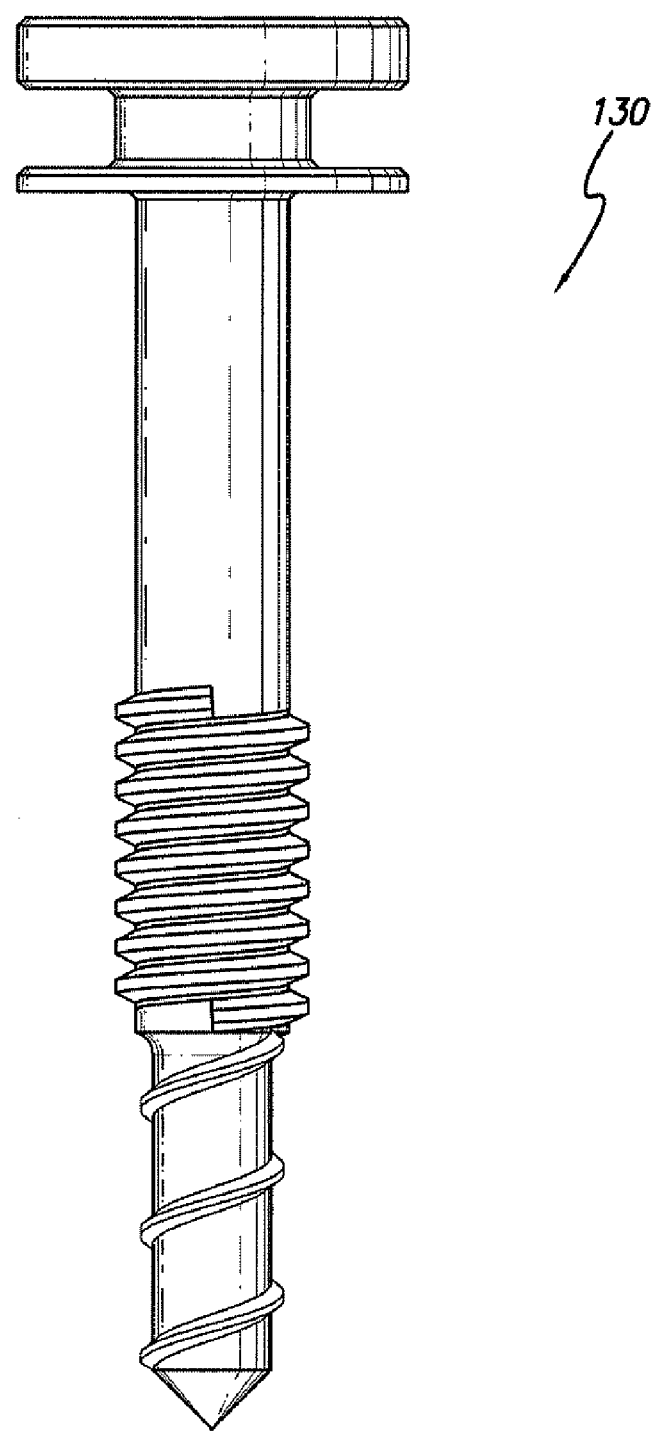
Figure 12:
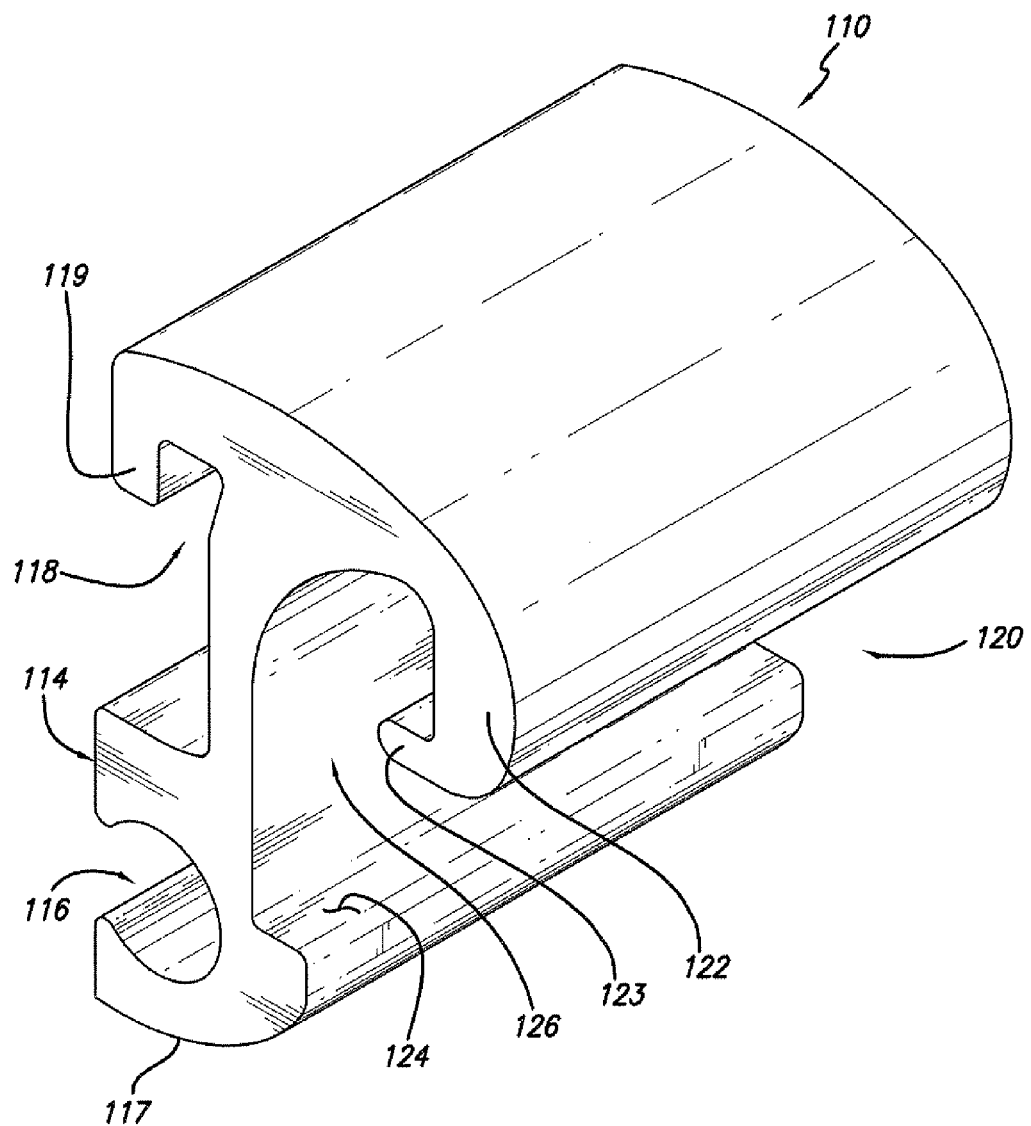
FIG. 12 is a front perspective view of an exemplary track of the adjustable shelving system shown in FIG. 1, where the track may be mounted to a wall and used for supporting a standard according to exemplary embodiments.
Figure 13:
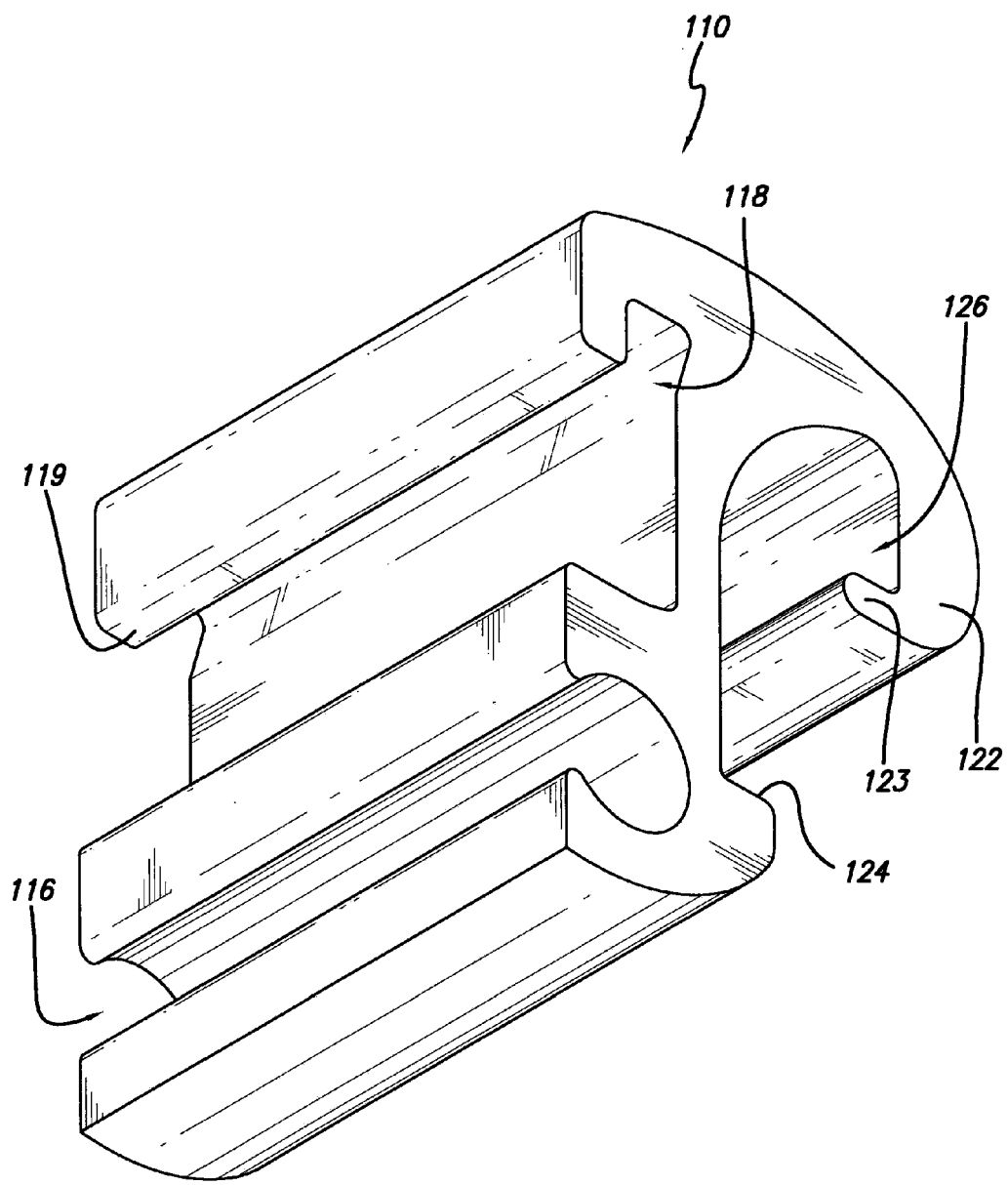
FIG. 13 is a back perspective view of the track shown in FIG. 12.
Figure 14:
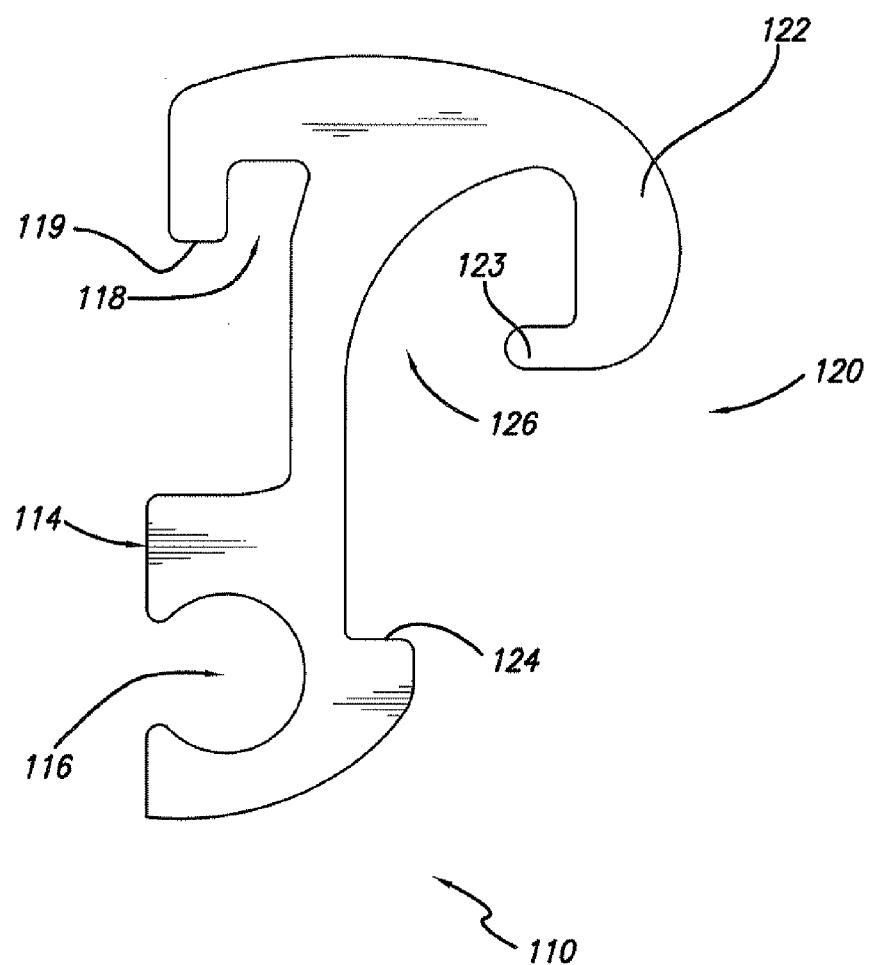
FIG. 14 is a left side end view of the track shown in FIG. 12.
Figure 15:
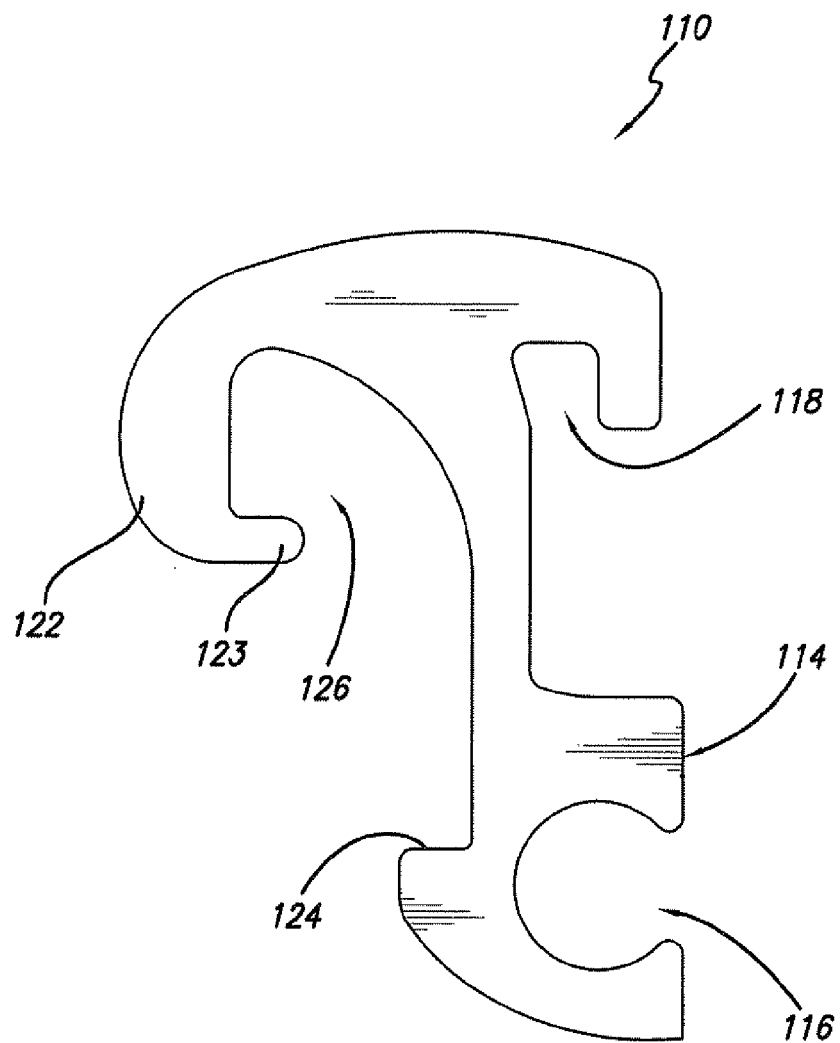
FIG. 15 is a right side end view of the track shown in FIG. 12.
Figure 16:
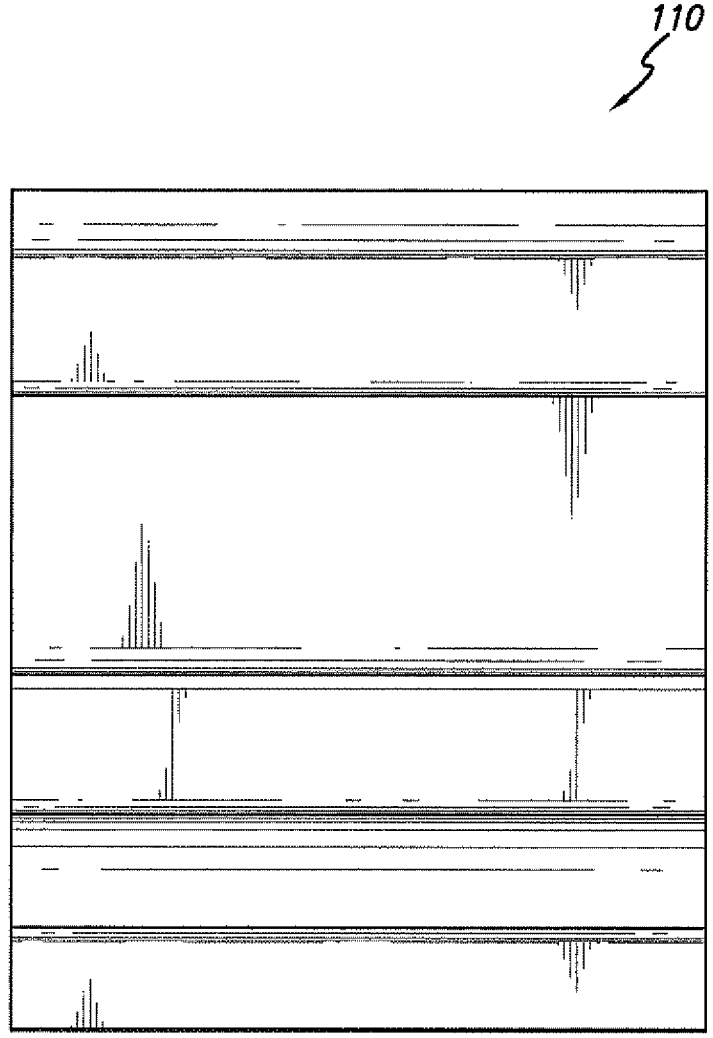
FIG. 16 is a back view of the track shown in FIG. 12.
Figure 17:
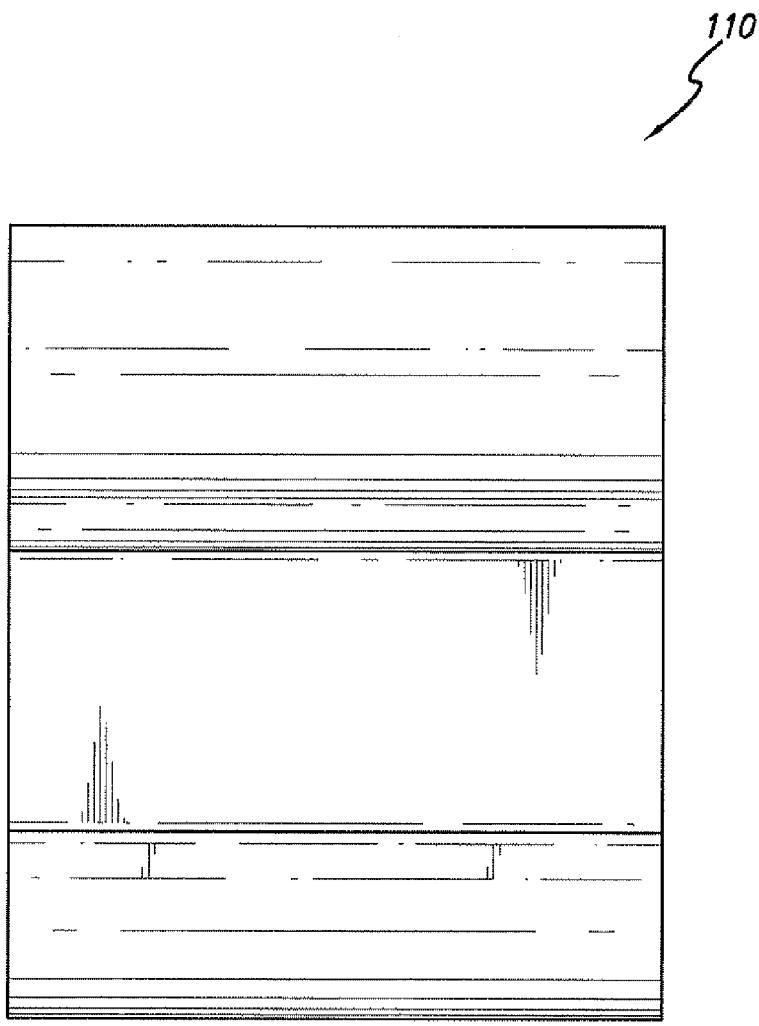
FIG. 17 is a front view of the track shown in FIG. 12.
Figure 18:
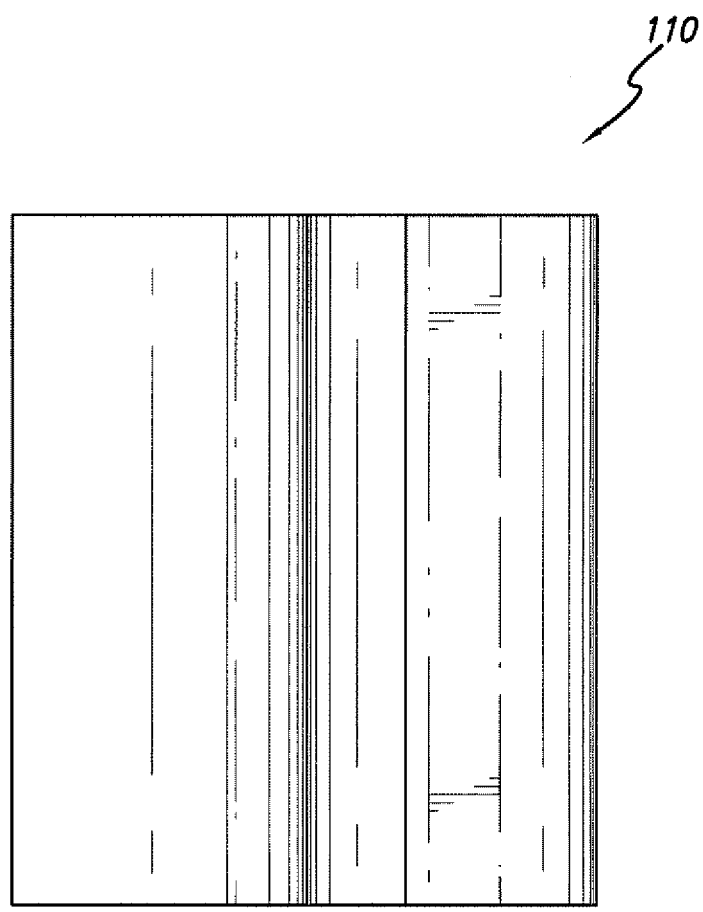
FIG. 18 is a bottom view of the track shown in FIG. 12.
Figure 19:
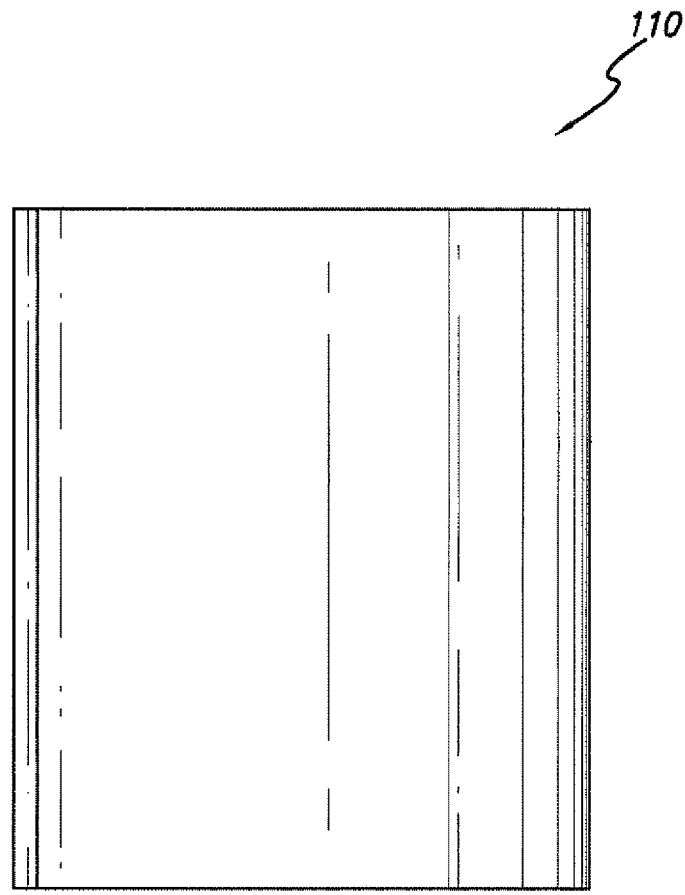
FIG. 19 is a top view of the track shown in FIG. 12.

By way of further example, FIGS. 4 through 11 illustrate an exemplary embodiment of a mounting screw 130 with a self-drilling feature that may be used when mounting the standard 110. As shown in FIGS. 4 through 11, the mounting screw 130 has an axial groove or slot 132 extending circumferentially around the head 134 of the screw 130, to define a slotted head 134 as shown in FIG. 5. The head of the screw 134 may also include a tool reception feature 135, which is configured for a Phillips screwdriver in the illustrated embodiment of FIG. 5. Alternative embodiments may be configured differently, such as configurations for use with a regular screwdriver, hex key, Allen wrench, etc.

With continued reference to FIGS. 4 and 5, the screw 130 may also include a self-drilling feature or thread 136 on the end portion of the screw 130. In some embodiments, the self-drilling feature 136 is configured to allow the screw 130 to be screwed into a surface (e.g., wooden stud, sheet rock, etc.) without requiring any pre-drilling of a hole for the screw 130, as the self-drilling feature 136 would create the hole. Accordingly, providing the self-drilling feature 136 allow for a faster and easier installation, as the screw 130 may be used directly in a wood wall stud without pre-drilling and/or the screw may 130 may be used in conjunction with ¼"-20 sheet rock toggle type fasteners. With the screw 130 installed, the screw 130 allows a track (e.g., track 110, etc.) to snap lock in place and allow the track to freely slide horizontally on the fastener such that additional tracks maybe installed without removal of the existing system. The fastener provides a snap lock mounting platform for additional accessories and cabinets.

In some embodiments, the mounting screw's threaded portion 137 may comprise a mechanical ¼"-20 thread, and the self-drilling feature 136 may comprise a #8 wood fastener screw thread for self-drilling into wood (no pre-drilling required). The major diameter of the self-drilling feature thread may be less than the minor diameter of ¼ inch-20 UNC. The mounting screw 130 may be formed from steel or other suitable material. Alternative embodiments may include screws or other fasteners with other configurations (e.g., shapes, sizes, threads, materials, etc.).

As shown in FIG. 2, a mounting channel member 140 may be used in conjunction with the mounting screw 130 for mounting the track 110 to a wall or other surface. The mounting channel member 140 includes an opening or hole 142 for receiving therethrough a portion of the mounting screw 130. In this particular embodiment, the mounting channel member 140 has a generally U-shaped cross-section with an upper lip 144 and a lower lip 146. The mounting screw 130 and mounting channel member 140 may be mounted to a wall or other surface as shown in FIG. 2. When the mounting screw 130 and mounting channel member 140 are affixed or mounted onto a wall, they provide for alignment and mounting of the track 110. The track's recessed slot 118 may also be configured to receive the slotted head 134 of the mounting screw 130, as shown in FIG. 3. During an exemplary installation process of the track 110 to a wall, the mounting screw 130 may thus be slidably moved along the track 110 within the track's recessed slot 110, for example, to align the mounting screw 130 with a stud behind a wall, etc.

Additionally, the track's recessed slot 118 and cylindrically-shaped recess 116 may be spaced apart so as to respectively receive the upper lip 144 and the lower lip 146 of the mounting channel member 140, which may assist the installer with the horizontal aligning the track 110. By mounting the track 110 using the screw 130 and mounting channel member 140 in this exemplary manner, the track 110 may be installed relatively easily, quickly, and securely as the track 110, screw 130, and mounting channel member 140 cooperatively prevent (or at least inhibit) the track 110 from being inadvertently dislodged, such as when inadvertently bumped by a person walking by, etc.

The track 110 may be constructed of any material suitable for tracks, depending, for example, on the method used for making the track 110. By way of example, the track 110 may be formed from aluminum, steel, plastic, extrudable materials, metal alloys, etc. In the illustrated embodiment of FIGS. 12 through 19, the track or rail 110 has a profile suitable for an extrusion process such that the track 110 may be formed by extruding aluminum. Alternative embodiments may include a track formed by using other processes besides extrusion and/or from other materials besides aluminum. The track 110 may also be provided in various lengths. In some embodiments, the track 110 has a length that allows the standard 104 to slide horizontally along the length of the track 110, thereby allowing for selective slidable adjustment of the standard's positioning relative to the track 110.

Figure 20:
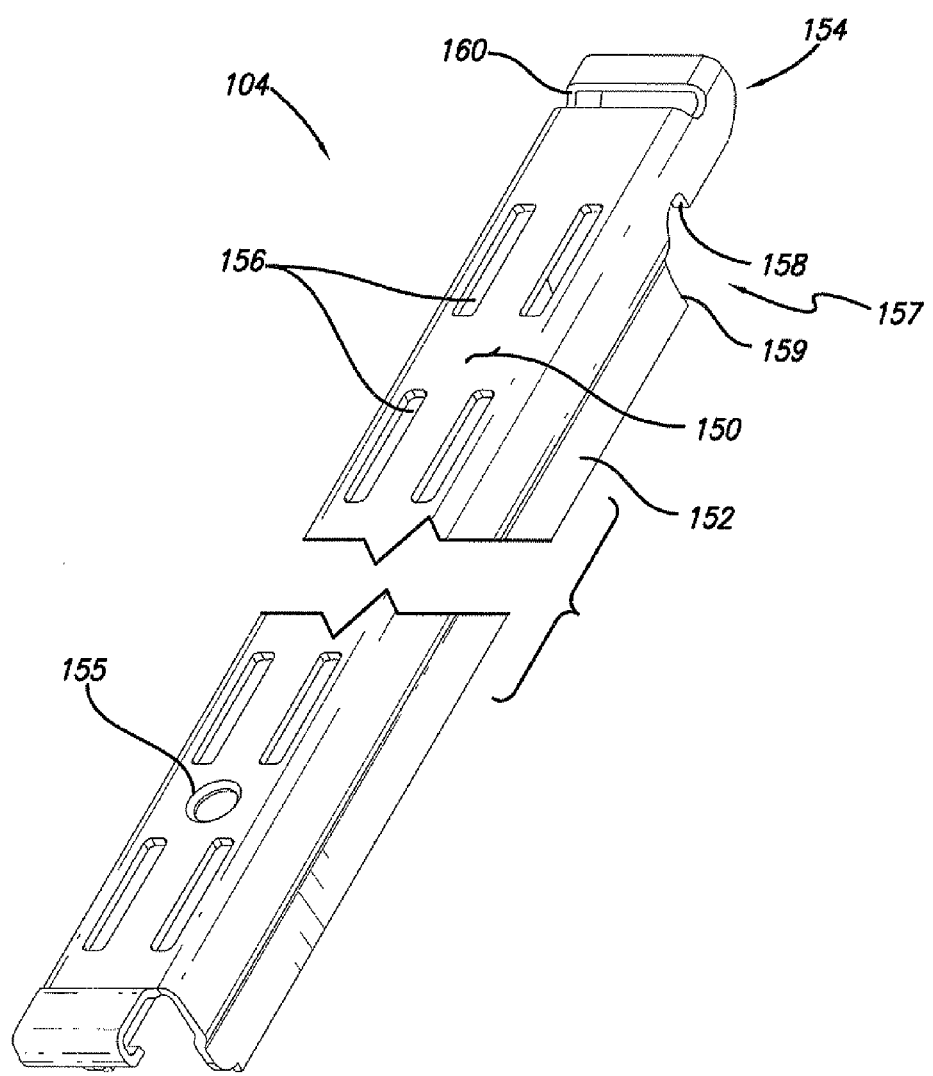
FIG. 20 is a perspective view of an exemplary standard of the adjustable shelving system shown in FIG. 1, where the standard may be supported from a track mounted to a wall according to exemplary embodiments.
Figure 21:
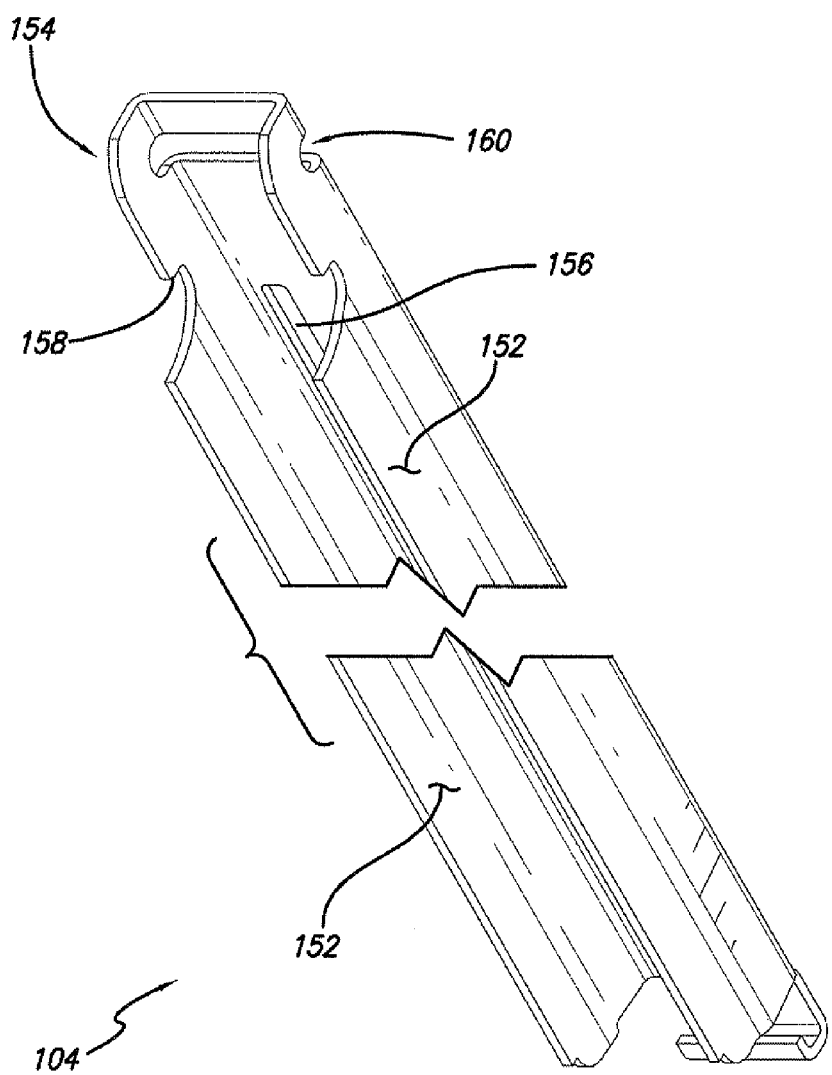
FIG. 21 is a back perspective view of the standard shown in FIG. 20.

FIGS. 20 through 26 illustrate an exemplary standard 104 that may be used in the adjustable shelving system 100 and be supported by or suspended from the track 100 (FIG. 1). As shown in FIGS. 20 and 21, the standard 104 includes a forward surface 150 and opposing sides 152, as well as a contoured end portion 154. The standard 104 may be provided in various lengths and is of indeterminate length as indicated by the separation and bracket in FIG. 20. In other embodiments, the standard 104 may be dimensionally sized (shorter, longer, wider, etc.) relative to the fastener hole 155, slots 156, and/or other components of the adjustable shelving system 100.

With further reference to FIG. 20, the front surface 150 may include at least one fastener hole 155. By way of example, a screw may be used for helping mount and/or stabilize the standard 104 relative to a wall or other surface. Other embodiments may include different means of mounting a standard to a wall. Still other embodiments may include differently configured fastener holes (e.g., shapes, sizes, locations, etc.) or no fastener holes.

The front surface 150 also includes slots or apertures 156. As represented by the arrow shown in FIG. 2, the slots 156 may be configured to receive the tabs of a bracket (e.g., tabs 170 of bracket 106 shown in FIG. 27, tabs of bracket 206 shown in FIGS. 34 through 36, etc.). Alternative embodiments may include differently configured slots 156 (e.g., size, shape, location, number, single column of slots, etc.) than what is shown in the figures. Instead of slots, further embodiments may include other means of mounting a bracket (e.g., protrusions, etc.) may be used on front surface 150.

As shown in FIGS. 20 and 21, the standard 104 includes a generally downwardly-facing horizontal support surface 158 for helping support the standard 104 on the track 110. The standard 104 also includes a surface 159 that may have a contour or shape complementary to or in correspondence with the lower portion 117 of the track 110. When the end portion 154 of the standard 104 is slidably received within the opening 126 of the track 110, the standard's generally downwardly-facing horizontal support surface 158 may thus contact the track's generally upwardly-facing horizontal support surface 124, and the lower portion 117 of the track 110 may be engageably received (e.g., frictionally received, etc.) with the opening 157 cooperatively defined by the standard's surfaces 158, 159.

In this illustrated embodiment, the sides 152 may be relieved or cut away to provide clearance below the support surface 158. But the sides 152 may be alternatively shaped and configured to permit the standard 104 to fit onto the support 110. When the end portion 154 of the standard 104 is slidably positioned within the track's opening 126 (as represented by the arrow shown in FIG. 2), the standard's support surface 158 is generally horizontal in orientation. With the standard 104 supported by or suspended from the track 110, the standard's generally downwardly-facing horizontal support surface 158 rests on and is supported by the opposing generally upwardly-facing horizontal support surface 124 of the track 110. The standard's support surface 158 may be slidably moved along the track's support surface 124 to thereby adjustably position the location of the standard 104 relative to the track 110.

The upper portion of the standard's front surface 150 may be configured to abut the downwardly extending lip 122 of the track 110 (FIG. 2), to thereby help hold the end portion 154 of the standard 104 within the opening 126 of the track 110 (FIG. 1). The track's lip 122 may extend some distance over the contoured end portion 154 of the standard 104, and come into contact with the front surface 150 of the standard 104. This, in turn, may help retain the standard 104 so that the standard 104 is not inadvertently released from the track 110, for example, when the standard 104 is jarred or bumped into by a person walking by, etc. In alternative embodiments, other means (e.g., latch or other mechanism, etc.) may be used instead of the track's lip 122 for helping the standard 104 remain supported by the track 110.

Figure 25:
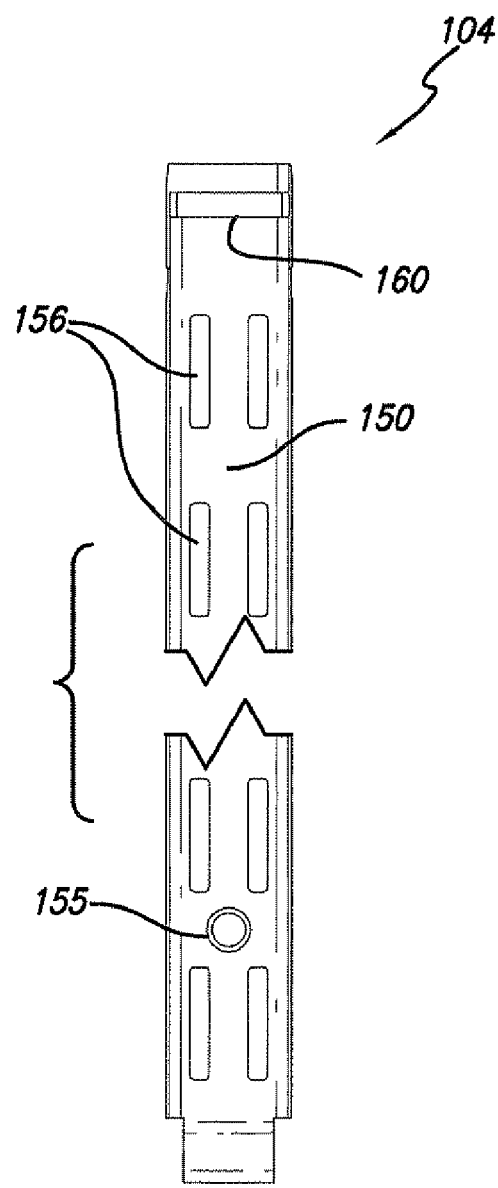
FIG. 25 is a front view of the standard shown in FIG. 20.
Figure 26:
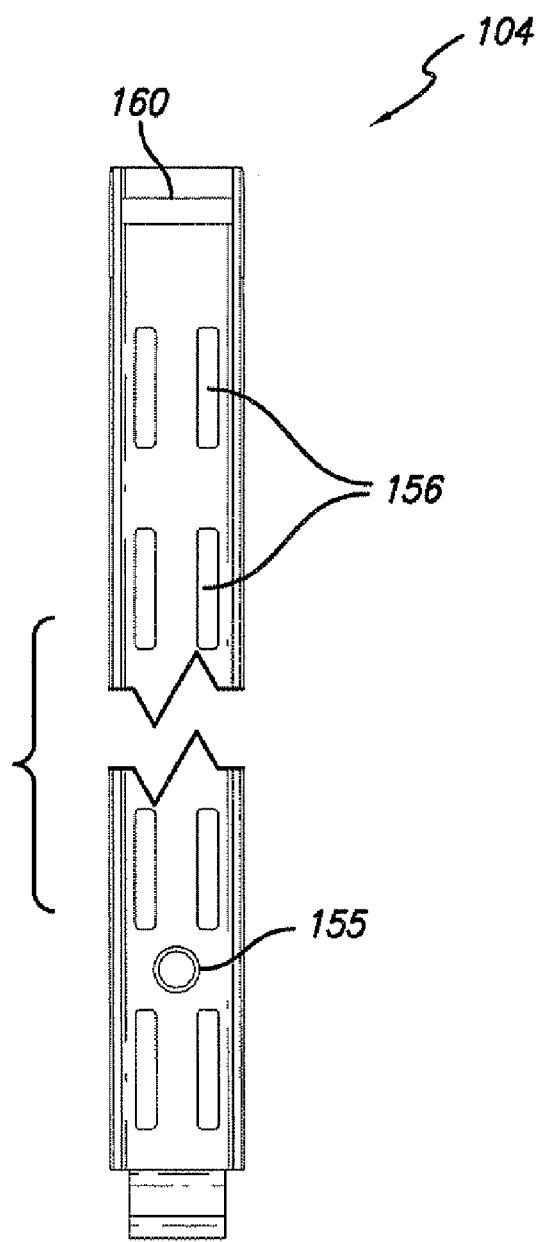
FIG. 26 is a back view of the standard shown in FIG. 20.

With further reference to FIGS. 24 and 25, the standard 104 also includes notch or opening 160. The notch 160 may be configured to engage a protrusion or protruding portion 123 on the downwardly extending lip 122 of the track 110. The engagement of the protrusion 123 within the notch 160 may help prevent (or inhibit) the standard 104 from being pushed upward and separated from the track 110. The contoured end portion 154 may also be configured to allow the standard 104 to slide horizontally along the track 110, as indicated by the arrow in FIG. 2. With the standard 104 in a desired position along the track 110, the hanging or lower portion of the standard 104 not engaged with the track 110 may thereafter be secured to a wall (via a screw, for example) to prevent or inhibit any further movement of the standard 104 from its desired position.

The standard 104 may be constructed of any suitable material, such as plastic, metal, metal alloys, etc. In one exemplary embodiment, the standard 104 is formed from sheet metal.

Accordingly, various embodiments disclosed herein include standards and tracks that are configured with integrated locking features (e.g., standard's notch 160 and track's protruding portion 123, standard's front surface 150 and track's lip 122, standard's support surface 158 and track's support surface 124, etc.) that allow an installer to adjustably position (e.g., slide, etc.) a standard relative to the track before the standard is fixedly mounting the standard to a wall or other surface (e.g., with screws, etc.). The standards and tracks in some embodiments are also configured with safety features (e.g., standard's notch 160 and track's protruding portion 123, etc.) provides positive engagement while still allowing flexibility of component installation.

Figure 34:
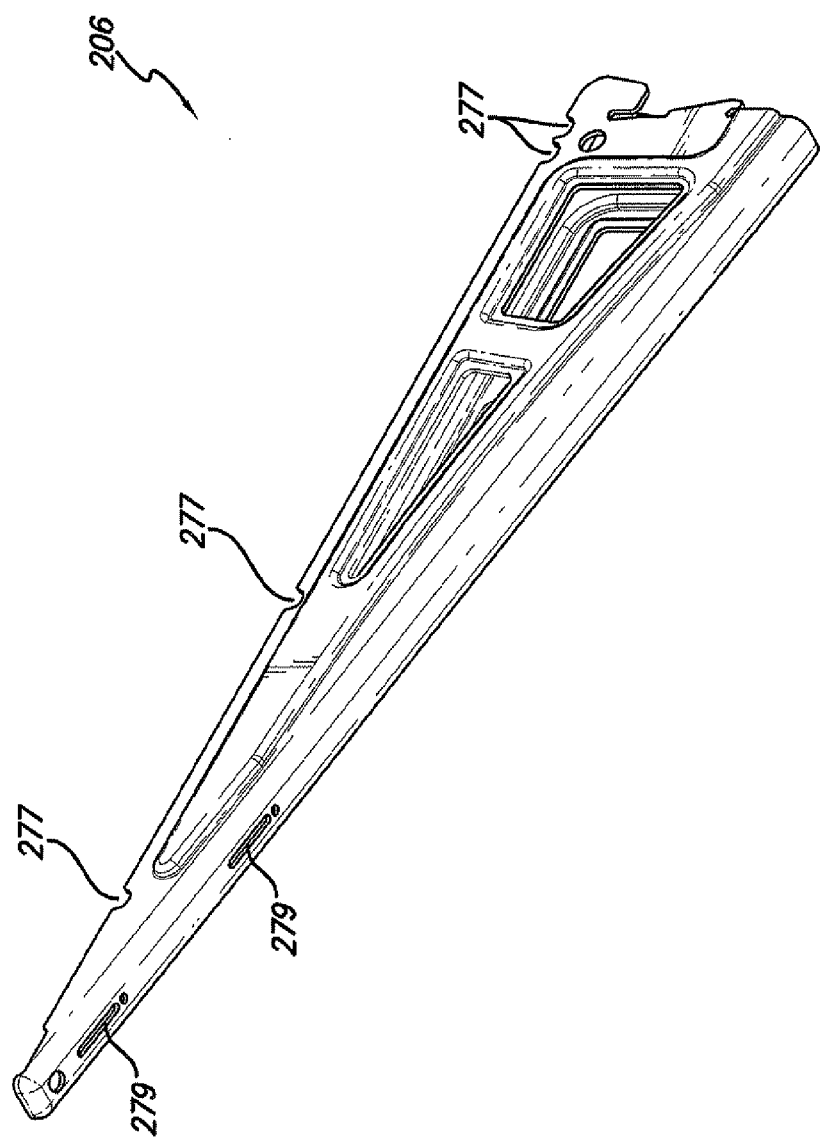
FIG. 34 is a front lower perspective view of another exemplary embodiment of a shelf/shelving bracket that may be used with the adjustable shelving system shown in FIG. 1, where the bracket may be supported from a standard mounted against a wall such that a shelf may then be supported atop the bracket according to exemplary embodiments.
Figure 35:
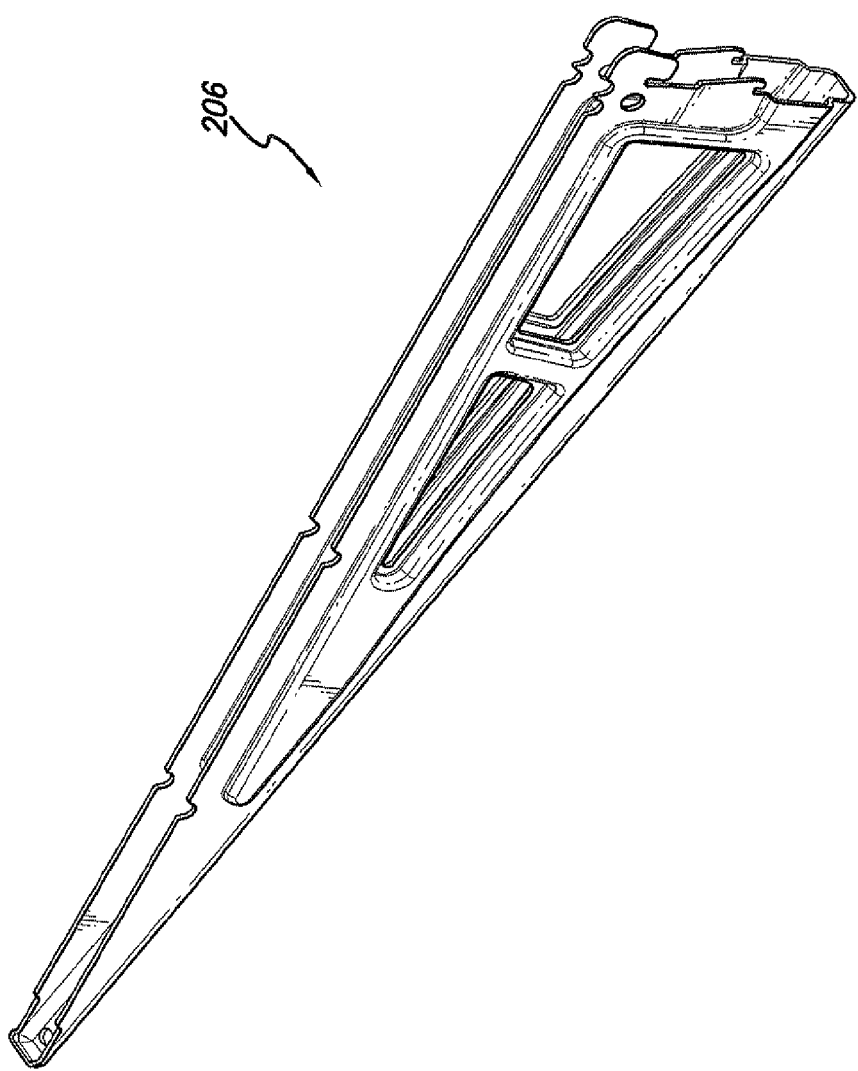
FIG. 35 is a back upper perspective view of the bracket shown in FIG. 34.
Figure 36:
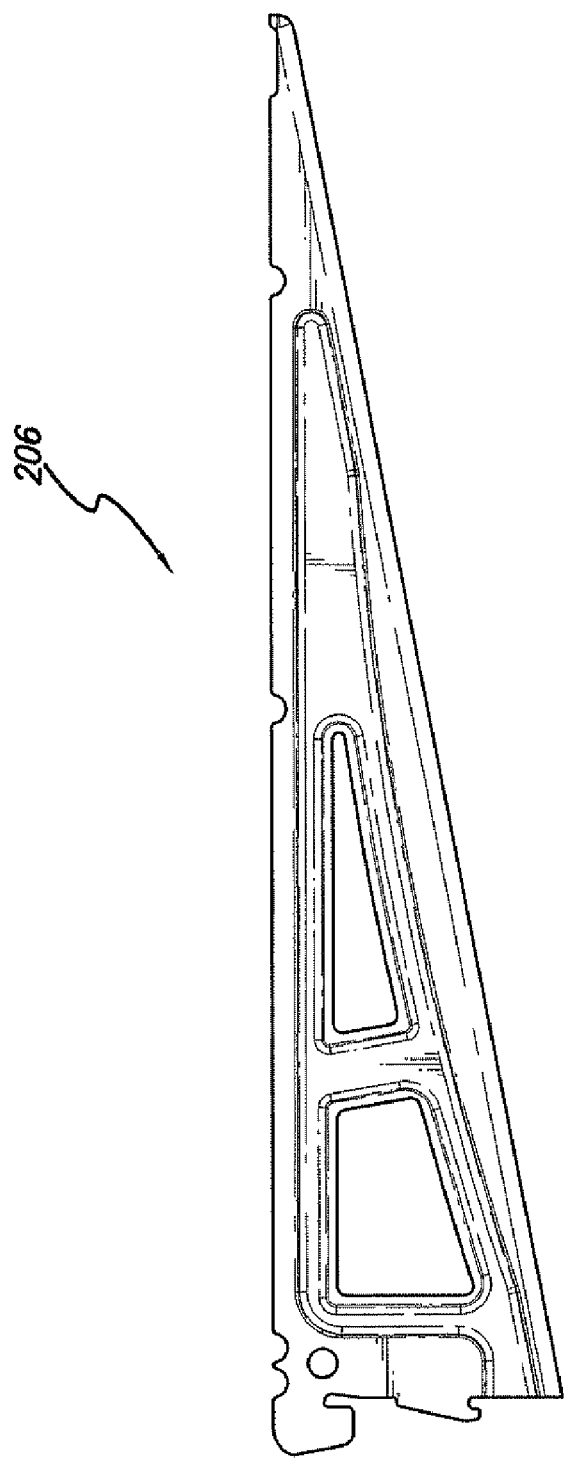
FIG. 36 is a side view of the bracket shown in FIG. 34.

FIGS. 27 through 33 illustrate an exemplary shelf/shelving bracket 106 that may be used with the adjustable shelving system 100 shown in FIG. 1. The bracket 106 may be supported by a standard (e.g., standard 104 shown in FIGS. 20 through 26, etc.) mounted against a wall such that a shelf (e.g., wire ventilated shelf 108 shown in FIG. 37, laminate shelf, etc.) may then supported atop the bracket 106. FIGS. 34 through 36 illustrate another exemplary embodiment of a shelf/shelving bracket 206 that may be instead or also be used with the adjustable shelving system 100 shown in FIG. 1.

The bracket 106 or 206 may be constructed of any suitable material. By way of example only, the brackets 106, 206 may be formed from sheet metal. In addition, the brackets 106, 206 may also be provided in various lengths depending, for example, on the width of the particular shelf to be supported by the brackets. For example, the bracket 106 may have an overall length of about sixteen inches (e.g., 16.34 inches, etc.) in some embodiments, and the bracket 206 may have an overall length of about twelve inches (e.g., 12.44 inches, etc.) in some embodiments.

Figure 27:
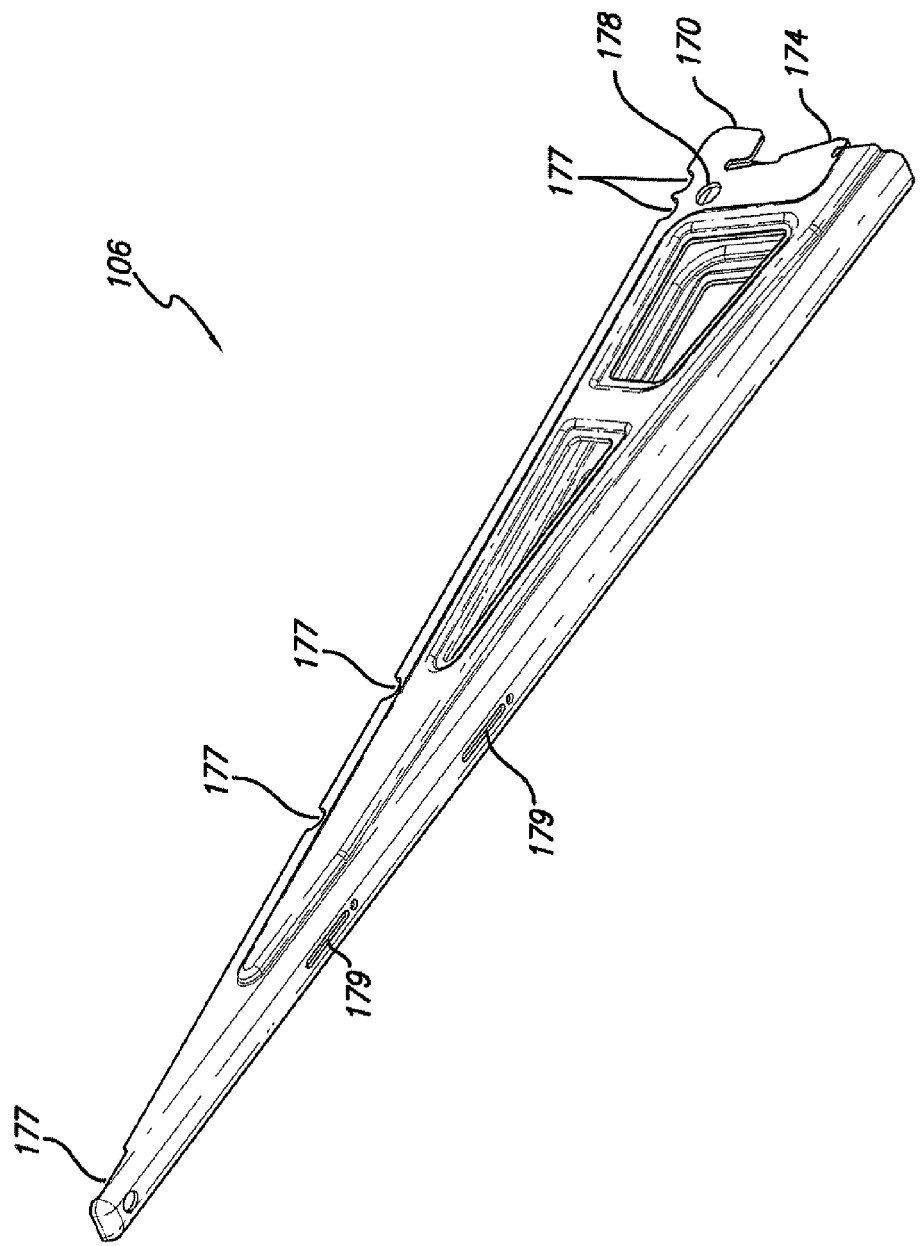
FIG. 27 is a front lower perspective view of an exemplary shelf/shelving bracket of the adjustable shelving system shown in FIG. 1, where the bracket may be supported by a standard mounted against a wall such that a shelf may then supported atop the bracket according to exemplary embodiments.
Figure 28:
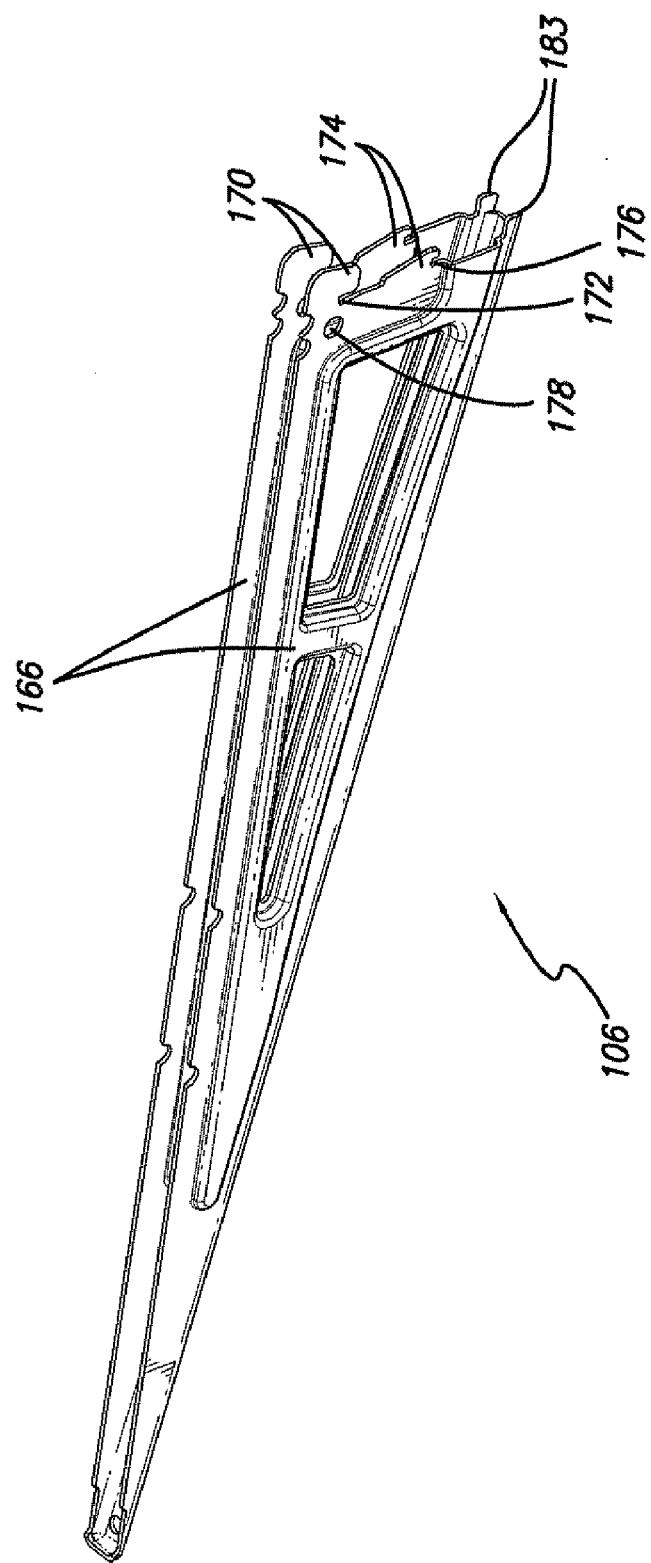
FIG. 28 is a back upper perspective view of the bracket shown in FIG. 27.

With continued reference to FIGS. 27 and 28, the bracket 106 includes a main body portion 166 and tabs 170, 174. The bracket 106 may be mounted to the standard 104 by inserting the tabs 170, 174 located on the rearward end portion of the bracket 106 into corresponding slots 156 of the standard 104. The upper tabs 170 begin at about the point where the back portion of the bracket 106 extends outwardly and then in a downward direction, to thereby form or define a notch 172 (FIGS. 28 and 29) between the main body portion 166 and the tab 170. Each notch 172 may be configured relative to (e.g., about equal to, greater than, less than) a thickness of the front surface portion 150 of the standard 104. This may allow the bracket 106 to be hooked onto the standard 104 by inserting the tabs 170 into slots 156 and then moving the bracket 106 downward relative to the standard 104 so as to receive a mounting portion of the standard 104 within the notch 172. The notch 172 may have a full radius to prevent (or inhibit) tearing of material when placed in a loaded condition, and to assist in installation of the bracket tab 170 to the standard 104. A mounting portion of the standard 104 is generally referred to as that portion of the standard 104 that is received within and fits into the notch 172.

The bracket 106 further includes middle tabs 174 located at about the center of the back portion of the bracket 106. The tabs 174 extend generally downwardly and form or define notches 176. Tabs 174, in conjunction with notches 176, may generally inhibit the front end of the bracket 106 from being pushed up and becoming dislodged from the standard 104, and may also provide increased load-bearing capacity to bracket 106. The upper portions of the tabs 174 protrude slightly and may operate or act as a stop when the bracket 106 is installed to the standard 104. During use, the tab upper portions may help inhibit the bracket 106 from being dislodged from the standard 104, for example, when the bracket 106 is pushed in an upward direction. By way of example, FIG. 1 illustrates the bracket 106 supported by the standard 104 where two brackets 106 are supporting the wire shelf 108.

Figure 29:
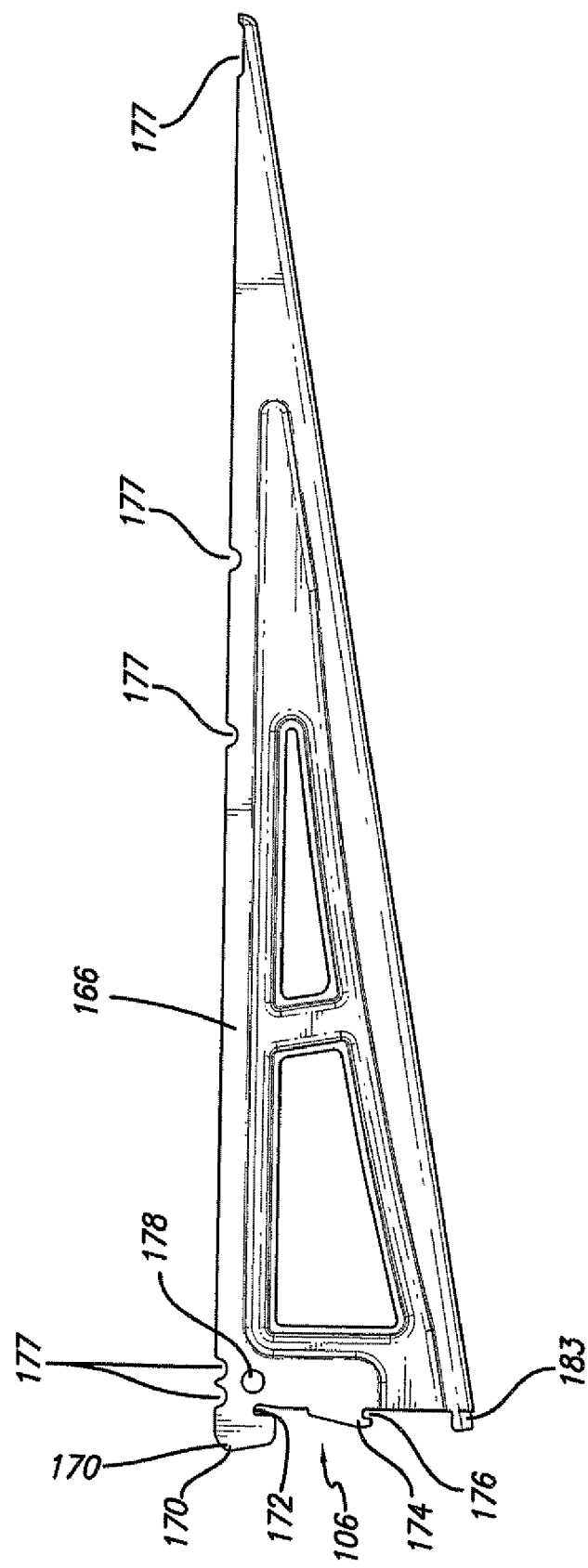
FIG. 29 is a side view of the bracket shown in FIG. 27.
Figure 30:
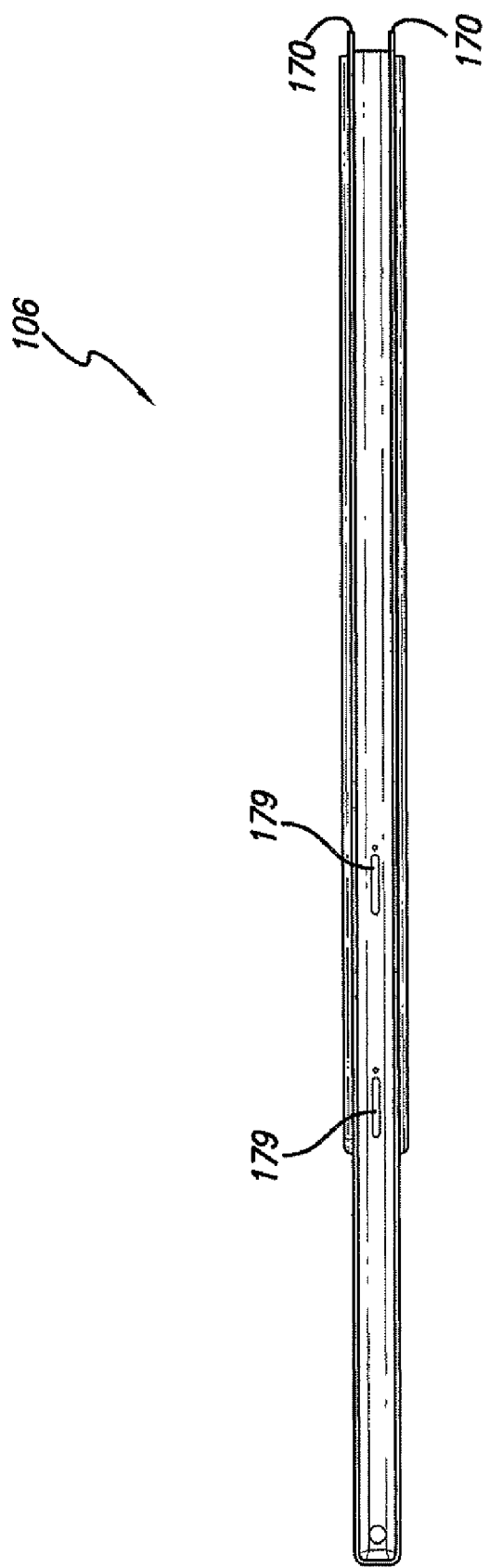
FIG. 30 is a top view of the bracket shown in FIG. 27.
Figure 31:
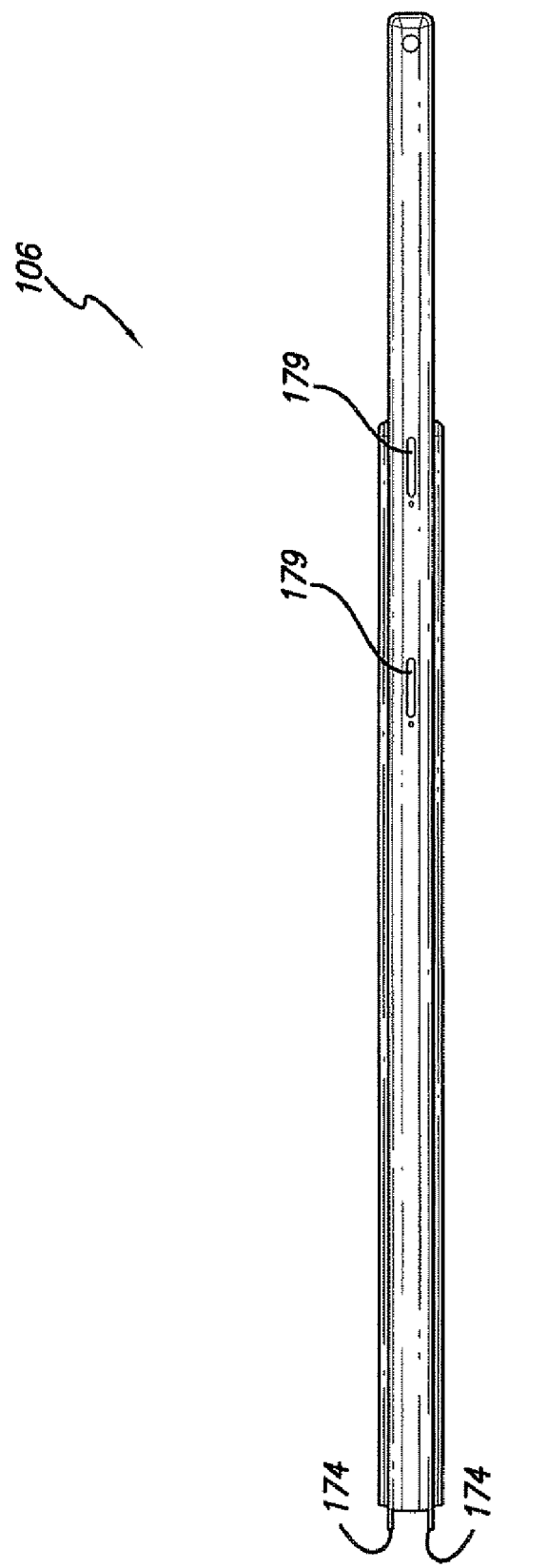
FIG. 31 is a bottom view of the bracket shown in FIG. 27.
Figure 32:
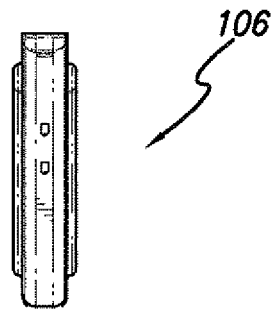
FIG. 32 is a front end view of the bracket shown in FIG. 27.
Figure 33:
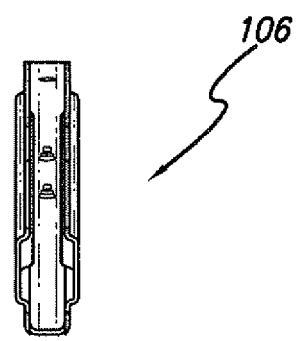
FIG. 33 is a back end view of the bracket shown in FIG. 27.

As shown in FIGS. 28 and 29, the bracket 106 further includes tab or projection 183 along the bottom of the bracket 106. These tabs 183 may be configured (e.g., sized, shaped, located, etc.) to also be received in slots 156 of the standard 104 when the bracket 106 is installed to the standard 104. Accordingly, installing the bracket 106 to the standard 104 may include all three sets of tabs 170, 174, and 183 being respectively received in respective upper, middle, and lower pairs of slots 156 of the standard 104. This engagement of the three different sets of tabs 170, 174, 183 with slots 156 of the standard 104 may thus provide a relatively secure installation of the bracket 106 to the standard 104, which will resist or inhibit inadvertent dislodgement of the bracket 106 from the standard 104, for example, when bumped by a person walking by, etc. Alternative embodiments may include differently configured tabs and/or more or less tabs 170, 174, 183. For example, FIGS. 34 through 36 illustrate an embodiment of a bracket 206 that does not include a lower or bottom set of tabs, such as tabs 183 of bracket 106.

The bracket 106 also includes recesses or openings 177, as shown in FIGS. 27 and 29. The recesses 177 may be configured (e.g., sized, shaped, located, etc.) to receive portions of a wire shelf's longitudinally support members (e.g., members 181 shown in FIG. 37, etc.). In the illustrated example, the recesses 177 comprise generally u-shaped indents or notches. The engagement of the shelf portions within the recesses 177 may help restrain or resist generally horizontal movement of the shelf relative to the bracket 106. The particular configuration (e.g., shape, spacing, location, etc.) of the openings 177 may depend on the particular shelf configuration to be supported atop the bracket 106. For example, FIGS. 34 through 36 illustrate another exemplary embodiment of a bracket 206 having a different arrangement of recesses or openings 277.

Figure 47:
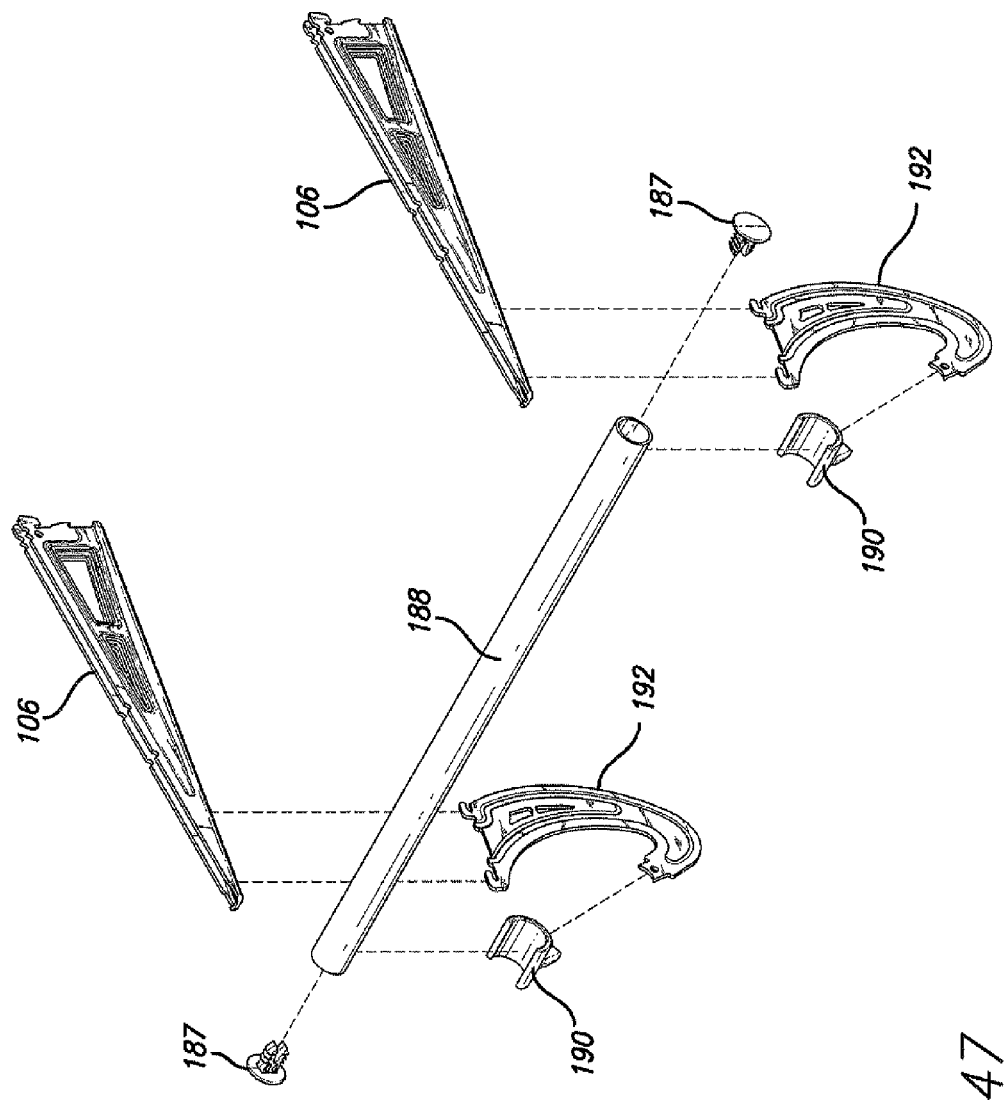
FIG. 47 is an exploded perspective view of the exemplary hang rod assembly of the adjustable shelving system in FIG. 1 according to exemplary embodiments.
Figure 48:
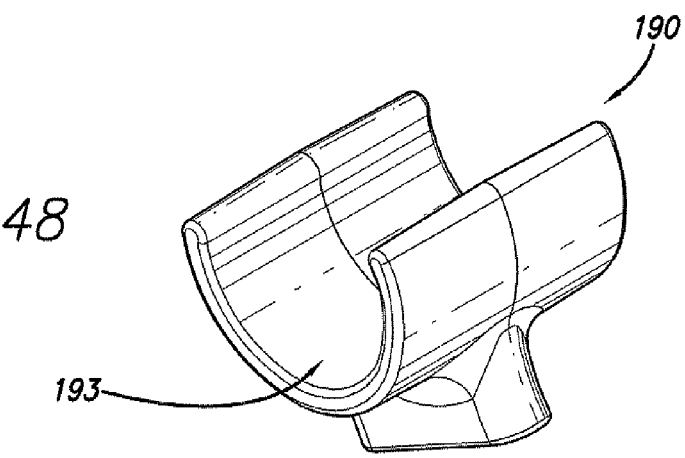
FIG. 48 is an upper perspective view of an exemplary hang rod saddle or mounting base of the hang rod assembly shown in FIG. 47, where the hang rod saddle may be attached to a hang rod mounting bracket and then be used for helping support a hanger rod or hang rod according to exemplary embodiments.

As shown in FIG. 27, this particular embodiment of the bracket 106 includes generally rectangular openings 179 along a bottom surface of the bracket 106. As shown in FIG. 47, the openings 179 may be configured (e.g., sized, shaped, located, etc.) so as to engagingly receive tabs of a hang rod support bracket (e.g., tabs 196 of bracket 192 shown in FIGS. 55 through 61, etc.), to thereby suspend or support the hang rod support bracket therefrom. The particular configuration (e.g., shape, spacing, location, etc.) of the openings 179 may depend, for example, on the particular configuration of the tabs of the hang rod support bracket to be supported or suspended from the bracket 106. For example, FIGS. 34 through 36 illustrate another exemplary embodiment of a bracket 206 having openings 279 closer to the front of the bracket 206.

Figure 37:
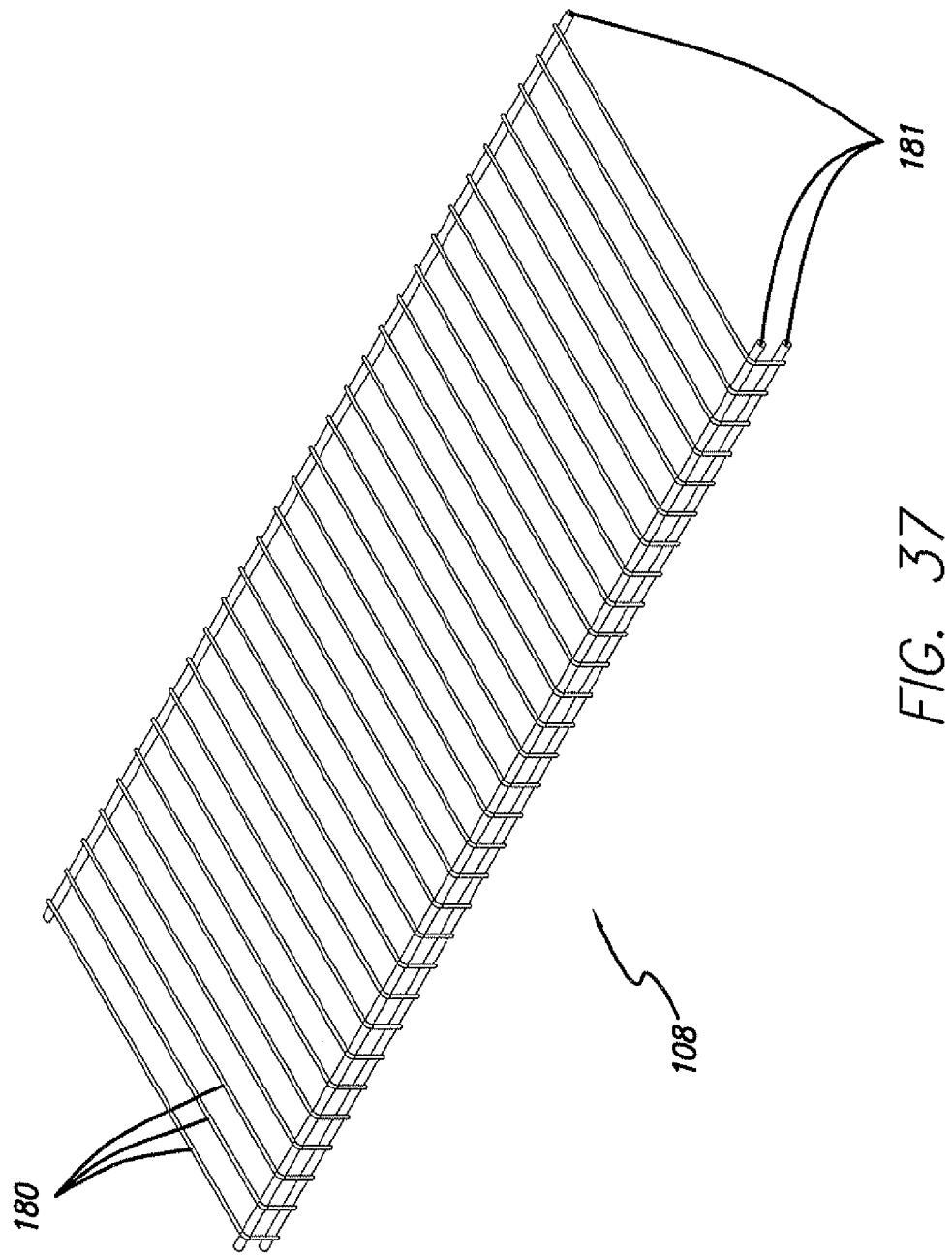
FIG. 37 is a perspective of an exemplary wire shelf of the adjustable shelving system shown in FIG. 1, where the wire shelf may be supported atop shelf/shelving brackets, which, in turn, are supported by standards supported from tracks mounted to a wall according to exemplary embodiments.

FIG. 37 illustrates an exemplary wire shelf 108 that may be used with the adjustable shelving system 100 shown in FIG. 1. As shown in FIG. 1, the wire shelf 108 may be supported atop the shelf/shelving brackets 106, which, in turn, are supported by standards 104 supported from tracks 110 mounted to a wall. As shown in FIG. 37, the wire shelf 108 includes transversely extending wire members 180 (e.g., wire stringers, etc.) supported by longitudinally extending support members 181 to form a shelf deck. The transversely extending wire members 180 are typically spaced to provide a ventilated shelf deck construction, while preventing or inhibiting items from falling through the spaces between the transversely extending wire members 180.

The wire shelf 108 may be constructed of any suitable material, such as metals, metal alloys, plastic, etc. In one exemplary embodiment, the wire shelf 108 is formed from steel wires. In addition, the wire shelf 108 is but one example of a shelf that may be supported atop brackets of the adjustable shelving system 100. The particular wire shelf 108 shown in FIG. 37 is for purposes of illustration only as various aspects of the invention can be used with a wide range of other shelves and storage products, including wire ventilated shelves having different configurations than what is shown in FIG. 37, trays, laminate shelves, etc. Accordingly, the specific references to wire shelf herein should not be construed as limiting the scope of the invention to only one specific form/type of wire shelf.

Figure 45:
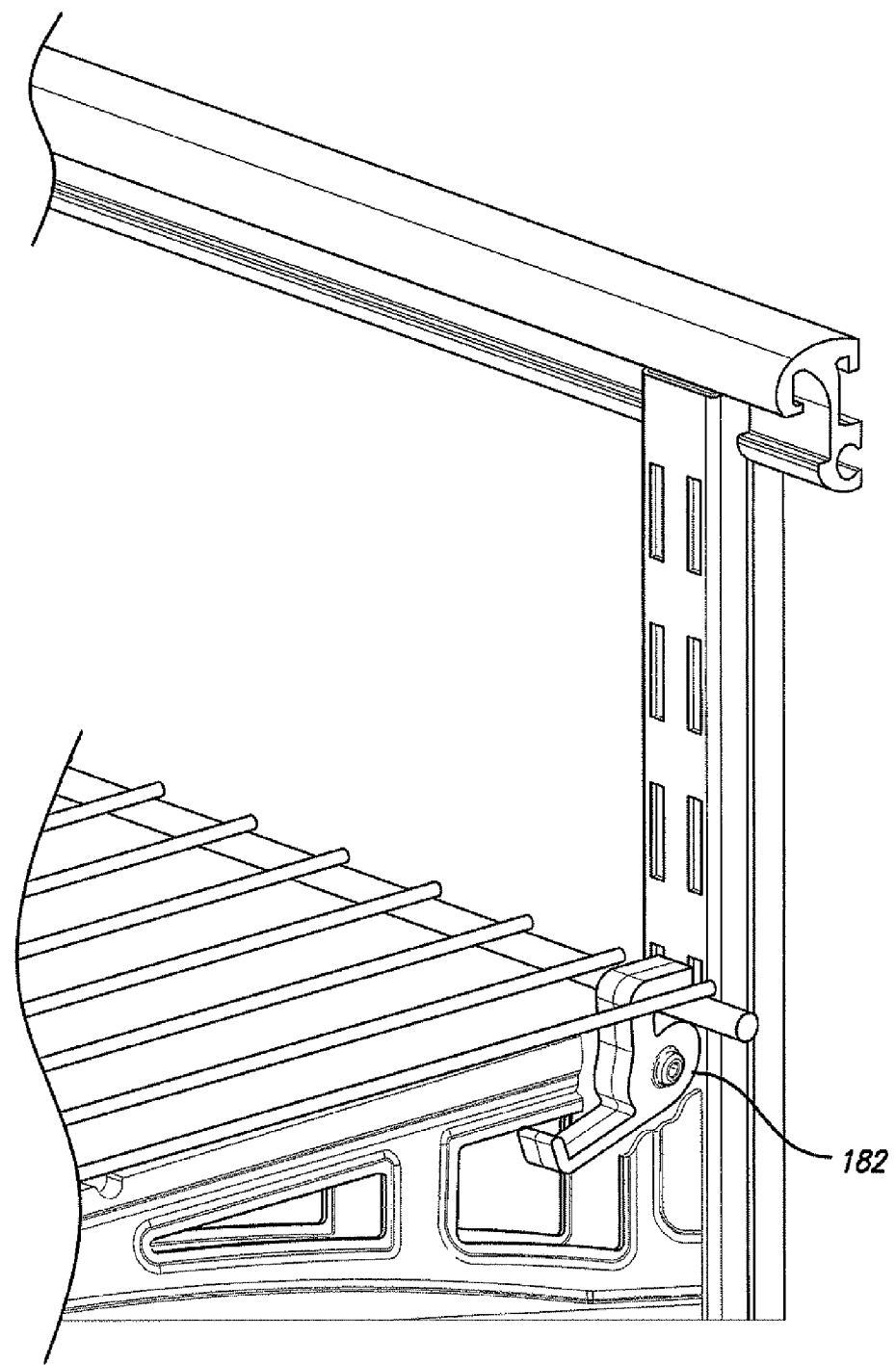
FIG. 45 is a perspective view of the locking member shown in FIG. 38, and illustrating the locking member pivotably coupled to a shelf/shelving bracket (with a portion of the bracket removed for clarity) where the locking member is releasably locking in place a portion of a wire shelf according to exemplary embodiments.
Figure 46:
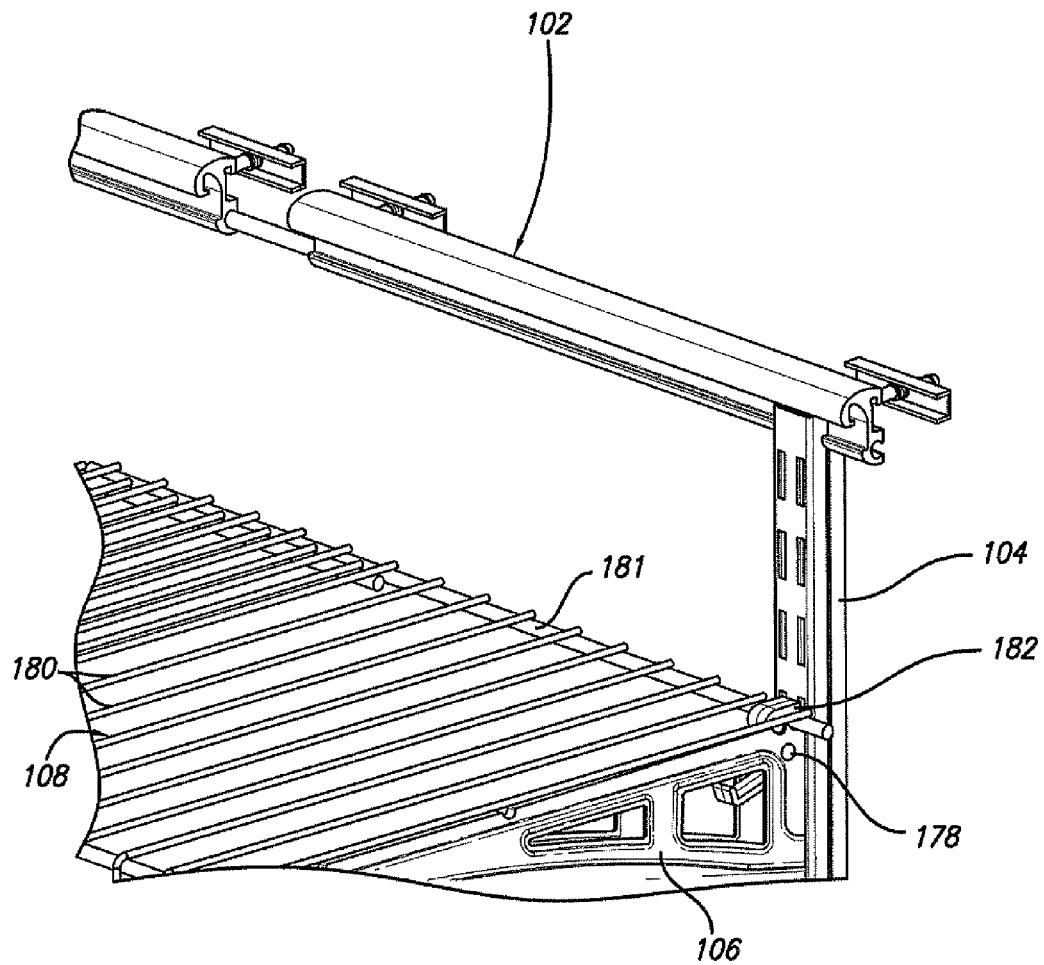
FIG. 46 is a partial perspective view of an upper forward portion of the adjustable shelving system in FIG. 1.

FIG. 1 shows the forward end portion of the bracket 106 positioned generally between the forward vertically-spaced longitudinal rods or wires 181*a* and 181*b*, which form a cascading forward portion of the wire shelf 108. The upper forward longitudinal rod 181*a* of the wire shelf 108 rests in the forward notch 177 of the bracket 106. Also, FIGS. 1 and 47 show the rearward longitudinal rod or wire 181*c* of the wire shelf 108 resting in the rearward notch 177 on an upper portion of the bracket 106. FIGS. 45 and 46 also show an exemplary locking member 182 releasably locking in place the rearward longitudinal rod 181*c*.

FIGS. 38 through 44 illustrate the exemplary locking member 182, which may be used with the adjustable shelving system 100 shown in FIG. 1. As shown in FIGS. 1, 45, and 46, the locking member 182 may be pivotably coupled to a bracket 106 for releasably locking in place a portion of the wire shelf's rearward longitudinal wire 181*c*.

Figure 38:
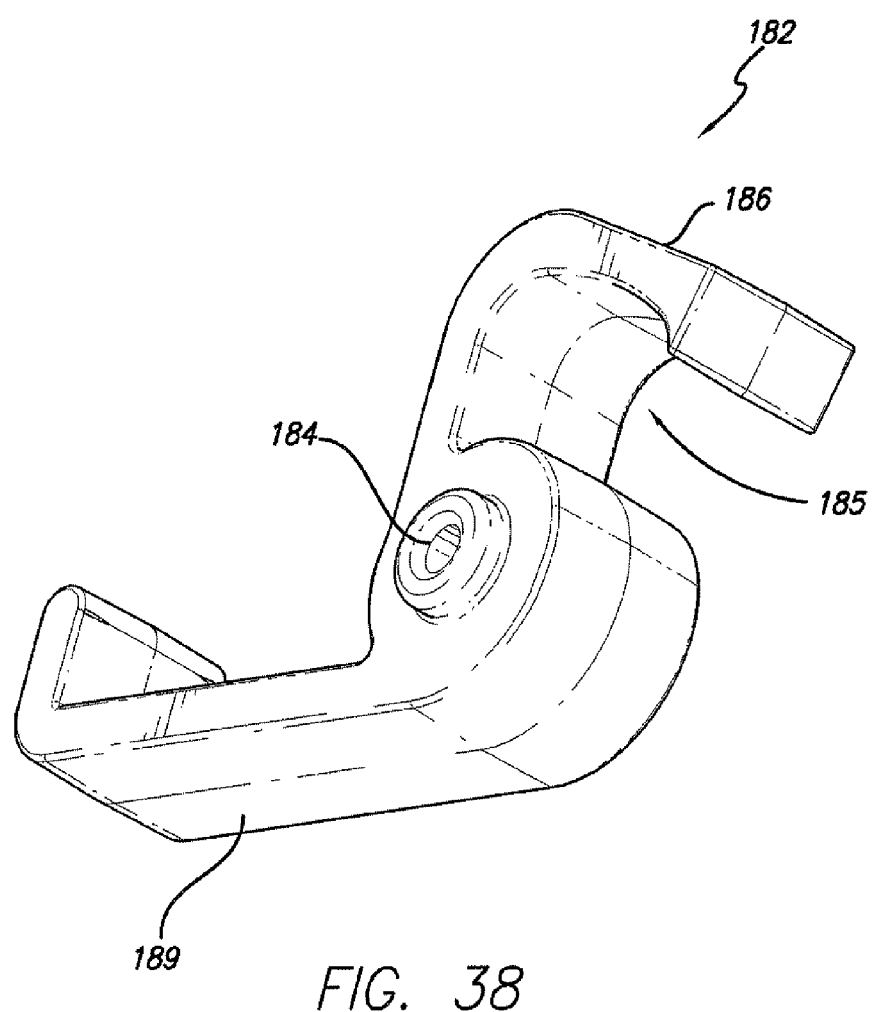
FIG. 38 is a lower perspective view of an exemplary locking member of the adjustable shelving system shown in FIG. 1, where the locking member may be pivotably coupled to a shelf/shelving bracket for releasably locking in place a portion of a shelf according to exemplary embodiments.
Figure 39:
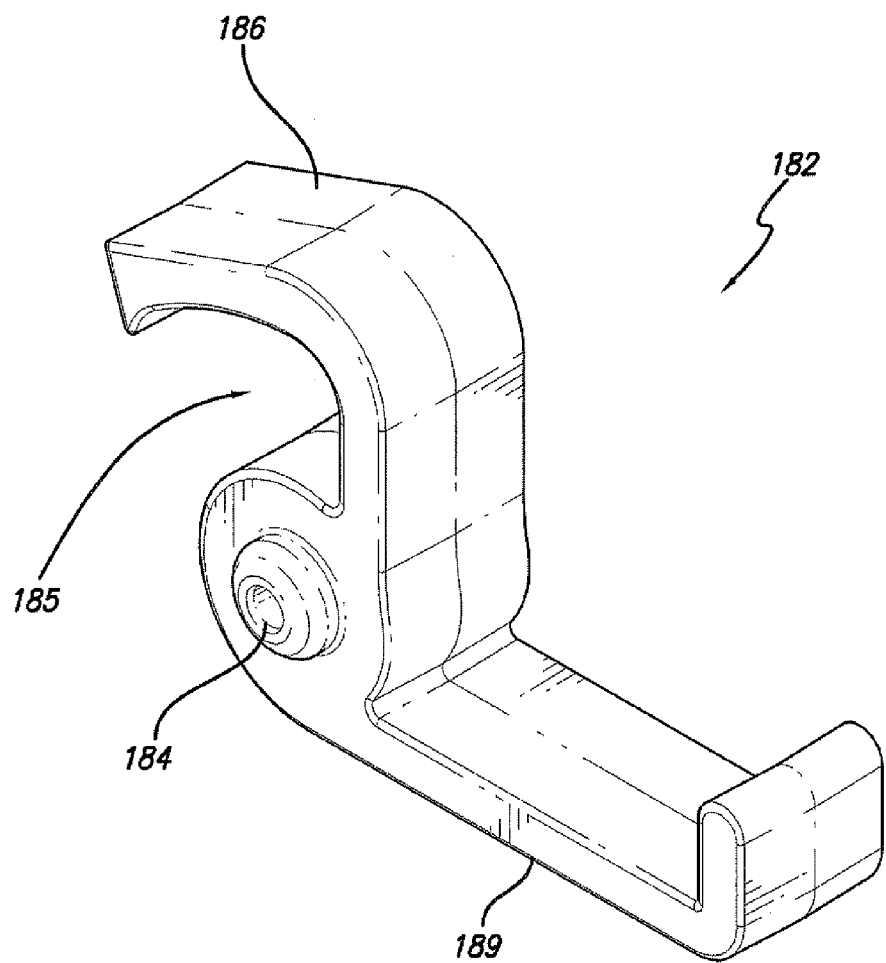
FIG. 39 is a back upper perspective view of the locking member shown in FIG. 38.
Figure 40:
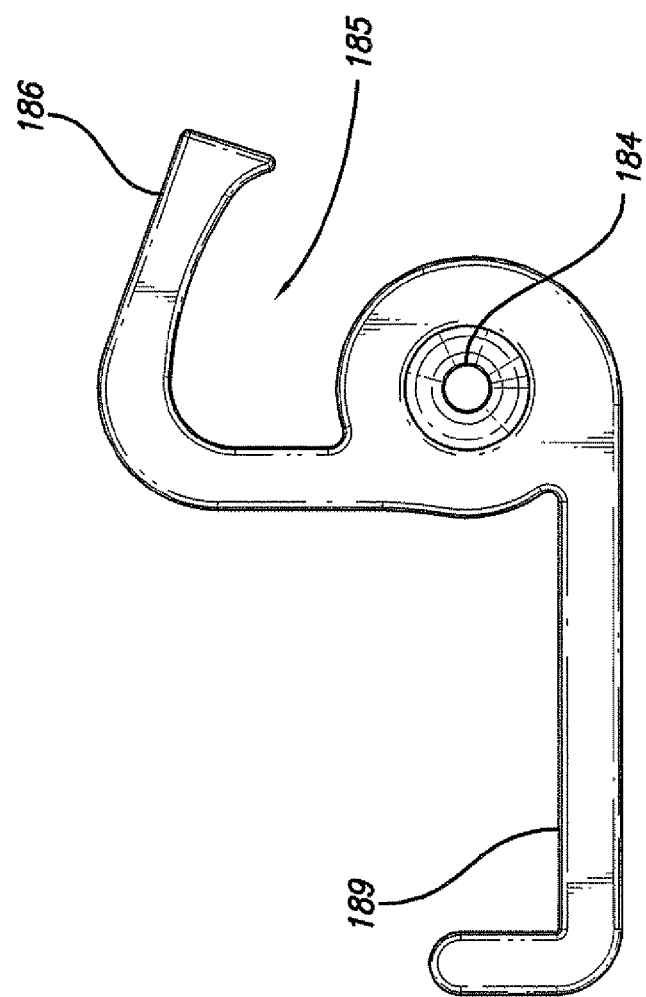
FIG. 40 is a side view of the locking member shown in FIG. 38.
Figure 41:
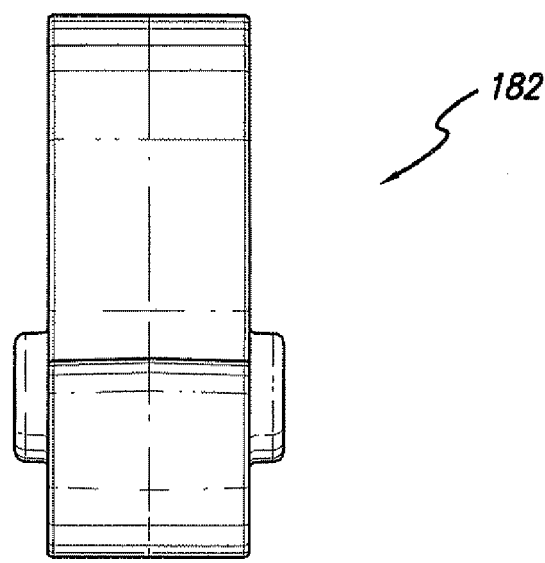
FIG. 41 is a front view of the locking member shown in FIG. 38.
Figure 42:
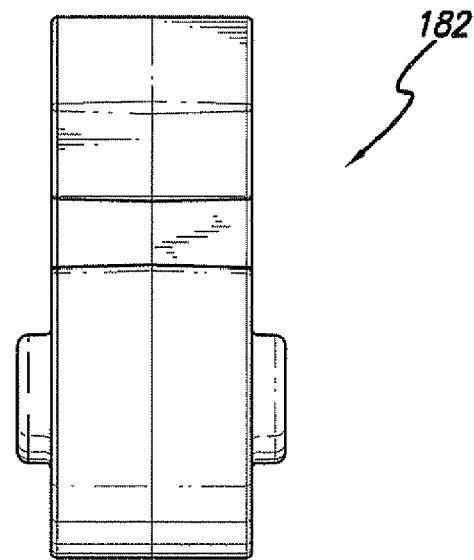
FIG. 42 is a back view of the locking member shown in FIG. 38.
Figure 43:
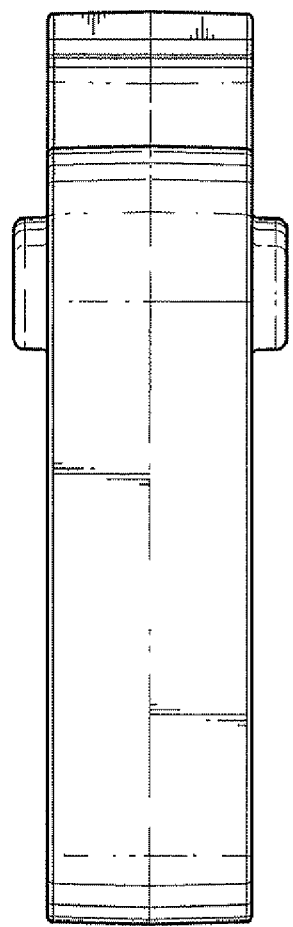
FIG. 43 is a top view of the locking member shown in FIG. 38.
Figure 44:
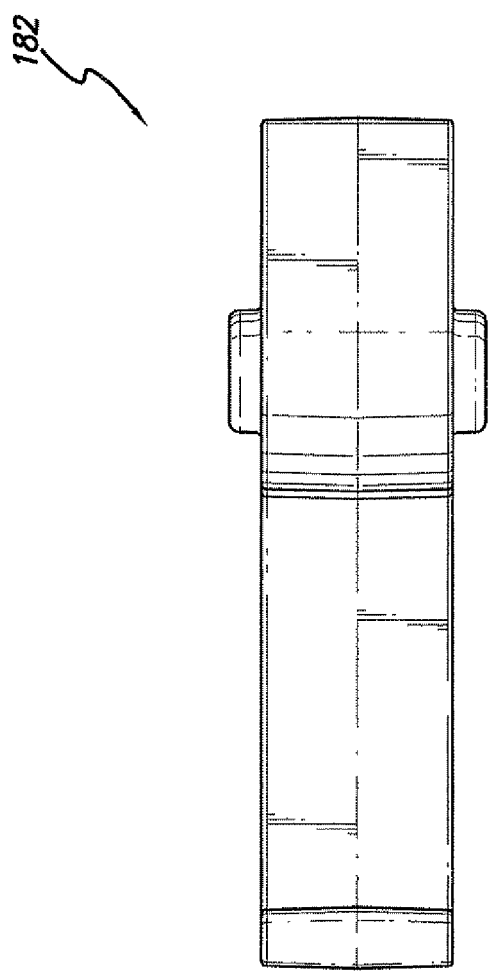
FIG. 44 is a bottom view of the locking member shown in FIG. 38.

With further reference to FIG. 38, the locking member 182 includes protruding portions or pivot members 184 (e.g., nubs having generally circular profile, etc.) that may be received within corresponding openings 178 of the bracket 106 (FIG. 27), for pivotably coupling the locking member 182 to the bracket 106. When the locking member 182 is coupled to the bracket 106 by way of the engagement of the protruding portions 184 with the bracket's openings 178, the locking member 182 is pivotable relative to the bracket 106 (and shelf 108 supported thereby) between at least an unlocked position and a locked position (FIG. 45).

As shown in FIG. 38, the locking member 182 further includes a locking finger 186 that defines an opening 185 for receiving a portion of a shelf therein (e.g., rearward longitudinal wire 181*c* of wire shelf 108 (FIG. 45), back edge portion of laminate shelf 111 (FIG. 1), etc.). In use, the locking finger 186 is hooked or locked over the shelf portion when the locking member 182 is pivoted relative to the bracket 106 about pivotal members 184 into the locking position shown in FIGS. 1, 45, and 46. The locking member 182 may also include a lever or arm 189 for helping a user in pivoting the locking member 182 between the unlocked and locked positions.

The wire shelf 108 is but one example of a shelf that may be releasably locked in place by a locking member 182. For example, locking members 182 may also be used for releasably locking in place a portion of a laminate shelf, such as the back edge portion of the laminate shelf 111 shown in FIG. 1. For the laminate shelf 111, the orientation of the locking member 182 is reversed from what is shown in FIGS. 45 and 46 to allow the back edge portion of the laminate shelf 111 to be received in the opening 185 of the locking member 182.

The locking member 182 may be constructed of any suitable material, such as plastics, etc. In one exemplary embodiment, the locking member 182 may be formed from polypropylene.

FIG. 47 illustrates an exemplary hang/hanger rod assembly 109 of the adjustable shelving system 100 in FIG. 1 according to exemplary embodiments. As shown in FIGS. 1 and 47, the hang rod assembly 109 generally includes hang round mounting brackets 192 (which may be supported or suspended from brackets 106, 206), hang rod saddles or mounting bases 190 (which may be supported by the brackets 192), and a hang/hanger rod 188 (which may be supported atop the saddles 190). In other embodiments, however, an adjustable shelving system may not include any such hang rod assembly.

FIGS. 48 through 54 illustrate the exemplary hang rod saddle or mounting base 190, which may be used with the adjustable shelving system 100 shown in FIG. 1. As shown by FIGS. 1 and 47, the hang rod saddle 190 may be attached to the hang rod mounting bracket 192 for supporting the hanger/hang rod 188.

Figure 49:
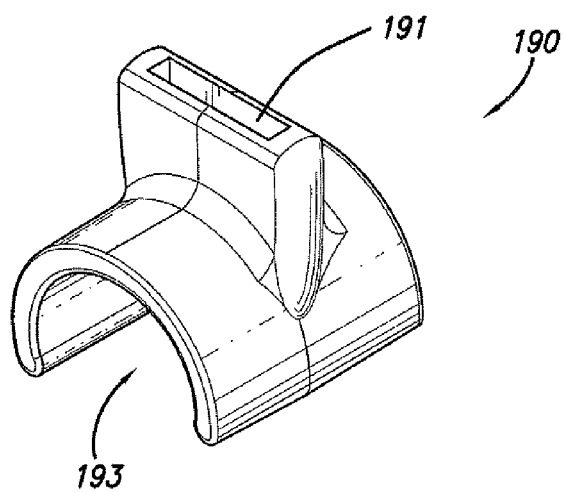
FIG. 49 is a lower perspective view of the hang rod saddle shown in FIG. 48.
Figure 50:
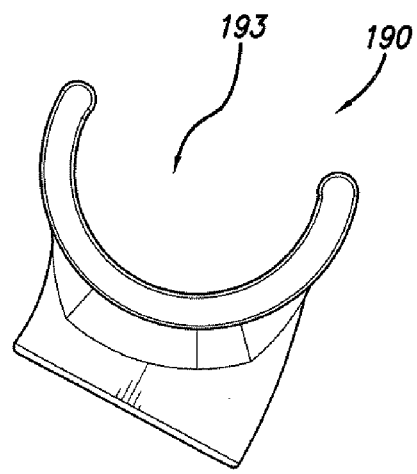
FIG. 50 is a side view of the hang rod saddle shown in FIG. 48.
Figure 51:
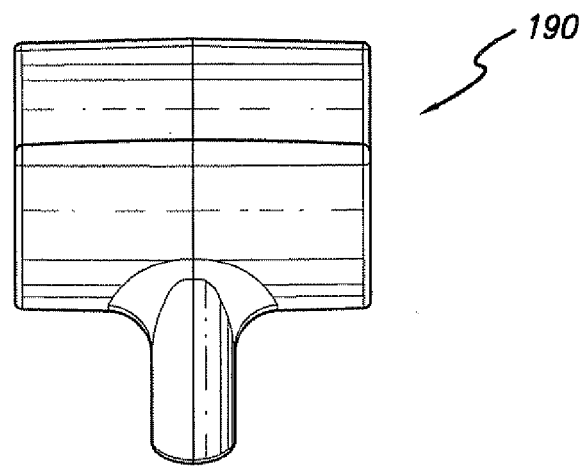
FIG. 51 is a front view of the hang rod saddle shown in FIG. 48.
Figure 52:
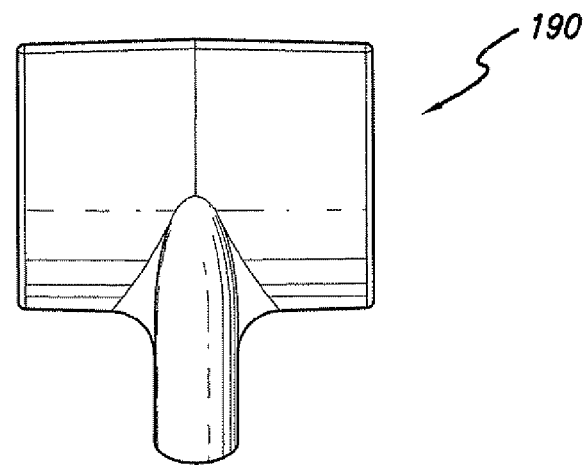
FIG. 52 is a back view of the hang rod saddle shown in FIG. 48.
Figure 53:
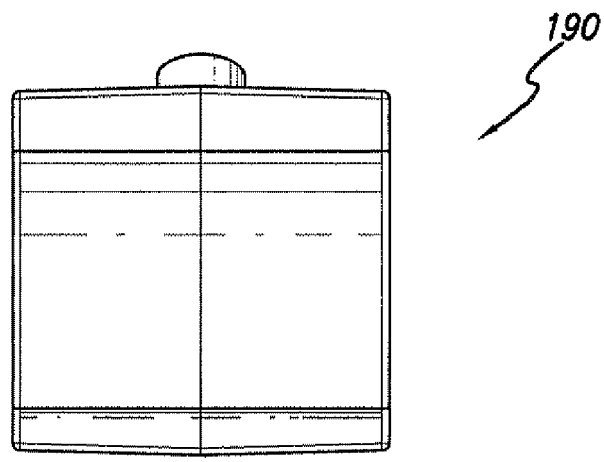
FIG. 53 is a top view of the hang rod saddle shown in FIG. 48.
Figure 54:
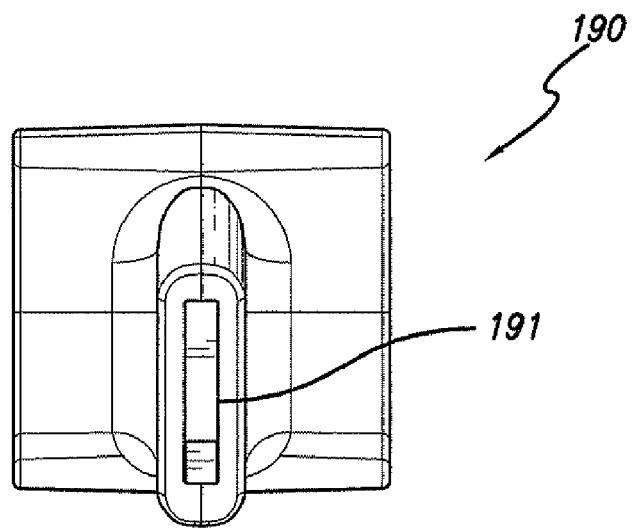
FIG. 54 is a bottom view of the hang rod saddle shown in FIG. 48.

As shown in FIG. 49, the saddle 190 includes an opening 193 (e.g., a saddle portion, etc.) in which the hang/hanger rod 188 may rest when supported thereby. The opening 193 is generally shaped as a saddle with a generally C-shaped profile. The opening 193 extends the length of the saddle 190. In other embodiments, the opening 193 may have a different configuration (e.g., different shape, different profile, different size, etc.) depending, for example, on the corresponding shape of the hang/hanger rod 188 to be supported by the saddle 190.

With further reference to FIG. 49, the saddle 190 also includes a slot 191 therein. The slot 191 is configured for receiving the end portion 199 of the bracket 192. The slot 191 is generally rectangular in the illustrated embodiment. In other embodiments, the saddle may include a slot or opening having a different configuration (e.g., different shape, different size, different location, etc.) depending, for example, on the corresponding configuration of the end portion 199 of the bracket 192 to be received in the slot 191. Alternative embodiments may include different means for attaching the saddle to the bracket. Still further embodiments may include the saddle and bracket being monolithically formed with a single component construction such that the saddle is not a separate component that must be attached to the bracket.

The saddle 190 may be constructed of any suitable material, such as plastics, etc. In one exemplary embodiment, the saddle 190 may be formed from polypropylene.

The hanger/hang rod 188 may also be constructed of any suitable material, such as plastics, etc. In one exemplary embodiment, the hanger/hang rod 188 may be hollow and formed from sheet metal.

FIGS. 55 through 61 illustrate the exemplary hang rod mounting bracket 192, which may be used with the adjustable shelving system 100 shown in FIG. 1. As shown by FIGS. 1 and 47, the hang rod mounting bracket 192 may be supported by or suspended from brackets 106, 206, and the saddle 190 may be positioned on the end portion 199 of the hang rod mounting bracket 192.

Figure 55:
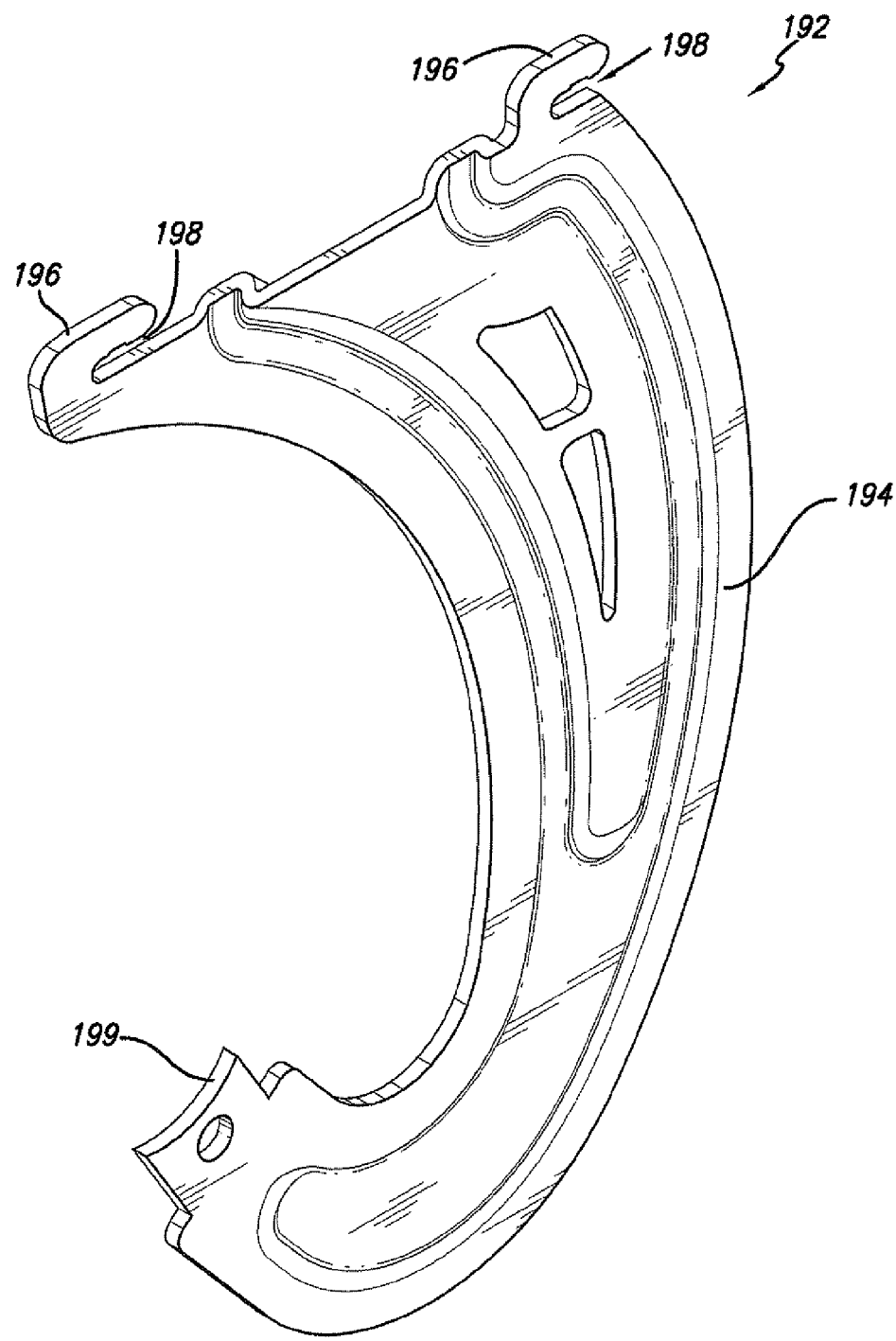
FIG. 55 is an upper perspective view of an exemplary hang rod mounting bracket of the hang rod assembly shown in FIG. 47, where the hang rod mounting bracket may be supported or suspended from a shelf/shelving bracket according to exemplary embodiments.
Figure 56:
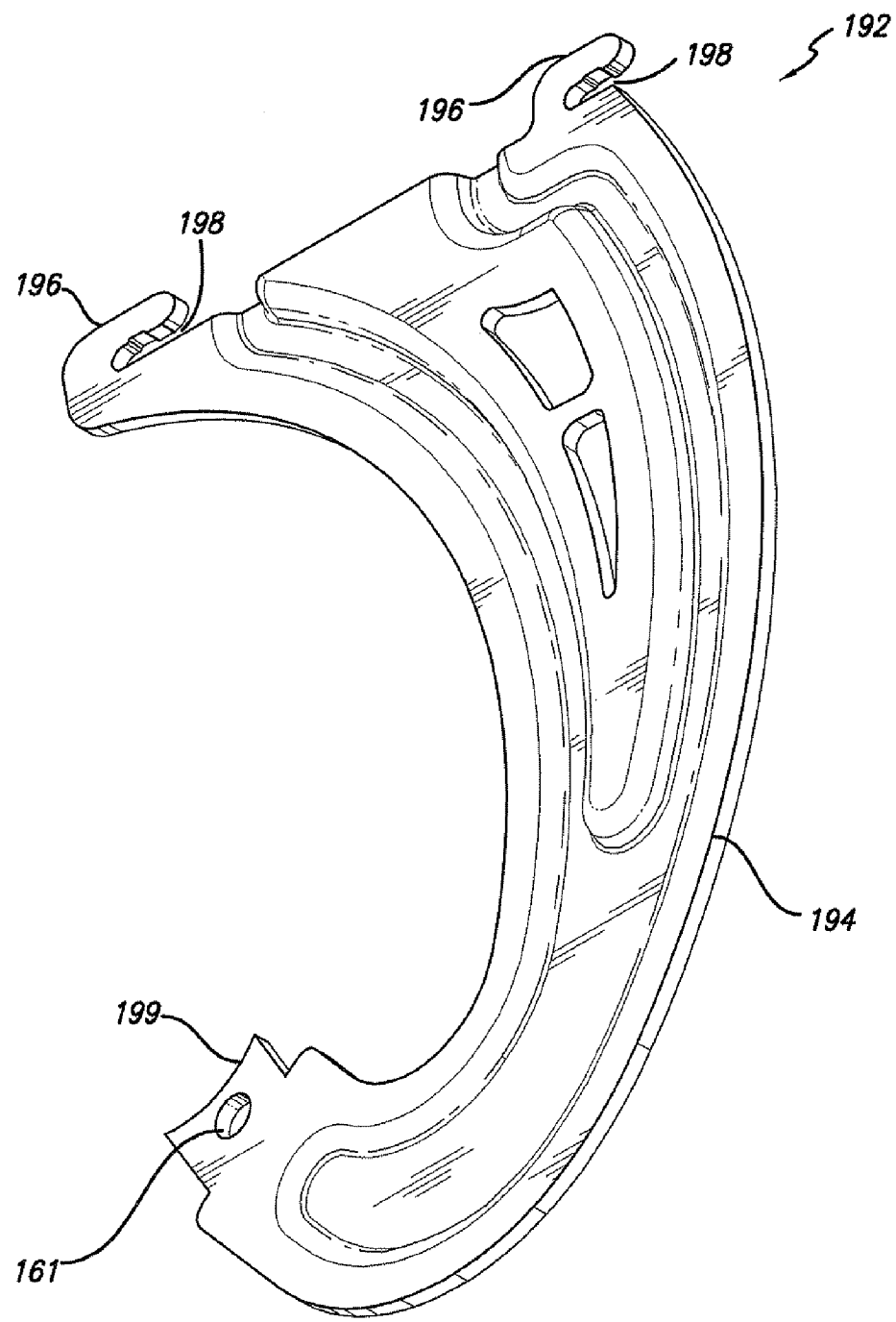
FIG. 56 is a lower perspective view of the hang rod mounting bracket shown in FIG. 55.
Figure 57:
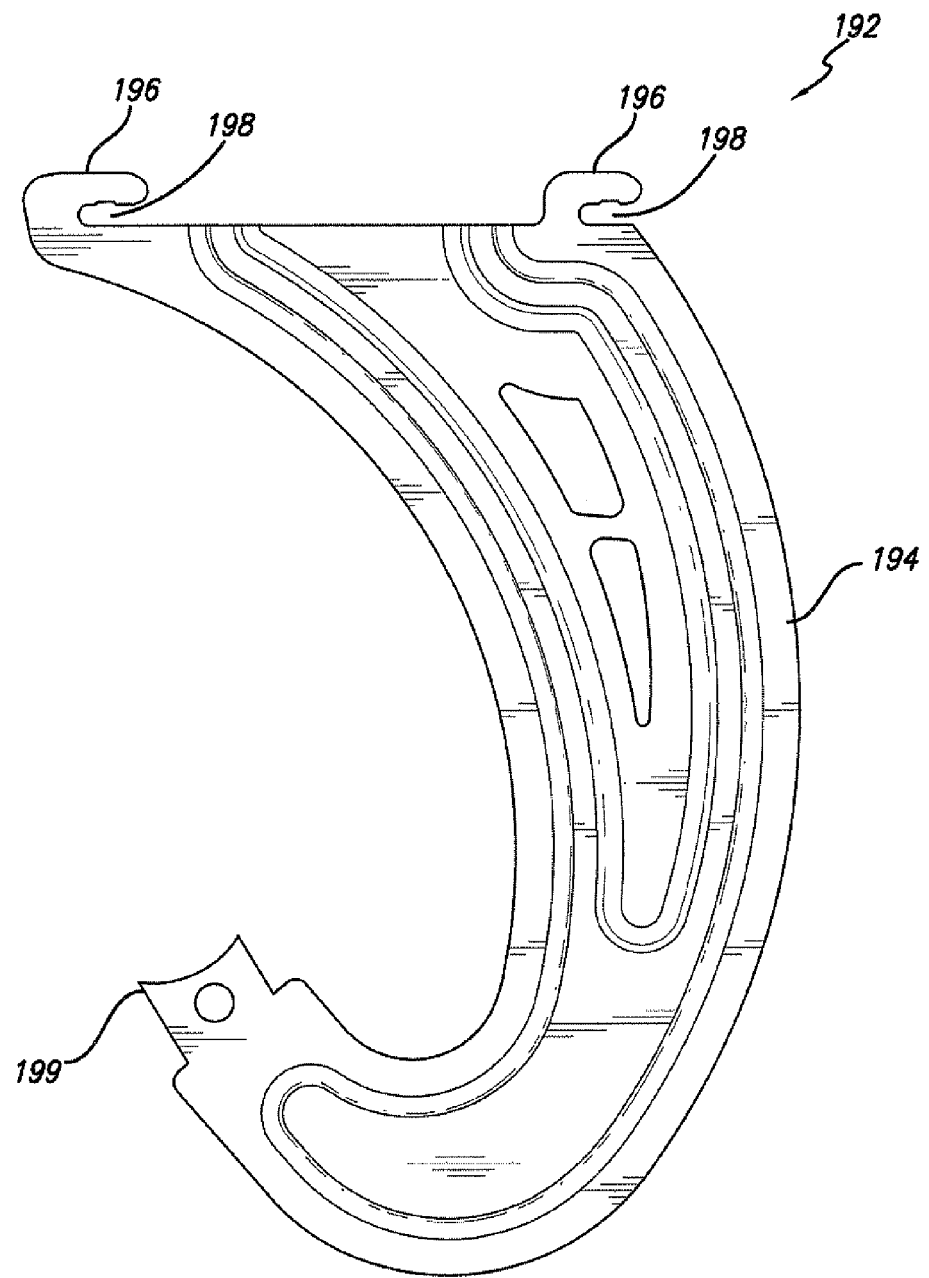
FIG. 57 is a side view of the hang rod mounting bracket shown in FIG. 55.
Figure 58:
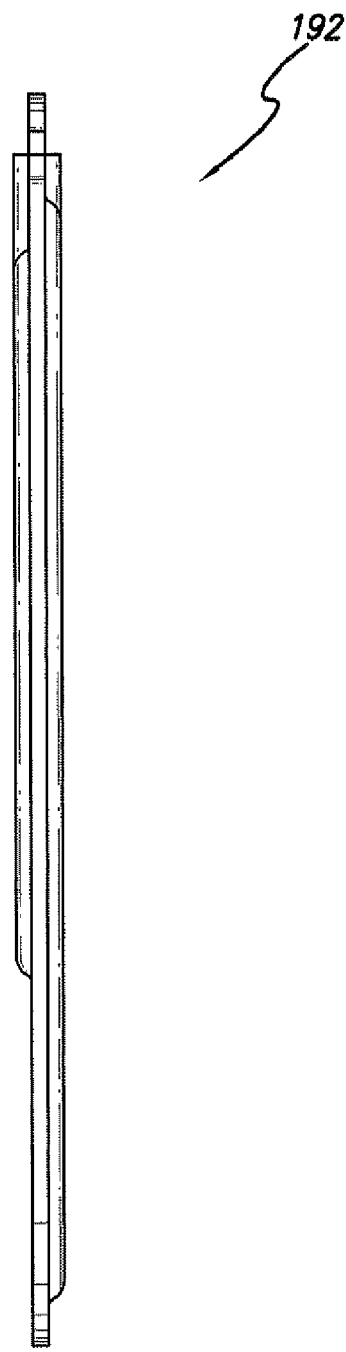
FIG. 58 is a front view of the hang rod mounting bracket shown in FIG. 55.
Figure 59:
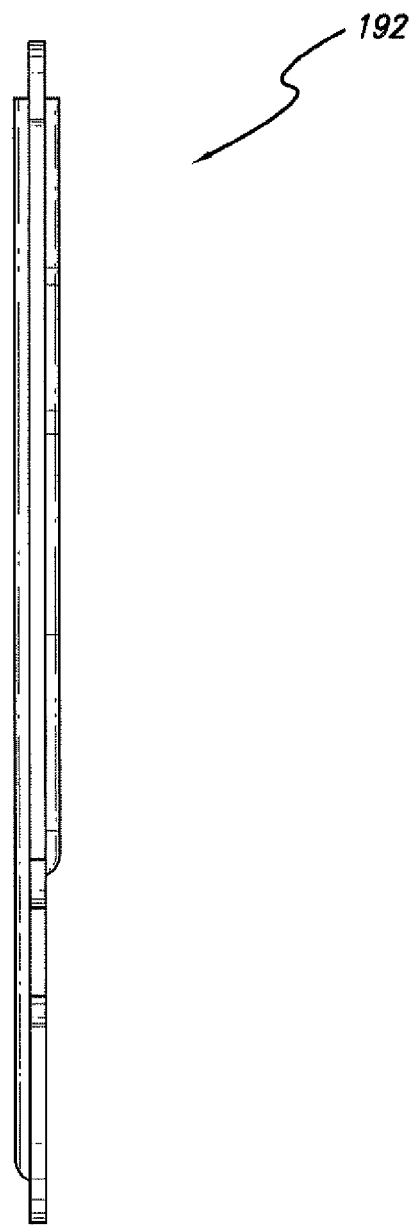
FIG. 59 is a back view of the hang rod mounting bracket shown in FIG. 55.
Figure 60:
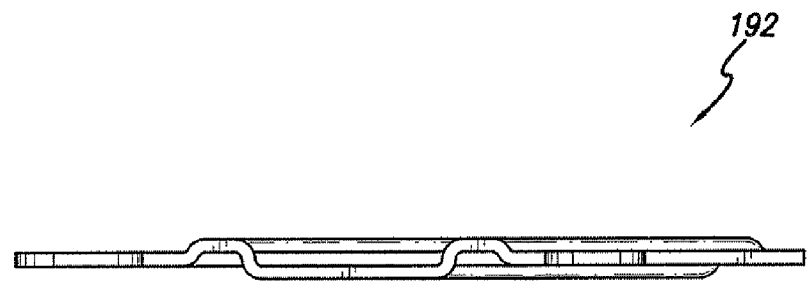
FIG. 60 is a top view of the hang rod mounting bracket shown in FIG. 55.
Figure 61:
FIG. 61 is a bottom view of the hang rod mounting bracket shown in FIG. 55.

With further reference to FIG. 55, the hang rod bracket 192 includes a main bracket portion 194 and tabs 196. A notch 198 is defined generally between each tab 196 and the main bracket portion 194. The tabs 196 may be configured to be inserted into openings along a lower surface of a shelf/shelving bracket (e.g., openings 179 of bracket 106 shown in FIG. 27, openings 279 of bracket 206 shown in FIG. 34, etc.), to thereby suspend or support the hang rod support bracket 192 from the shelf/shelving bracket. Each notch 198 may be configured relative to (e.g., about equal to, greater than, less than) a thickness of the material of the shelving/shelf bracket from which the hang rod mounting bracket 192 will be suspended. This may allow the bracket's tabs 196 to be hooked into the openings 179 of the shelving/shelf bracket 106 by inserting the tabs 196 into opening 179 and then moving the bracket 192 toward the standard 104 so as to receive a mounting portion of the shelving/shelf bracket 106 within the notches 198. The notches 198 may have a full radius to prevent (or inhibit) tearing of material when placed in a loaded condition, and to assist in installation of the bracket tabs 196 into the openings 179 of shelf/shelving bracket 106. A mounting portion of the shelving/shelf bracket 106 is generally referred to as that portion of the bracket 106 that is received within and fits into the notch 198.

In other embodiments, the tabs 196 may be configured to be positioned generally over longitudinal wires of a wire shelf, such that the longitudinal wires are received within the notches 198. The notches 198 may be configured such that a gap or spaced distance is defined generally between the main bracket portion 194 and the tabs 196 that is less than the outer diameter of the shelf's longitudinal wires received within notches 198. This, in turn, provides a means for the wires to be "snapped" into the notches 198.

The hang rod mounting bracket 192 includes an end portion 199, which is configured (e.g., sized, shaped, located, etc.) to be inserted and received within the slot 191 of the hang rod saddle 190, to thereby attach and secure the hang rod saddle 190 to the bracket 192. In some embodiments, the bracket end portion 199 may include a hole or opening 161, which may be configured for receiving a corresponding catch (e.g., projection, rib, protrusion, nub, etc.) within the slot 191, for helping retain the saddle 190 to the protruding portion 199. In addition, some embodiments have the bracket end portion 199 and saddle slot 190 configured such that a friction or interference fit is created therebetween for helping retain the saddle 190 on the bracket 192.

As shown in FIGS. 1 and 47, the hang rod 188 may be inserted or slid into the openings 193 of the hang rod saddles 190. Additionally, the illustrated hang rod mounting bracket 192 is generally J-shaped with a lower curved portion that has a depth preferably greater than the terminating end of a hook of a clothes hanger. In such embodiments, the hang rod mounting brackets 192 and saddles 190 may thus support the hang/hanger rod 188 horizontally in an exemplary manner that allows continuous free sliding of clothes hangers along the hang/hanger rod 188 past and over the generally J-shaped brackets 192. In other embodiments, the hang rod mounting bracket 192 may be configured differently, such as being shaped differently than generally J-shaped.

The hang rod mounting bracket 192 may be constructed of any suitable material, such as metals, metal alloys, plastics, etc. In one exemplary embodiment, the hang rod mounting bracket 192 may be formed from sheet metal. As an example, the hang rod mounting bracket 192 may be stamped from steel. Alternative embodiments may include a hang rod mounting bracket formed by other processes and/or different materials.

FIGS. 62 through 67 illustrate an exemplary end cap 187 that may be inserted into an open end portion of a hollow hang rod (e.g., hang/hanger rod 188 shown in FIG. 47, etc.) according to an exemplary embodiment. By way of example, the end cap 187 may be configured as a self-adjusting press fit end cap, which may be used on a closet hang rod to prevent (or at least inhibit) hangers from sliding off the end of the hang rod.

Figure 62:
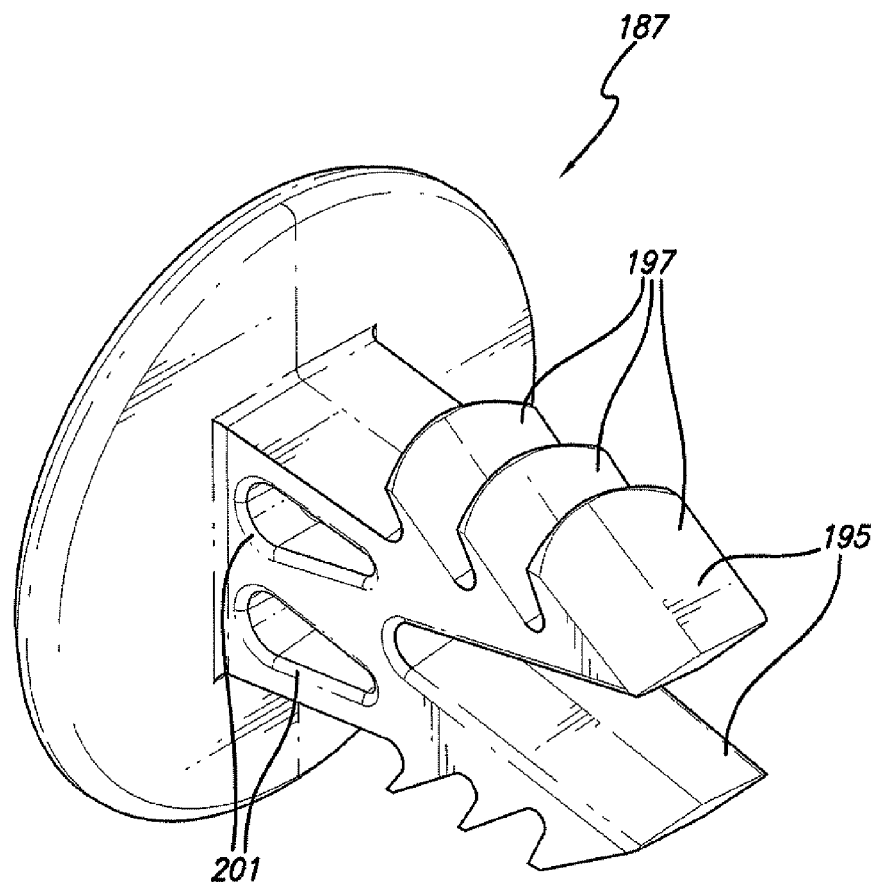
FIG. 62 is a perspective view of an exemplary end cap of the hang rod assembly shown in FIG. 47, where the end cap may be inserted into an open end of a hollow hang rod according to exemplary embodiments.
Figure 63:
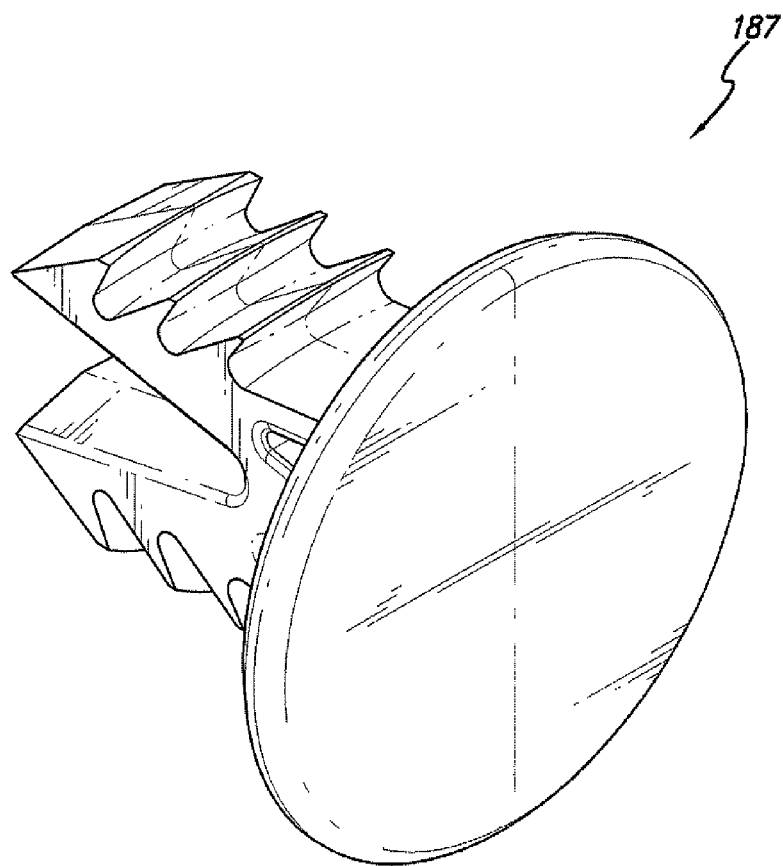
FIG. 63 is a back perspective view of the end cap shown in FIG. 62.
Figure 64:
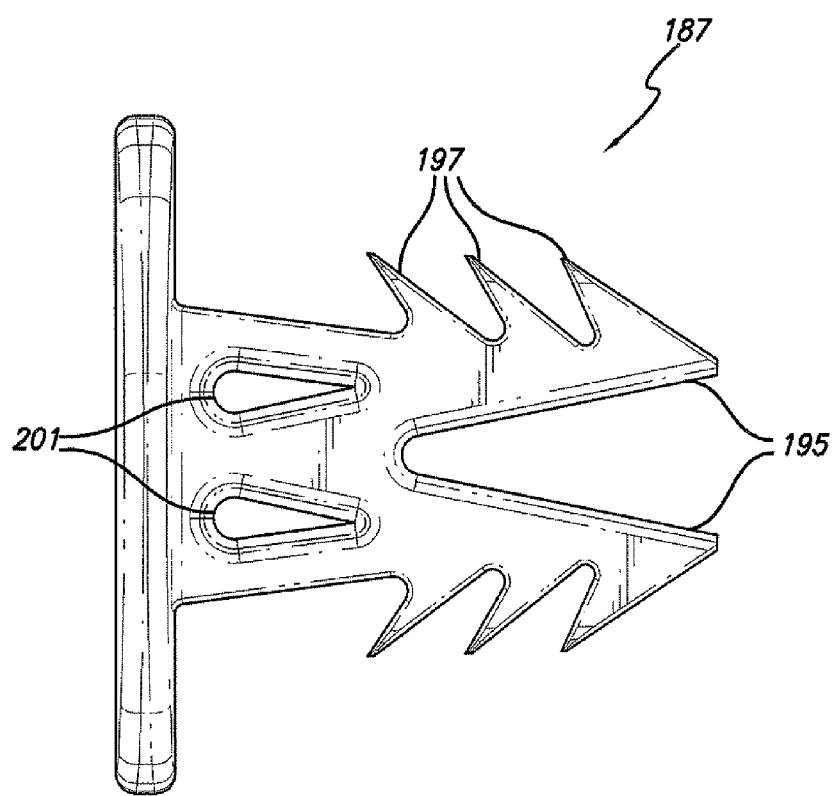
FIG. 64 is a side view of the end cap shown in FIG. 62.
Figure 65:
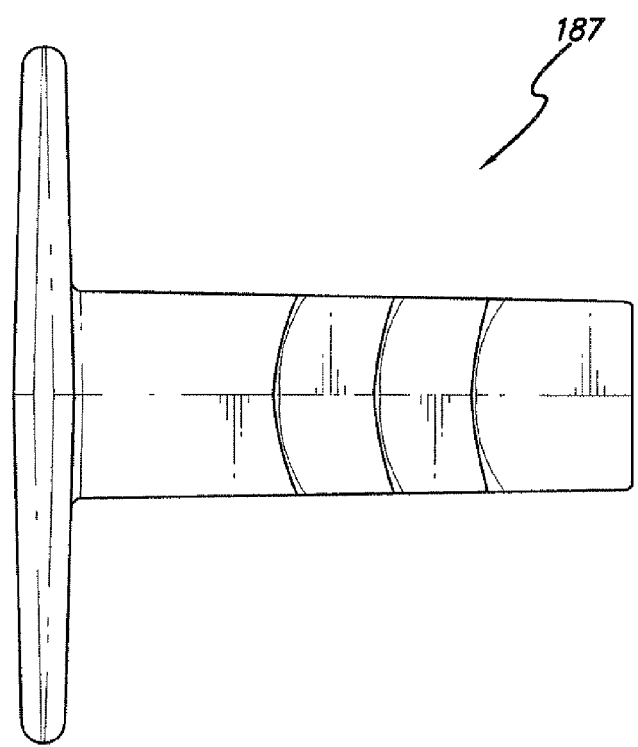
FIG. 65 is a top or bottom view of the end cap shown in FIG. 62.
Figure 66:
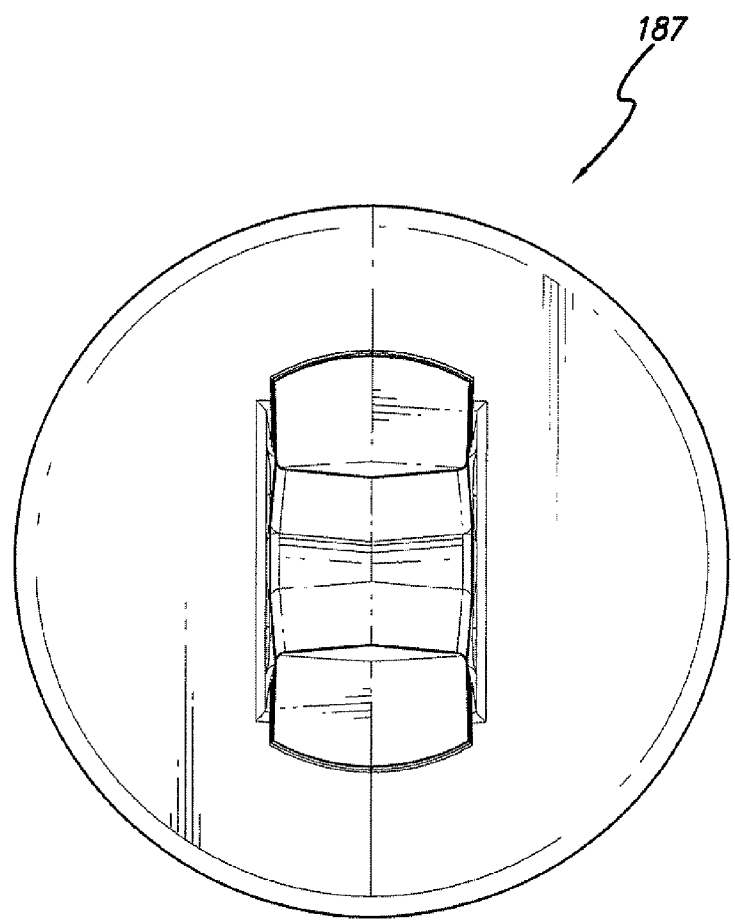
FIG. 66 is an end view of the end cap shown in FIG. 62.
Figure 67:
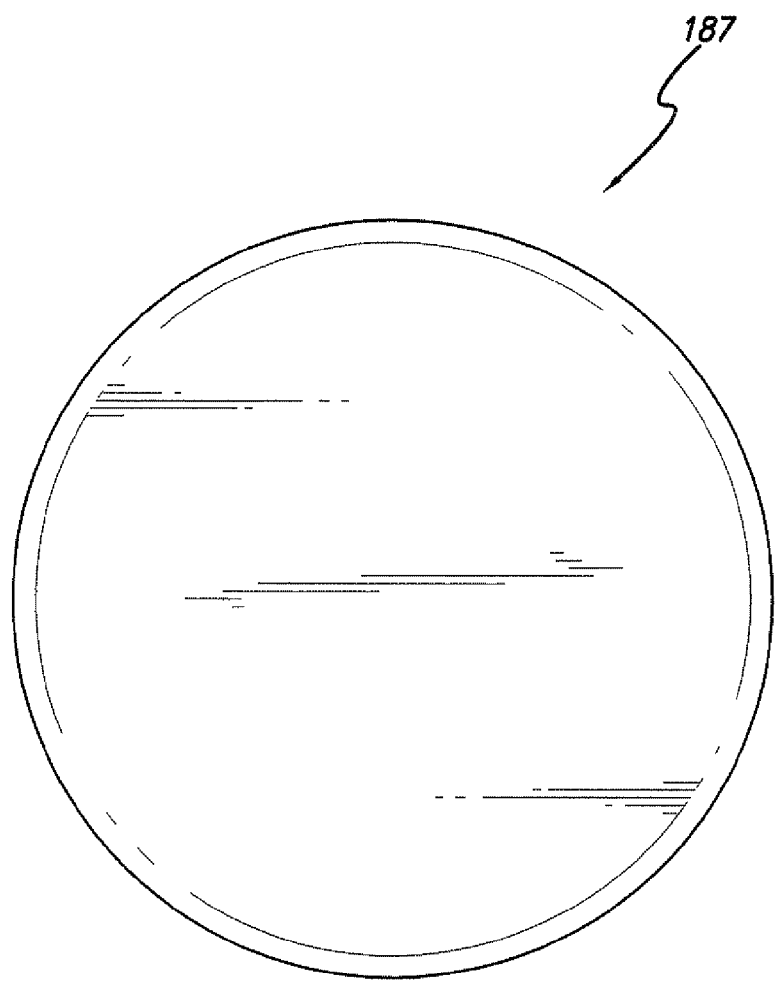
FIG. 67 is an opposite end view of the end cap shown in FIG. 62.

As shown in FIG. 62, the end cap 187 includes forks or end portions 195 having protrusions 197 thereon in a sawtooth or jagged configuration. When the end cap 187 is inserted, the forks 195 may be compressed generally towards each other.

The end 187 also includes recesses or pockets 201. The recessed pockets 201 can provide a degree of compression to the end cap 187. The recessed pockets 201 may also allow the end cap 187 to be fabricated with less material. The recessed pockets 201 may also be configured (e.g., sized, shaped, located, etc.) to provide for some degree of compression while still maintaining sufficient structural stiffness for the particular application.

In some embodiments, the end cap 187 may be formed from one or more materials having sufficient resiliency to permit compression of the end cap's forks 195 towards each other for fitting into the open end portion of hollow rod, and having sufficient restorative force for urging the forks 195 outwardly to spread apart thereby creating a relatively good friction or interference fit between the end cap's forks 195 and interior sidewalls of the hollow rod. A wide range of materials may be used for the end cap 187, such as polypropylene, etc.

An exemplary installation process is described for the adjustable shelving system 100 (FIGS. 1 through 3) for purposes of illustration only. The mounting channel member 140 and mounting screw 130 may advantageously provide for horizontally aligning the track or rail 110, and for mounting the track 110 to a wall or surface. The tracks 110 are configured to be positioned over the slotted head 134 of the mounting screw 130, and over the mounting channel member 140, and are further configured to be adjustably positioned relative to each other via member 112. Mounting channels 140, the member 112, and tracks 110 thus enable the tracks 110 to be movable to an appropriate position as desired for accommodating a particular shelf, while maintaining horizontal alignment of the tracks 110. With the tracks 110 being easily mounted and adjustable to an appropriate position, the standards 104 may then be engaged with the tracks 110 and slid to the appropriate spacing to accommodate a wire shelf, laminate shelf, etc. With the standards 104 installed and positioned accordingly, brackets 106, 206 may relatively easily be engaged to the standards 104 by inserting the bracket tabs into corresponding slots 156 of the standard 104. The hang rod brackets 192 may also be suspended from the brackets 106, 206 by inserting the tabs 196 of the hang rod brackets 192 into the openings 179, 279 of brackets 106, 206. The saddles 190 may be engaged to the hang rod brackets 192 by positioning the saddles 190 relative to the hang rod brackets 192 to insert the end portions 199 of the hang rod brackets 192 into the slots 191 of the saddles 190. The hang/hanger rod 188 may then be positioned so as to rest and be supported within the openings 193 of the saddles 190. In addition, an end cap 187 may be positioned within each open end portion of the hang rod 188 to inhibit clothes hangers from sliding off the end of the hang rod 188, for example, when a person is sliding hangers along the hang rod 188 while searching for a particular garment to wear, etc.

While the above first embodiment includes mounting screws and mounting channels and a hang rod assembly, such features may be optional in other embodiments. Accordingly, it should be understood that some embodiments may be provided that omit one or more of the above features, such as the mounting elements, hang rod assembly, and/or the locking member.

Another exemplary embodiment of an adjustable shelving system is provided that includes a cylindrical rod, and at least two tracks having a cylindrically-shaped recess in which the cylinder rod is received. In this example, each track is configured to be slidably positioned over the cylindrical rod. Each track includes a downwardly extending retaining lip, and an upper support surface that together with the downwardly extending retaining lip defines an opening in which a contoured end of a standard may be inserted and received. Continuing with this example, the adjustable shelving system further includes at least two standards each having slots and an upper contoured end portion. The contoured end portion has a horizontal support surface that contacts the upper support surface of the track when the contoured end is received within the opening in the track. The standard is configured to slide within the opening of the track such that each standard may be adjustably positioned along the length of each track. The adjustable shelving system further includes at least two shelf/shelving brackets. Each shelf/shelving bracket has a main body portion and tabs. A notch is defined generally between each tab and the main body portion of the shelf/shelving bracket. The tabs are configured to be inserted and received in the slots in the standard in a manner such that the notches inhibit dislodging of the bracket from the standard. The adjustable shelving system also includes a wire ventilated shelf having longitudinal rods that are configured to be positioned on the top of the support bracket.

In this embodiment of an adjustable shelving system, there may also be provided a hang rod assembly. The hang rod assembly may include a hang/hanger rod, a hang rod saddle or mounting base, and a hang rod mounting bracket. The hang rod mounting bracket may include a main bracket portion and tabs. A notch may be defined generally between each tab and the main bracket portion. The tabs are configured to be inserted into openings of a shelf/shelving bracket and/or over longitudinal wires of a wire shelf, such that the longitudinal wires are received within the notches. The end portion of the hang rod mounting bracket may be configured to be inserted and received within a slot in the hang rod saddle, to thereby secure the hang rod saddle to the hang rod mounting bracket. A hang/hanger rod may be received or rest within an opening of the hang rod saddle.

Certain terminology is used herein for purposes of reference only, and thus is not intended to be limiting. For example, terms such as "upper", "lower", "above", "below", "upward", "downward", "forward", and "rearward" refer to directions in the drawings to which reference is made. Terms such as "front", "back", "rear", "bottom" and "side", describe the orientation of portions of the component within a consistent, but arbitrary, frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A shelving system comprising:
   at least two tracks, each track including a rearward portion and a forward portion, the forward portion including a downwardly-extending retaining lip with an inwardly protruding portion, a generally upwardly-facing horizontal support surface, and an opening cooperatively defined by the retaining lip and support surface along at least a portion of a length of the track; and
   at least one standard including an end portion slidably receivable within the opening of each of the tracks, such that the position of the standard relative to each of the tracks is slidably adjustable along each of the tracks,
   the end portion of the standard including an upper portion configured to contact one of said track's retaining lip, and an opening for receiving the inwardly protruding portion of one of said track's retaining lip, and a generally downwardly-facing horizontal support surface that contacts the generally upwardly-facing horizontal support surface of one of said tracks when the standard is supported by one of said tracks with the standard's end portion slidably received within said one of said track's opening;
   wherein the rearward portion of each track defines a recess, and wherein the shelving system further comprises an elongate member slidably receivable within the recesses of the tracks such that each track is slidable along the elongate member, whereby the slidable engagement of the elongate member within the recesses of the tracks aligns the tracks and allows slidable adjustment of the relative positioning of the tracks to each other.

2. The shelving system of claim 1, wherein the elongate member comprises a generally cylindrical rod, and wherein the recesses defined by the tracks include corresponding generally cylindrical shapes for slidably receiving therein the generally cylindrical rod.

3. The shelving system of claim 1, wherein the at least one standard includes two standards each supportable by a corresponding one of the two tracks, and wherein each standard is slidably along the corresponding one of the two tracks, thereby allowing slidable adjustment of the relative positioning of the standards to each other.

4. The shelving system of claim 3, further comprising at least two shelving brackets each engageable with a front surface of a corresponding one of the two standards for cooperatively supporting at least one shelf.

5. The shelving system of claim 4, further comprising at least one shelf supportable by the at least two shelving brackets.

6. The shelving system of claim 4, wherein each shelving bracket includes a lower portion with openings, and wherein the shelving system further comprises:
   a hang rod;
   at least two hang rod mounting brackets, each including a first end portion with tabs receivable within the openings of a corresponding one of the shelving brackets to mount the hang rod mounting bracket to the corresponding one of the shelving brackets and a second end portion generally opposite the first end portion; and
   at least two saddles each including an upper saddle portion and a lower portion with at least one opening for receiving the second end portion of a corresponding one of the corresponding hang rod mounting brackets to mount the saddle to the hang rod mounting bracket, the upper saddle portion configured for supportably receiving at least a portion of the hang rod therein.

7. The shelving system of claim 6, wherein each hang rod mounting bracket includes a curved portion extending generally between the first and second end portions such that the hang rod mounting bracket has a generally J-shaped profile configured to allow a clothes hanger to slide along the hang rod freely past the hang rod mounting bracket without interference therefrom.

8. The shelving system of claim 6, wherein the upper saddle portion of each saddle is configured with a generally U-shaped profile for receiving only a lower portion of the hang rod therein.

9. The shelving system of claim 4, further comprising at least two locking members each coupled to a corresponding one of the shelving brackets for pivotal movement between at least an unlocked position and a locked position in which the locking member releasably locks in place a portion of a shelf supported by the shelving brackets.

10. The shelving system of claim 9, wherein each locking member includes:
    protruding portions on generally opposite sides of the locking member that are receivable within corresponding openings of the corresponding one of the shelving brackets for pivotably coupling the locking member thereto;
    a locking finger that defines an opening for receiving a portion of a shelf therein when the locking member is in the locked position; and
    a lever for causing pivotal movement of the locking member between the unlocked and locked positions.

11. The shelving system of claim 1, wherein the standard includes at least one surface having at least one fastener opening therein to allow mounting of the standard directly to a support surface.

12. The shelving system of claim 1, wherein the end portion of the standard comprises a contoured end portion having a shape complementary to a shape of the opening of each of said tracks.

13. The shelving system of claim 1, wherein the standard includes a rearward portion defining a contoured opening having a shape complementary to a shape of a lower portion of each of said tracks, such that one of said track's lower portion is engageably received within the opening when the standard is supported by one of said tracks with the standard's end portion slidably received within said one of said track's opening.

14. The shelving system of claim 1, further comprising at least one shelving bracket having a main body portion, tabs, and a notch defined generally between each tab and the main body portion, and wherein the standard includes apertures for receiving the tabs of the shelving bracket for mounting the shelving bracket to the standard such that corresponding portions of the standard are received within corresponding notches of the shelving bracket, whereby dislodgement of the shelving bracket from the standard is inhibited.

15. The shelving system of claim 1, wherein the tracks comprise extruded aluminum.

16. A shelving system comprising:
    at least one track including a rearward portion and a forward portion, the forward portion including a downwardly-extending retaining lip with an inwardly protruding portion, a generally upwardly-facing horizontal support surface, and an opening cooperatively defined by the retaining lip and support surface along at least a portion of a length of the track; and
    at least one standard including an end portion slidably receivable within the opening of the track, such that the position of the standard relative to the track is slidably adjustable along the track,
    the end portion of the standard including an upper portion configured to contact the track's retaining lip, and an opening for receiving the inwardly protruding portion of the track's retaining lip, and a generally downwardly-facing horizontal support surface that contacts the generally upwardly-facing horizontal support surface of the track when the standard is supported by the track with the standard's end portion slidably received within the track's opening;
    wherein the rearward portion of the track includes a recessed slot extending at least partially along the length of the track and a downwardly extending lip, and wherein the shelving system includes at least one mounting screw having a slotted head with an axial groove extending circumferentially along the slotted head, the slotted head configured to be slidably received within the track's recessed slot with the track's downwardly extending lip engaged within the axial groove, whereby the position of the mounting screw relative to the track is slidably adjustable along the track.

17. The shelving system of claim 16, further comprising a mounting channel member having a base and two generally opposite sidewalls extending from the base such that the mounting generally member has a channel U-shaped profile, and wherein the base includes an opening therein for receiving at least a portion of the mounting screw therein, and wherein the sidewalls are spaced apart for receiving a portion of the track therebetween when the track is mounted to a surface with the mounting screw.

18. The shelving system of claim 16, wherein the mounting screw further comprises an end portion with a self-drilling thread generally opposite the slotted head.

19. The shelving system of claim 1, further comprising an assembly for supporting a hang rod from a shelving bracket having a lower portion with openings, the assembly comprising:
    a hang rod mounting bracket including a first end portion with tabs receivable within the openings of the shelving bracket to mount the hang rod mounting bracket to the shelving bracket, a second end portion generally opposite the first end portion, and a curved portion extending generally between the first and second end portions such that the hang rod mounting bracket has a generally J-shaped profile configured to allow a clothes hanger to slide along the hang rod freely past the hang rod mounting bracket without interference therefrom; and
    a saddle including an upper saddle portion and a lower portion with an opening for receiving the second end portion of the hang rod mounting bracket to thereby mount the saddle to the hang rod mounting bracket, the upper saddle portion configured for receiving at least a portion of the hang rod therein.

20. The shelving system of claim 19, further comprising a hang rod, and a shelving bracket having a lower portion with openings configured to receive the tabs of the hang rod mounting bracket.

21. The shelving system of claim 19, wherein the hang rod mounting bracket comprises stamped steel.

22. The shelving system of claim 19, wherein the saddle's opening comprises a generally rectangular slot.

23. The shelving system of claim 19, wherein the upper saddle portion is configured with a generally U-shaped profile for receiving only a lower portion of the hang rod therein.

24. The shelving system of claim 19, wherein the hang rod mounting bracket includes a notch defined generally between each tab and the first end portion and is configured for receiving a corresponding portion of the shelving bracket when the tabs are received within the openings of the shelving bracket.

25. The shelving system of claim 1, further comprising:
at least one shelving bracket having openings;
at least one locking member coupled to the shelving bracket for pivotal movement between at least an unlocked position and a locked position in which the locking member releasably locks in place a portion of a shelf at least partially supported by the shelving bracket, the locking member comprising:
protruding portions on generally opposite sides of the locking member, the protruding portions receivable within corresponding openings of the shelving bracket to thereby pivotably couple the locking member to the shelving bracket;
a locking finger that defines an opening for receiving the portion of the shelf therein when the locking member is in the locked position; and
a lever for causing pivotal movement of the locking member between the unlocked and locked positions.

26. The shelving system of claim 25, further comprising a shelf at least partially supported by the shelving bracket.

27. The shelving system of claim 26, wherein the shelf comprises at least one longitudinal member, and wherein the opening defined by the locking finger is configured for receiving at least a portion of the longitudinal member.

28. The shelving system of claim 26, wherein:
the shelf comprises at least one longitudinal member;
the shelving bracket includes at least one generally u-shaped recess along an upper portion thereof; and
at least a portion of the longitudinal member is received within the shelving bracket's u-shaped recess, thereby restraining generally horizontal movement of the shelf relative to the shelving bracket.

29. The shelving system of claim 25, wherein the standard includes apertures, and wherein the shelving bracket includes:
a main body portion defining the openings tabs receivable within the apertures of the standard for mounting the shelving bracket to the standard; and
a notch defined generally between each tab and the main body portion, and configured such that a corresponding portion of the standard is received within the notch when the shelving bracket's tabs are received within the standard's apertures.

30. The shelving system of claim 1, wherein each of the tracks includes
a recessed slot extending at least partially along the length of the rearward portion; and
wherein the shelving system further comprises at least one mounting screw having a slotted head with an axial groove extending circumferentially along the slotted head, the slotted head slidably receivable within each track's recessed slot and each track's downwardly extending lip is receivable within the axial groove, whereby the position of the mounting screw relative to each track is slidably adjustable along each track.

31. The shelving system of claim 30, wherein the mounting screw further comprises an end portion with a self-drilling thread generally opposite the slotted head.

32. The shelving system of claim 30, further comprising a mounting channel member having a base and two generally opposite sidewalls extending from the base such that the mounting channel member has a channel U-shaped profile, and wherein the base includes an opening therein for receiving at least a portion of the mounting screw therein, and wherein the sidewalls are spaced apart for receiving a portion of the track therebetween when the track is mounted to a surface with the mounting screw.

* * * * *